United States Patent
Imaizumi et al.

[19]
[11] Patent Number: 5,978,352
[45] Date of Patent: Nov. 2, 1999

[54] MULTIPLEX TRANSMISSION SYSTEM

[75] Inventors: Nobuhiro Imaizumi; Tatsuaki Oniishi, both of Shizuoka, Japan

[73] Assignee: Yazaki Corporation, Tokyo, Japan

[21] Appl. No.: 08/673,046

[22] Filed: Jul. 1, 1996

[30] Foreign Application Priority Data

Jun. 29, 1995 [JP] Japan .................................. 7-164249
Jul. 26, 1995 [JP] Japan .................................. 7-190582

[51] Int. Cl.$^6$ .................................. H04J 3/02; H04J 3/14
[52] U.S. Cl. .................................. 370/216; 370/445; 307/39; 340/825.16
[58] Field of Search .................................. 370/216, 217, 370/241, 242, 244, 250, 445, 447, 449, 461, 462, 357, 360; 307/10.1, 11, 18, 29, 36, 38, 39; 340/825.06, 825.07, 825.15, 825.16, 825.5, 825.51; 371/32

[56] References Cited

U.S. PATENT DOCUMENTS

| | | | |
|---|---|---|---|
| 5,079,759 | 1/1992 | Kajiyama | 370/245 |
| 5,117,421 | 5/1992 | Tokizane et al. | 370/221 |
| 5,251,211 | 10/1993 | Mutoh et al. | 370/445 |
| 5,272,699 | 12/1993 | Nobutoki et al. | 370/216 |
| 5,375,120 | 12/1994 | Hirano et al. | 370/360 |

FOREIGN PATENT DOCUMENTS

| | | | |
|---|---|---|---|
| 36 24 456 | 1/1988 | Germany | B60R 16/02 |
| 43 40 048 | 1/1995 | Germany | G06F 13/38 |
| 61-171235 | 8/1986 | Japan | H04B 3/46 |
| 4-130897 | 5/1992 | Japan | H04Q 9/00 |
| 5-147479 | 6/1993 | Japan | B60R 16/02 |
| 5-55701 | 7/1993 | Japan | B60L 1/00 |
| WO 93/20490 | 10/1993 | WIPO | G05B 19/04 |

*Primary Examiner*—Alpus H. Hsu
*Attorney, Agent, or Firm*—Sughrue, Mion, Zinn, Macpeak & Seas, PLLC

[57] ABSTRACT

A multiplex transmission system is made up of a master load control unit which is connected to a multiplex transmission network and is capable of executing a multiplexing operation based on control specification information as a master system, slave load control units capable of the multiplexing operation as a slave system, and a nonvolatile removable external storage unit capable of reading the control specification information as required. Abnormalities associated with the multiplexing operation which arise in the multiplex transmission system are detected, and load control units in an abnormal condition can be restored to a normal condition by resetting.

24 Claims, 16 Drawing Sheets

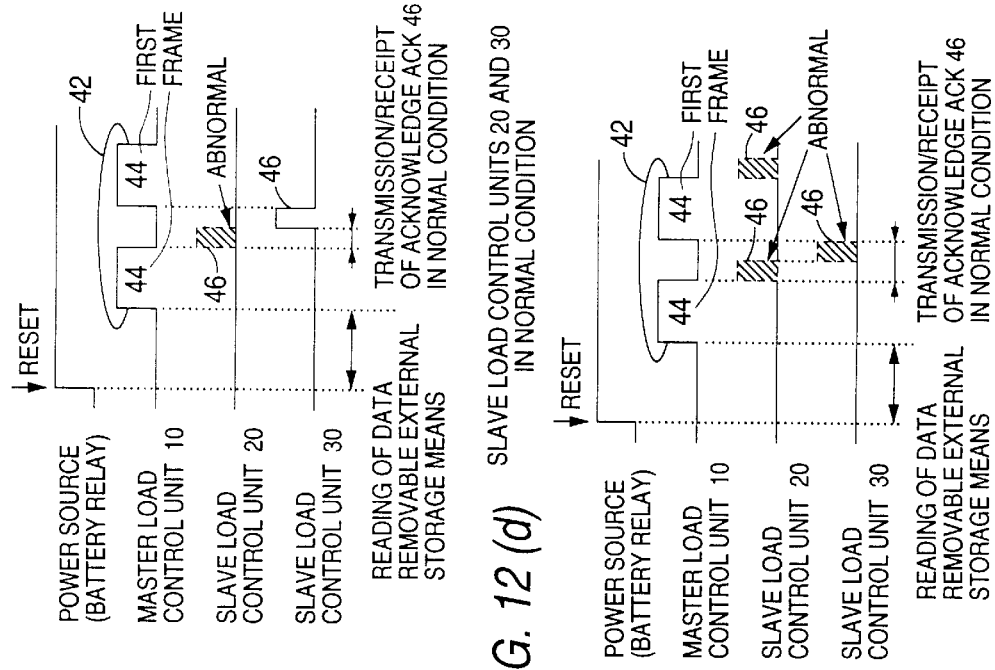
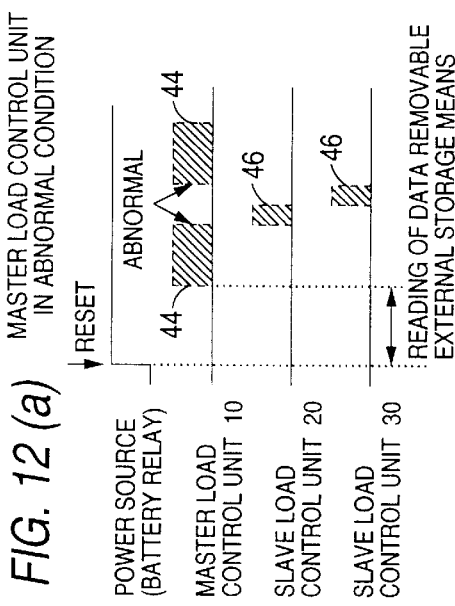
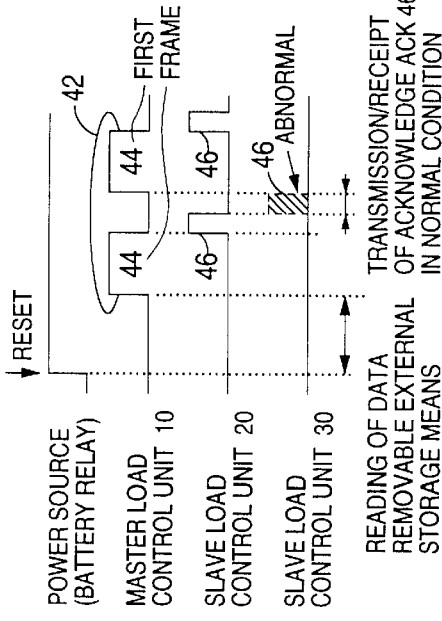

MULTIPLEX TRANSMISSION SYSTEM

BACKGROUND OF THE INVENTION

1. Field of the Invention

The present invention relates to a multiplex transmission system which processes control specification information relevant to control specifications of loads by multiplexing via a multiplex transmission system, and which is connected to load control units capable of controlling the loads respectively connected thereto. More particularly, the present invention relates to a vehicle multiplex transmission system which is connected to load control units capable of controlling the electric power fed to loads, that is, electrical equipment such as lamps or an air conditioner, aboard the vehicle. The present invention further relates to a resetting method and a resetting apparatus for use with the multiplex transmission system.

2. Related art

FIG. 15 shows an example of a conventional multiplex transmission system of the above described type.

Specifically, a multiplex transmission system 5 is made up of one single master load control unit 1, at least one slave load (two slave load control units 2 and 3 shown in FIG. 15), and a multiplex transmission network 4 connecting them together.

The master load control unit 1 and the slave load control units 2, 3 are respectively provided with nonvolatile storage sections 1a, 2a, and 3a for holding control specification information.

The nonvolatile storage sections 1a, 2a, and 3a of the master load control unit 1 and the slave load control units 2, 3 hold control specification information which are control specifications of loads 2b, 2c, 3b, and 3c in a multiplexed manner through the multiplex transmission network 4.

Control status information or control specification information, which are held in the nonvolatile storage sections 1a, 2a, and 3a in a multiplexed manner, are updated by connecting, e.g., an external write terminal to the master load control unit 1, and by writing the control status information or control specification information to be updated into the nonvolatile storage section 1a of the master load control unit 1 from the external write terminal.

The control specification information, that is, the control specifications of the loads 2b, 2c, 3b, and 3c, represent the types of loads 2b, 2c, 3b, and 3c (e.g., electrical equipment aboard the vehicle such as lamps and an air conditioner), and control methods (e.g., the accurate control of a flashing cycle of the lamps, illuminance of the lamps and lightening actions of a lamp synchronized with door openings, and the control of supply of electrical power such as ON/OFF operations of the air conditioner).

The slave load control unit 2 selectively controls either the load (L1)2b or the load (L2)2c by switching between a selective switch (S1)6a and a selective switch (S2)6b, as required.

Similarly, the slave load control unit 3 selectively controls either the load (L3)3b or the load (L4)3c by switching between a selective switch (S1)6a or a selective switch (S2)6b, as required.

That is, the respective slave load control units 2 and 3, in accordance with the load control information that has been processed in a multiplexed manner, are allowed to selectively control either of the loads (either L1 or L2) respectively connected to the unit 2, and either of the loads (either L3 or L4) respectively connected to the unit 3.

In the multiplex transmission system 5 in normal operation, for example, the master load control unit 1 enters a transmission mode, and the control specification information or the control status information is transmitted during a predetermined period of time (i.e., in a period of "a" sec. in FIG. 16). Each slave load control unit enters a receiving mode during only a predetermined period of time (i.e., in a period of "a+α" sec. in FIG. 16) by use of a built-in timer. It then receives the control specification information or the control status information from the master load control unit, and the thus received information is held in the respective nonvolatile storage sections 2a and 3a.

Subsequently, the slave load control unit 2 enters a transmission mode and transmits the control specification information or the control status information during a predetermined period of time (i.e., in a period of "b" sec. in FIG. 16). At this moment, the master load control unit 1 and the slave load control unit 3 enter a receiving mode during only a predetermined period of time (i.e., in a period of "b+α" sec. in FIG. 16) by use of their respective built-in timers. Then, they receive the control specification information or the control status information from the slave load control unit 2. The thus received information is held in the respective nonvolatile storage sections 1a and 3a.

Similarly, the slave load control unit 3 enters a transmission mode and sends the control specification information or the control status information during a predetermined period of time (i.e., in a period of "c" sec. in FIG. 16). The master load control unit 1 and the slave load control unit 2 enter a receiving mode during only a predetermined period of time (i.e., in a period of "c+α" sec. in FIG. 16) using their respective built-in timers. Then, they receive the control specification information or the control status information from the slave load control unit 3. The thus received information is held in the respective nonvolatile storage sections 2a and 1a.

According to a resetting method and a resetting apparatus used in such a conventional multiplex transmission system 5, the master load control unit 1 enters the transmission mode first to start initial-mode communication at the time of a restoring operation (e.g., a resetting operation) for restoring the system in an abnormal condition to a normal condition. As a result, the control specification information held in the master load control unit 1 is forcibly multiplexed with respect to other load control units (i.e., the slave load control units 2 and 3), and the thus multiplexed information is stored in the respective nonvolatile storage sections 2a and 3a. On the basis of the control specification information or the control status information forcibly multiplexed by the initial-mode communication executed when the system is restored from an abnormal condition to a normal condition (e.g., at the time of a resetting operation), the slave load control unit 2 controls the loads 2b and 2c connected thereto. Similarly, the slave load control unit 3 controls the loads 3b and 3c connected thereto on the basis of the control specification information or the control status information forcibly multiplexed by the initial-mode communication executed when the system is restored from an abnormal condition to a normal condition (e.g., at the time of a resetting operation).

The abnormality arising in the multiplex transmission system signifies anomalous communication in a multiplex transmission network or faulty operations of the load control units which could be due to an anomaly in the power supply.

Problems to be Solved by the Invention

However, in the above-mentioned conventional multiplex transmission system 5, if any of the respective pieces of load control information respectively held in the storage part 1a of the master load control means 1, the storage part 2a of the slave load control unit 2 and the storage part 3a of the slave load control unit 3 is multiplex processed under such a condition that it is updated in error due to noise or the like, or if the multiplex processing is executed under such a condition that the load control information is transmitted in error due to noise or the like, there is a fear that the multiplex transmission system 5 will fail to operate normally. This raises a problem as to the reliability of the multiplex transmission system 5.

Also, in such abnormal operating conditions of the multiplex transmission system, there is a fear that the required pieces of load control information (such as the kinds of the loads, the load control methods and the like) respectively consisting of the control contents of the loads can be updated in error due to noise or the like. This would thereby cause the wrong selection and control of the loads that are the objects to be controlled. This also raises a problem as to the reliability of the multiplexing transmission system 5.

Further, the conventional system fails to provide a means which can, when the load control information of the master load control means 1 is updated, not only can urge the forced transfer of the updated load information to the respective slave load control units 2 and 3 but also allows the thus transferred load control information to be held by the respective storage parts 2a and 3a of the slave load control units 2 and 3. Thus, the conventional procedure for updating the load control information is apt to be complicated, which raises a problem that the updating of the load control information cannot be transmitted to the slave load control unit with accuracy.

Further, if the control status information or the control specification information held in the nonvolatile storage sections 1a, 2a, and 3a is updated in such a conventional multiplex transmission system 5, an external write terminal, or the like, is connected to the master load control unit 1. The control status information or the control specification information to be updated is written into the master load control unit 1 from the external write terminal. This makes it difficult to quickly, accurately, and easily initialize the multiplex transmission system. Further, it is difficult to design a multiplex transmission system using new control specification information located at a place distant from the multiplex transmission system. Hence, it is difficult to quickly, accurately, and easily update the conventional multiplex transmission system.

Further, according to the resetting method and the resetting apparatus used in the conventional multiplex transmission system 5, the master load control unit 1 enters the transmission mode first to start the initial-mode communication when the system is restored from an abnormal condition to a normal condition (e.g., at the time of a resetting operation). Then, the control specification information held in the master load control unit 1 is forcibly multiplexed with respect to other load control units (i.e., the slave load control units 2 and 3). As a result, the load control unit in normal operation is also forcibly subjected to the initial-mode communication carried out to restore the system from an abnormal condition to a normal condition (e.g., to reset the system).

As described above, the load control unit being normally operating is also forcibly subjected to the initial-mode communication which uses the control specification information or the control status information of the master load control unit 1. As a result of this, normal load control and multiplexing operations being executed by the normal load control unit is interrupted.

In other words, the control and multiplexing operations of the normally operating load are interrupted when the system is restored from an abnormal condition to a normal condition (e.g., at the time of a resetting operation), and the load control and multiplexing operations for the initial-mode communication are executed instead. It is difficult to resume the interrupted load control and multiplexing operations which require a high degree of reliability and accuracy.

SUMMARY OF THE INVENTION

The present invention aims at eliminating the problems found in the above-mentioned conventional multiplexing transmission system. Accordingly, it is an object of the invention to provide a multiplexing transmission system which can transmit the load control information of the master load control means to the respective slave load control means with accuracy. This is accomplished by the provision of a simple means or a reset switch which not only can urge the forced transfer of the load control information that is held in the storage part of a single master load control unit to one or more slave load control units and also allows the thus forcedly transferred load control information to be held by the respective storage parts of the slave load control means.

Also, it is another object of the invention to provide a multiplex transmission system which compares the load control information held in the storage part of the master load control unit with the load control information respectively held in the storage parts of the slave load control units. When there exists any inconsistency between the three pieces of load control information, the system carries out a majority processing on the load control information of the master load control unit as well as the load control information of the slave load control units. In accordance with the results of the majority processing, the system executes a multiplexing processing, so that a highly reliable multiplexing processing can be realized.

The present invention has been conceived to solve these drawbacks in the art. The primary object of the present invention is to provide a multiplex transmission system having features as will be described below, and a resetting method and a resetting apparatus for use therewith, by use of electrically removable external storage means. Specifically, the multiplex transmission system can be quickly, accurately, and easily initialized; permits the quick, accurate, and easy designing of a multiplex transmission system using new control specification information at a place located at a distance away from the current multiplex transmission system; and makes it possible to quickly, accurately, and easily control electrical equipment aboard a vehicle such as lamps and an air conditioner (e.g., the accurate control of a flashing cycle of the lamps, the illuminance of the lamps and lightening actions of a lamp synchronized with door openings, and the control of supply of electrical power such as ON/OFF operations of the air conditioner).

Another object of the present invention is to provide a multiplex transmission system having features as will be described below, and a resetting method and a resetting apparatus for use therewith. Specifically, the multiplex transmission system can prevent execution of load control and multiplexing operations for initial-mode communication which involves interruption of control and multiplexing operations of a normally operating load when the system is initialized under updated control or is restored from an abnormal condition to a normal condition (e.g., when the system is reset). Further, the multiplex transmission system can ensure uninterrupted execution of control and multiplexing operations of a normal load, as well as resume the interrupted load control and multiplexing operations which require a high degree of reliability and accuracy. The multiplex transmission system is highly resistant to disturbance such as noise, as well as being highly reliable. Moreover, the multiplex transmission system can reliably and accurately control electrical equipment aboard a vehicle such as lamps and an air conditioner. More specifically, the accurate control of a flashing cycle of the lamps, the illuminance of the lamps and lightening actions of a lamp synchronized with door openings, ON/OFF operations of the air conditioner, or the like can be controlled.

In attaining the above objects, according to the invention, there is provided a multiplex transmission system as described below.

The present invention provides a multiplexed transmission system for processing, in a multiplex manner, load control information held in storage parts through a multiplex transmission line and including load control units respectively connected thereto and capable of controlling loads respectively connected to the respective load control units in accordance with the load control information processed in a multiplexed manner. The multiplex transmission system includes a single master load control unit, and one or more slave load control units. The master load control means includes a reset switch capable of urging the forced transfer of the load control information held in the storage part of the master load control means and which also allows the thus forcedly transferred load control information to be held in the respective storage parts of the slave load control means.

A multiplex transmission system of the present invention, in which the master load control unit includes a reset switch which, when the load control information of the master load control unit is updated, can be used not only to urge the forced transfer of the updated load control information to the respective slave load control units but also to allow the thus transferred load control information to be held by the respective storage parts of the slave load control units.

A multiplex transmission system of the present invention, the storage part of the master load control unit can be mounted and removed electrically and also includes a reset switch which, when the storage part with the load control information updated is mounted, can be used not only urge the forced transfer of the updated load control information to the respective slave load control units, but also allows the thus forcedly transferred load control information to be held in the respective storage parts of the slave load control units.

In the multiplex transmission system of the present invention, the load control information held in the storage part of the master load control unit is compared with the load control information respectively held in the storage parts of the slave load control units. When the reset switch is not pressed down and also when there exists any inconsistency between these three pieces of load control information, a majority processing is performed on the load control information of the master load control unit as well as on the load control information of the slave load control units. In accordance with the results of the majority processing, the above-mentioned multiplexing processing can be executed.

In the multiplex transmission system of the present invention, the above-mentioned multiplex processing is executed in accordance with the load control information that is included in the above-mentioned three pieces of load control information respectively held in the master load control unit and the slave load control units, is consistent with any one or two of them and thus occupies a majority among them. When the load control information of the master load control unit and the load control information of the slave load control units are all inconsistent with one another, the above-mentioned multiplexing processing can be carried out in accordance with the load control information of the master load control unit.

To these ends, the present invention provides a multiplex transmission system, a resetting method, and a resetting apparatus as follows:

A multiplex transmission system in accordance with the present invention includes load control units. The load control units are connected to loads, respectively, and they are capable of controlling the loads. Further, the multiplex transmission system processes control specification information relevant to control specifications of the loads or control status information relevant to the result of control of the loads by multiplexing via a multiplex transmission network. The transmission system preferably comprises:

a single master load control unit which is connected to the multiplex transmission network and which includes one of the load control units so as to serve as a master system capable of executing the multiplexing operation based on the control specification information;

at least one slave load control unit which holds the control specification information and is connected to the multiplex transmission network, and which includes one of the load control units so as to serve as a slave system capable of executing the multiplexing operation through the multiplex transmission network, with respect to the master load control unit; and removable nonvolatile external storage unit which is capable of updating and holding the control specification information as required, which is electrically removable with respect to the master load control unit, and which is capable of reading the control specification information, as necessary, while being attached to the master load control unit.

In the multiplex transmission system of the present invention, each of the load control units is preferably provided with nonvolatile storage sections capable of updating and holding the control status information which is relevant to the load control unit and is to be multiplexed, as well as being capable of reading the control status information, as necessary.

In the multiplex transmission system of the present invention, the control specification information or the control status information which is transmitted over the multiplex transmission network is preferably divided into a predetermined number of unit frames which are transmitted as a unit, and the thus divided unit frames are preferably multiplexed.

In the multiplex transmission system of the present invention a frame structure of each unit frame preferably comprises:

a header carrying a communications protocol which is used to multiplex the unit frame through the multiplex transmission network;

a data sequence carrying the control specification information or the control status information; and the header preferably further comprising communication mode information described by the subject of communication when it executes initial-mode communication signifying the multiplexing of the control specification information held in the removable external storage means or normal-mode communication signifying the multiplexing of the control status information;

recognition code information as to whether a sender is the master load control unit or the slave load control unit described by the load control unit, which acts as a sender, when the control specification information or the control status information is transmitted while being divided into the unit frames.

In the multiplex transmission system of the present invention, the header preferably comprises:

frame type information representing whether
the unit frame to be transmitted is an ACK frame signifying the unit frame of the control specification information is to be multiplexed in the environment in which the initial-mode communication is executed or
a normal frame signifying the unit frame of the control status information is to be multiplexed in the environment in which the normal-mode communication is executed.

In the multiplex transmission system of the present invention, the master load control unit preferably divides the control specification information acquired from the removable external storage means during the initial-mode communication into a predetermined number of unit frames. Then the thus divided unit frames are preferably multiplexed one by one between the master load control unit and the slave load control unit in synchronism with an acknowledgement ACK which is sent from the slave load control unit upon successful receipt of the unit frame.

In the multiplex transmission system of the present invention, at the time of the execution of the multiplexing operation for the initial-mode communication, each slave load control unit preferably sends the acknowledgement ACK to the master load control unit when having successfully received the unit frame of the control specification information from the master load control unit;

the master load control unit preferably resends the unit frame once sent until it receives the acknowledgement ACK; and the master load control unit also preferably sends a new unit frame subsequent to the currently sent unit frame upon receipt of the acknowledgement ACK.

In the multiplex transmission system of the present invention, each slave load control unit preferably executes generation of a verification ACK which is checksum information relevant to the control specification information received from the master load control unit;

comparison of the verification ACK and the verification ACK received from the master load control unit;

reexecution of the multiplexing of the unit frames one by one on the basis of the control specification information of the master load control unit if no match arises between the two verification ACK codes;

comparison of the control specification information held in the nonvolatile storage sections of the slave load control unit and the control specification information received from the master load control unit if there is match between the two verification ACK codes; and updating of the contents of the storage section of the slave load control unit so as to be replaced with the control specification information received from the master load control unit, completion of the multiplexing operation for the initial-mode communication, and transition of the communication mode from the initial-mode communication to the normal-mode communication if no match arises between the two control specification information items.

A resetting method preferably makes it possible to detect abnormalities associated with the multiplexing operation carried out in the multiplex transmission system as defined in the first to eighth phases and to reset the load control units so as to restore them from an abnormal condition to a normal condition. The resetting method is characterized by comprising the steps of:

restoring the master load control unit to a normal condition by executing the multiplexing operation with respect to the master load control unit by use of the control status information held in the slave load control unit which is normally executing the normal-mode communication if the master load control unit becomes abnormal during the course of the execution of the normal-mode communication, and if the normal-mode communication is described in the communication mode information;

restoring the slave load control unit to a normal condition by executing the multiplexing operation with respect to the abnormal slave load control unit by use of the control status information held in the slave load control unit or the master load control unit which is normally executing the normal-mode communication if the slave load control unit becomes abnormal during the course of the execution of the normal-mode communication, and if the normal-mode communication is described in the communication mode information; and restoring the slave load control unit to a normal condition by executing the multiplexing operation with respect to the abnormal slave load control unit by use of the control specification information held in the master load control unit if the slave load control unit becomes abnormal during the course of the execution of the normal-mode communication, and if the initial-mode communication is described in the communication mode information.

In the resetting method of the present invention the abnormalities are communication failures in the multiplex transmission network or operation failures of the load control units due to anomalies in the electrical power source.

A resetting apparatus employing the resetting method as defined in the ninth or tenth phase comprises:

an abnormality detecting unit for detecting faulty multiplexing operations arising in each of load control units which execute the multiplexing operation in the multiplex transmission network, and for generating abnormal load control unit information by specifying an abnormal one of the load control units on the basis of the recognition code described in the header; and a recovery control unit for restoring the load control unit which caused the abnormal multiplexing operation to a normal condition by selecting either the initial-mode communication or the normal-mode communication as a restoring operation to be executed according to the abnormal load control unit information, describing the communication mode information in the header when the thus selected restoring operation is executed, and executing the thus selected restoring operation with respect to the abnormal load control unit on the basis of the abnormal load control unit information and the communication mode information.

In the resetting apparatus having the above described configuration, if the master load control unit becomes abnormal during the course of the execution of the normal-mode communication, and if the abnormal load control unit information is generated based on the fact that the normal-mode communication is described in the communication mode information, the recovery control unit preferably restores the master load control unit to a normal condition by executing a multiplexing operation with respect to the master load control unit, using the control status information held in the slave load control unit which is normally executing the normal-mode communication.

If the slave load control unit becomes abnormal during the course of the execution of the normal-mode communication, and if the abnormal load control unit information is generated based on the fact that the normal-mode communication is described in the communication mode information, the recovery control unit preferably restores the slave load control unit to a normal condition by executing a multiplexing operation with respect to the slave load control unit, using the control status information held in the slave load control unit or the master load control unit which is normally executing the normal-mode communication.

If the slave load control unit becomes abnormal during the course of the execution of the normal-mode communication, and if the abnormal load control unit information is generated based on the fact that the initial-mode communication is described in the communication mode information, the recovery control unit preferably restores the slave load control unit to a normal condition by executing a multiplexing operation with respect to the slave load control unit, using the control specification information held in the master load control unit.

Initially, a description will be given below of the operation of the multiplex transmission system according to the present invention.

The multiplex transmission system according to the invention, which comprises a single master load control unit and one or more slave load control units, can process in a multiplexed manner several pieces of load control information respectively held in the storage part of the master load control unit and the storage parts of the slave load control unit through a multiplex transmission line.

Between the single master load control unit and one or more one slave load control units, there is a previously established priority in communication. The priority of the master load control unit is the highest. Also, between the slave load control units, there is a previously established priority in a given order.

The load control information, which consists of the control contents of the loads, includes the type of the loads (for example, electric devices carried on board a vehicle, such as lights, an air conditioner and the like), and load control methods (such as, a method for controlling the turn-on or turn-off cycles of the lights, a method for controlling the intensity of the turn-on illumination of the lights, a method for controlling the turn-on of the lights in linking with a vehicle door, a method for controlling the supply of electric power to the air conditioner for turning it on or off, and the like).

The slave load control unit is able to control the load connected to the slave load control unit in accordance with the load control information that has been multiplexingly processed.

Next, description will be given below of the operation of the multiplexing processing to be performed in the present multiplex transmission system.

During multiplexed processing in the present multiplex transmission system, the order (so called priority) of transmission of the respective load control units is previously established.

The master load control unit, at first, transmits the load control information held in its own storage part. After then, if the master load control unit completes the transmission of its own load control information, then it enters into an information reception wait state. After then, if it completes the reception of the load control information held in the storage part of a first slave load control unit, then it enters again into the information reception wait state. And, if it completes the reception of the load control information held in the storage part of a second slave load control unit, in a system having two slave control units then it enters into a next state, that is, a majority processing wait state.

Also, the first slave load control unit is firstly set in an information reception wait state. If the slave load control unit completes the reception of the load control information from the master load control unit, then it starts transmission and, after then, if it completes the transmission, then it turns into an information reception wait state. After then, if it completes the reception of the load control information from the second slave load control unit, then it turns into a next state, that is, a majority processing wait state.

Similarly, the second slave load control unit is at first set in an information reception wait state. After then, if it receives the load control information from the master load control unit and completes the reception, then it turns again into the information reception wait state. After then, the slave load control unit receives the load control information from the first slave load control unit and completes the reception, then it starts the transmission thereof and, if it completes the transmission, then it turns into a next state, that is, a majority processing wait state.

Next, description will be given below of the operation of the reset switch provided in the master load control unit.

If the reset switch provided in the master load control unit is pressed down, then the present multiplex transmission system not only can urge the forced transfer of the load control information held in the storage part of the master load control unit to the respective slave load control units but also allows the thus forcibly transferred load control information to be held respectively in the storage parts of the slave load control units.

Also, when the load control information held in the storage part of the master load control unit is updated, if the reset switch is depressed, then the multiplex transmission system not only can urge the forced transfer of the updated load control information to the respective slave load control units but also permits the thus forcibly transferred load control information to be held respectively in the storage parts of the slave load control units.

This makes it possible to realize the present multiplex transmission system which can accurately transmit the updated load control information of the master load control means to the respective slave load control means. That is, according to the present multiplex transmission system, various kinds of electric devices carried on board a vehicle, such as lights, an air conditioner and the like can be controlled accurately. In particular, the load control methods (such as, a method for controlling the turn-on or turn-off cycles of the lights a method for controlling the intensity of the turn-on illumination of the lights, a method for controlling the turn-on of the lights in linking with a vehicle door, a method for controlling the supply of electric power to the air conditioner for turning it on/off, and the like) can be realized with accuracy.

Next, description will be given below of the operation of the reset switch when there is employed a storage part which can be electrically mounted and removed.

The storage part of the master load control unit can be mounted and removed electrically if it is formed of a nonvolatile memory such as an EEPROM or the like.

When the electrically mountable and removable storage part is employed, the multiplex transmission system can be operated as follows. When the storage part with the updated load control information is mounted, if the reset switch is pressed down, then the multiplex transmission system not only can urge the forced transfer of the updated load control information to the respective slave load control units, but also allows the thus transferred load control information to be held by the respective storage parts of the slave load control units.

This makes it possible to realize a multiplex transmission system which not only facilitates the updating of the load control information but also, when a new storage part with the load control information thereof updated is mounted electrically, can transmit the updated load control information of the master load control unit to the respective slave load control units. That is, according to the present multiplex transmission system, electric devices carried on board the vehicle, such as lights, an air conditioner and the like can be controlled accurately. In particular, the load control methods (such as, a method for controlling the turn-on or turn-off cycles of the lights, a method for controlling the intensity of the turn-on illumination of the lights, a method for controlling the turn-on of the lights in linking with a vehicle door, a method for controlling the supply of electric power to the air conditioner for turning it on/off, and the like) can be realized with accuracy.

Next, a description will be given below of the operation of a majority processing to be executed in the multiplex transmission system.

The multiplex transmission system not only can compare the load control information held by the storage part of the master load control unit with the load control information held by the storage parts of the respective slave load control units but also, when the reset switch is not pressed down and also when there exists any inconsistency between the two kinds of load control information, can carry out a majority processing on the load control information of the master load control unit as well as on the load control information of the slave load control units and, in accordance with the results of the majority processing, can execute a multiplexed processing.

Also, the multiplex transmission system can carry out a multiplexed processing in accordance with the load control information that is included in the load control information of the master load control unit and the load control information of the respective slave load control units and which is consistent with a majority of them.

That is, if two of the three pieces of load control information including the load control information of the master load control unit and the load control information of the respective slave load control units are consistent with each other, then this load control information is used as the load control information that is consistent and occupies a majority, while a multiplexed processing is performed on the load control unit that holds the remaining or inconsistent load control information.

Further, when the electrically mountable and removable storage part is employed, the multiplex transmission system can be operated as follows: that is, when the storage part with the updated load control information is newly mounted, if the reset switch is pressed down, the multiplex transmission system not only can urge the forced transfer of the updated load control information to the respective slave load control units but also permits the thus transferred load control information to be held by the storage parts of the slave load control units.

This prevents the newly updated load control information of the master load control unit from being multiplexingly processed in accordance with the load control information of the slave load control units that is consistent with each other and occupies a majority, thereby being able to urge the forced transfer of the newly updated load control information to the respective slave load control units.

In other words, when a new storage part with the updated load control information is mounted electrically, the updating of the load control information of the master load control unit can be transmitted to the respective slave load control units with accuracy, so that electric devices carried on board the vehicle such as lights, an air conditioner and the like can be controlled accurately; in particular, accurate load control methods (such as, a method for controlling the turn-on or turn-off cycle of the lights, a method for controlling the intensity of the turn-on illumination of the lights, a method for controlling the turn-on of the lights in linking with a vehicle door, a method for controlling the supply of electric power to the air conditioner for turning it on/off, and the like) can be realized.

Further, according to the present multiplex transmission system, when the load control information of the master load control unit and the load control information of the respective slave control units are all inconsistent, a multiplexing processing can be carried out in accordance with the load control information of the master load control units.

That is, when the load control information held by the storage part of the master load control unit and the two pieces of load control information respectively held by the storage parts of the slave control units are all inconsistent with one another, a multiplexing processing giving priority to the load control information held by the storage part of the master load control unit over the others is carried out on the storage part of the first slave load control unit as well as on the storage part of the second slave load control unit.

This makes it possible to realize a multiplex transmission system which can execute multiplexing processing in a highly reliable manner. That is, electric devices carried on board the vehicle such as lights, an air conditioner and the like can be controlled accurately; in particular, accurate load control methods (such as a method for controlling the turn-on or turn-off cycles of the lights, a method for controlling the intensity of the turn-on illumination of the lights, a method for controlling the turn-on of the lights in linking with a vehicle door, a method for controlling the supply of electric power to the air conditioner for turning it on/off, and the like) can be realized.

According to the multiplex transmission system of the embodiment and the resetting method and the resetting apparatus for use therewith, it becomes possible to transfer the control specification information, which is held in the removable external storage unit electrically attachable to the master load control unit, to each of the slave load control units. Further, it becomes possible to hold the thus transferred control specification information in each of the nonvolatile storage sections of the slave load control units. As a result, it becomes possible to easily, quickly, accurately initialize the multiplex transmission system.

As a result of the use of the electrically removable external storage unit, it becomes easy, quick, accurate to design the multiplex transmission system which uses new control specification information located at a place spaced apart from the current multiplex transmission system.

In short, it is possible to easily, quickly, and accurately transfer the control specification information of the master load control unit to the slave load control units, which in turn makes it possible to easily, quickly, and accurately control electrical equipment aboard a vehicle such as lamps and an air conditioner (e.g., the accurate control of a flashing cycle of the lamps, the illuminance of the lamps and lightening actions of a lamp synchronized with door openings, and the control of supply of electrical power such as ON/OFF operations of the air conditioner).

According to the multiplex transmission system of the present embodiment, and the resetting method and the resetting apparatus for use therewith, when the updated control specification information is transferred to the slave load control units, the master load control unit transmits a frame in synchronism with the acknowledgement ACK. The checksum information with respect to the control specification information which has been sent while having divided into the unit frames can be sent to each of the slave load control units as the verification ACK.

In consequence, it becomes possible to realize the multiplex transmission system which is highly resistant to disturbance such as noise as well as is highly reliable. Moreover, the multiplex transmission system can highly reliably, and accurately control electrical equipment aboard a vehicle such as lamps and an air conditioner, and more specifically, the control of a flashing cycle of the lamps, the illuminance of the lamps and lightening actions of a lamp synchronized with door openings, ON/OFF operations of the air conditioner, or the like.

According to the multiplex transmission system of the present embodiment and the resetting method and the resetting apparatus for use therewith, the master load control unit can selectively enter a transmission mode according to a predetermined rule so as to start the initial-mode communication when restoring (e.g., resetting) the load control unit from an abnormal condition. The multiplexing of the control specification information held in the master load control unit can be selectively executed with respect to other load control units (i.e., the slave load control units) according to a predetermined rule. Accordingly, it is possible to prevent the normally operating load control units from being forcibly subjected to the initial-mode communication when the load control unit is restored (e.g., reset) from an abnormal condition to a normal condition.

Further, it is possible to prevent the normally operating load control units from being forcibly subjected to the initial-mode communication which uses the control specification information or control status information of the master load control unit. As a consequence, the control and multiplexing operations of the normal loads executed by the normally operating load control units are not interrupted. Therefore, the multiplex transmission system becomes possible to ensure uninterrupted execution of control and multiplexing operations of the normal loads.

In short, it is possible to prevent the execution of the control and multiplexing operations of the loads on the basis of the initial-mode communication by interrupting the control and multiplexing operations of the normally operating loads when the load control unit is restored (e.g., reset) from an abnormal condition to a normal condition. Consequently, the multiplex transmission system becomes possible to ensure uninterrupted execution of control and multiplexing operations of the normal loads. As a result, it becomes possible to resume the interrupted load control and multiplexing operations which require a high degree of reliability and accuracy. Further, it becomes possible to realize the multiplex transmission system which is highly resistant to disturbance such as noise as well as is highly reliable. Moreover, the multiplex transmission system can highly reliably, and accurately control electrical equipment aboard a vehicle such as lamps and an air conditioner, and more specifically, the control of a flashing cycle of the lamps, the illuminance of the lamps and lightening actions of a lamp synchronized with door openings, ON/OFF operations of the air conditioner, or the like.

BRIEF DESCRIPTION OF THE DRAWINGS

FIGS. 12(*a*) to 12(*d*) are time sequence diagrams showing a multiplexing operation executed by the multiplex transmission system and the resetting apparatus during the initial-mode communication which is carried out in an abnormal condition according to a second embodiment of the present invention;

DETAILED DESCRIPTION OF THE PREFERRED EMBODIMENTS

Figure 1:
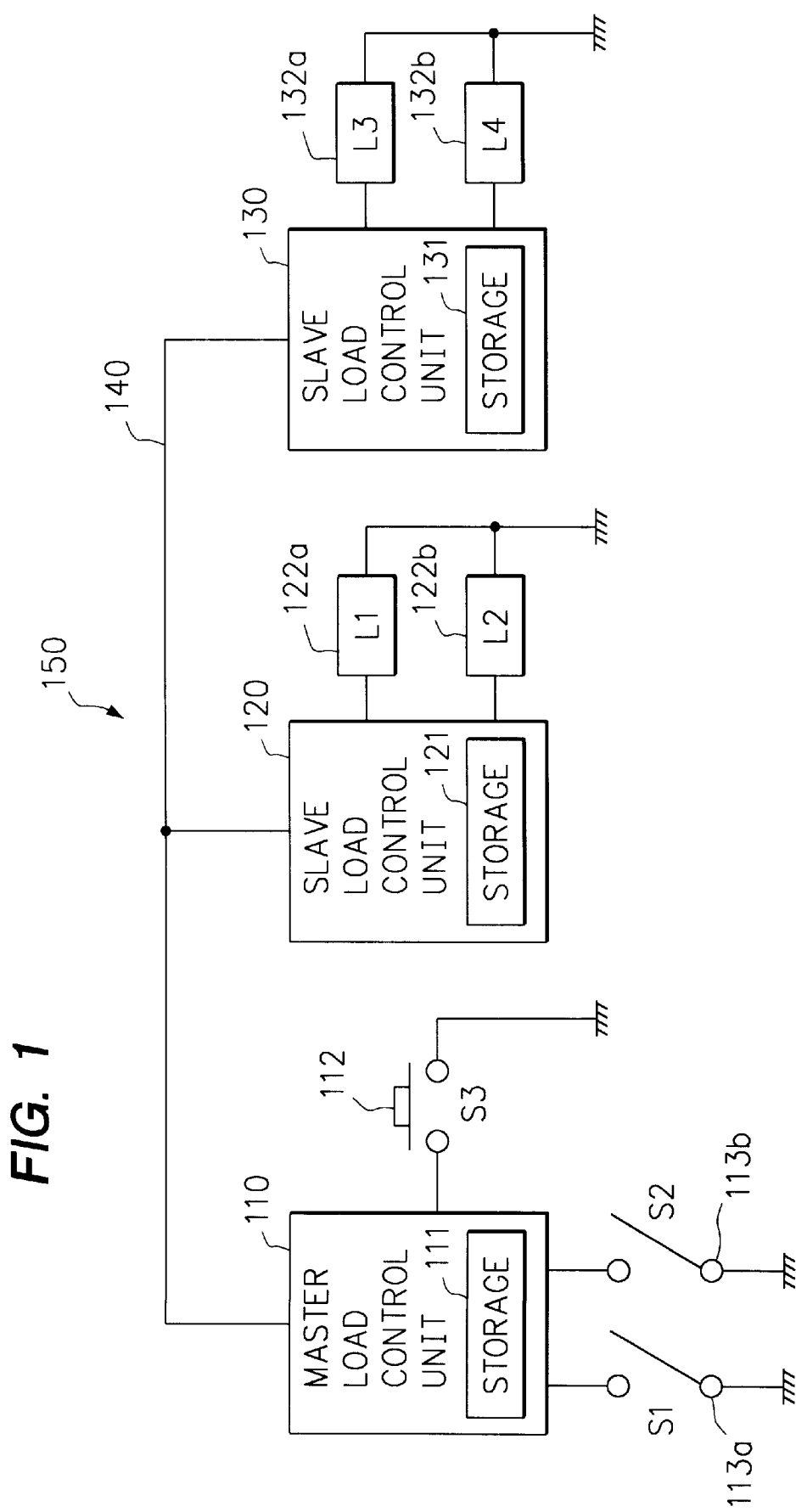
FIG. 1 is a functional block diagram of a first embodiment of a multiplex transmission system according to the present invention.

Now, a description will be given below of an embodiment of a multiplex transmission system according to the present invention with reference to the accompanying drawings.
First Embodiment At first, FIG. 1 is a functional block diagram of a first embodiment of a multiplex transmission system 150 according to the present invention, and FIG. 2 is a functional block diagram of a first embodiment of a multiplex transmission system 150 according to the present invention, when it includes a master load control unit 110 with storage part 111 which can be mounted and removed.

The multiplex transmission system 150 according to the present embodiment is a multiplex transmission system for use in a vehicle, which includes load control units connected thereto in such a manner that they are able to control the supply of power to electric devices carried on board the vehicle as loads such as lights, an air conditioner and the like. That is, as shown in FIG. 1 or 2, the present multiplex transmission system 150 includes load control units which not only can process in a multiplexed manner several pieces of load control information respectively held by their respective storage parts 111, 121 and 131 through a multiplex transmission line 140 but also can control loads 122a, 122b, 132a, 132b respectively connected to the respective load control units in accordance with the load control information that has been processed in a multiplexed manner.

Figure 2:
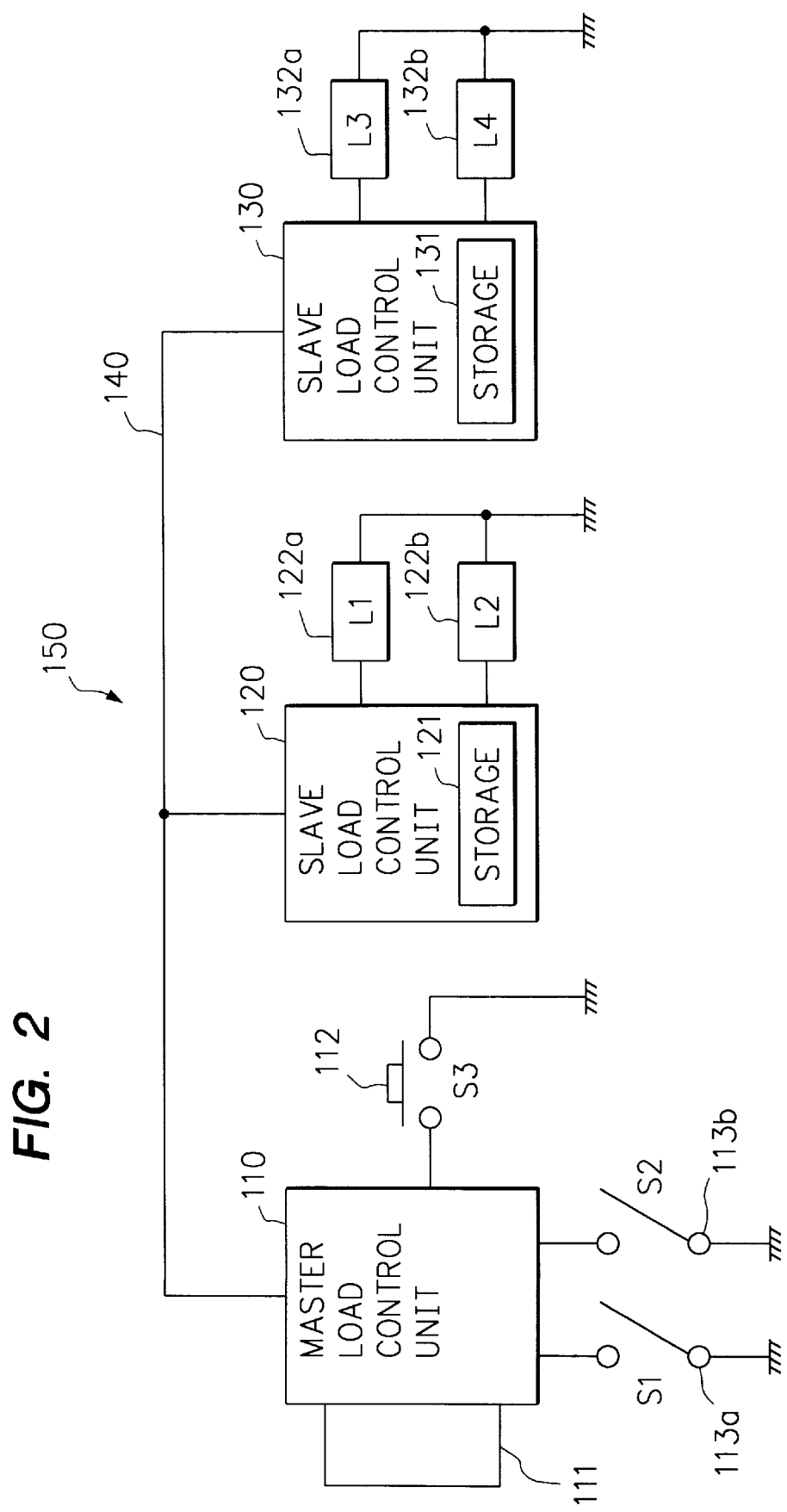
FIG. 2 is a functional block diagram of an embodiment of a multiplex transmission system according to the present invention, including master load control unit having a removable storage part.

The load control units, as shown in FIG. 1 or 2, include a single master load control unit 110 and one or more slave load control units 120, 130.

Each of the master load control unit 110 and slave load control units 120, 130 includes therein a communication I/F circuit for transferring (that is, communicating in a multiplexed manner) the load control information between them through the multiplex transmission line 140, an input I/F circuit to which are connected a plurality of switches and sensors (such as a temperature sensor and the like), an output I/F circuit to which are connected a plurality of loads such as lights, motors, an air conditioner and the like, a ROM (read-only memory) for storing previously determined programs (inclusive of communication protocol for multiplex transmission) and fixed data, a RAM (random access memory) used as a work area when executing a job determined by a control program, a non-volatile memory (in the present embodiment, an EEPROM is used) for recording and holding load control information, and a CPU for carrying out a multiplexing processing and a majority processing. Here, the output I/F circuit includes a diagnostic output which outputs a signal indicating that the load is out of order.

A CPU, which is incorporated in the master load control unit 110 according to the present embodiment, not only compares load control information held in the storage part (EEPROM) 111 of the master load control unit 110 with load control information held in the storage parts (EEPROM) 121, 131 of the slave load control units 120, 130 but also, when the reset switch 112 is not pressed down and also when there exists any inconsistency between the above-mentioned three pieces of load control information, executes a majority processing on the respective pieces of load control information of the master load control unit 110 and slave load control units 120, 130 and, in accordance with the results of the majority processing, carries out a multiplexing processing.

Also, the CPU incorporated in the master load control unit 110 not only performs a multiplexing processing in accordance with the load control information that is included in the three pieces of load control information respectively held in the master load control unit 110 and slave load control units 120, 130, and which is consistent with any other piece of load control information and thus occupies a majority among them, but also, when the three pieces of load control information of the master load control unit 110 and slave load control units 120, 130 are all inconsistent, carries out a multiplexing processing in accordance with the load control information of the master load control means 110.

Similarly, CPUs respectively incorporated in the slave load control units 120, 130 according to the present embodiment not only assist the CPU of the master load control unit 110 in the multiplexing processing and majority processing in synchronization with the CPU of the master load control unit 110, but also individually carry out internal processings such as updating of the storage parts (EEPROMs) 121, 131 and the like within the slave load control units 120, 130.

In the present embodiment, the multiplexed processing and majority processing are carried out mainly by the CPU of the master load control unit 110, while the CPUs of the slave load control units 120, 130 are used as the assistants of the CPU of the master load control unit 110. However, other arrangements are also possible. For example, it is also possible to provide within the multiplex transmission line 140 a master CPU which can control all of the master load control unit 110 and slave load control units 120, 130. That is, the master CPU may be used to play a main role in executing the multiplexed processing and majority processing, while the CPUs of the master load control unit 10 and slave load control units 120, 30 may be respectively used as assistants to assist the master CPU in the multiplexed processing and majority processing thereof.

In the storage part (EEPROM) 111 provided in the master load control unit 110, there are written and held various pieces of load control information consisting of the control contents of switches and loads provided according to vehicle specifications.

When assembling the multiplex transmission system, if the storage part (EEPROM) 111 is electrically mounted onto the master load control unit 110, then a multiplexed processing is executable so that the load control information corresponding to the specifications (that is, the contents of the loads) of individual vehicles can be transferred to the slave load control units 120 and 130.

Here, the load control information consisting of the control contents of the loads indicates the kinds of the loads, for example, electric devices carried on board the vehicle such as lights, an air conditioner and the like, and load control methods such as, a method for controlling the turn-on or turn-off cycles of the lights, a method for controlling the intensity of the turn-on illumination of the lights, a method for controlling the turn-on of the lights in linking with a vehicle door, a method for controlling the supply of electric power to the air conditioner for turning it on/off, and the like.

In the present embodiment, alternatively, as shown in FIG. 2, instead of mounting the storage part 111 within the master load control means 110, a non-volatile memory (for example, EEPROM) serving as the storage part 111 may be arranged in a mountable and removable form (for example, an IC card, an IC connector or the like) and, as the need arises, the non-volatile memory may be inserted into a read unit provided in the master load control unit 110, so that a desired piece of load control information can be read into the master load control unit 110. In the present embodiment, non-volatile memories are used as the storage parts 111, 121 and 131. However, the invention is not limited to this but it is also possible to use other storage media, for example, magnetic recording devices (such as a magnetic card, a magnetic disc, a bubble memory or the like), magneto-optic devices (such as an MO disc or the like) and the like, provided that it is able to update, store and hold the load control information a given number of times as the need arises.

The multiplex transmission line 140 employed in the present embodiment is a signal line through which information is transmitted and received and it is formed of a length of optical fiber cable. According to the present embodiment, as the multiplex transmission line 140, it is also possible to use a wire harness (WH) formed by bundling up a coaxial cable and a pair of twist wires. However, given that the wire harness is greater in diameter and weight, the optical fiber cable is preferred.

The reset switch 112 provided in the master load control unit 110 is used not only to urge the forced transfer of the load control information held in the storage part (EEPROM) 111 of the master load control unit 110 to the respective slave load control units 120 and 130 but also to allow the thus transferred load control information to be held by the respective storage parts (EEPROM) 121 and 131 of the slave load control units 120 and 130. Here, the forced transfer refers to, when the reset switch 112 is pressed down and thus the reset condition is effective, taking priority over the majority processing and multiplexed processing or interrupting these processings temporarily, so that the load control information held in the storage part (EEPROM) 111 of the master load control unit 10 is transferred to the respective slave load control units 120 and 130.

Also, the reset switch 112 employed in the present embodiment is further arranged such that, when an external rewrite unit is connected to the master load control unit 110 and thus the load control information of the master load control unit 110 is updated by the rewrite unit, it urges the forced transfer of the updated load control information to the respective slave load control unit 120 and 130 as well as allows the thus transferred load control information to be held by the respective storage parts (EEPROM) 121 and 131 of the slave load control units 120 and 130. In this case, the forced transfer refers to, when the reset switch 112 is pressed down and thus the reset condition is effective, taking priority over the majority processing and multiplexed processing or interrupting these processings temporarily, the new load control information that has been updated and held in the storage part (EEPROM) 111 of the master load control unit 110 is transferred to the respective slave load control units 120 and 130.

Further, even when the storage part 111 of the master load control unit 110 is arranged in the form of an IC card, an IC connector or the like that can be mounted and removed electrically, the reset switch 112 according to the present embodiment can be operated quite similarly to the above cases. That is, when the storage part 111 (such as an IC card, an IC connector or the like) with the load control information thereof updated is newly mounted, the reset switch 112 is used not only to urge the forced transfer of the updated load control information to the respective slave load control units 120 and 130 but also to allow the thus transferred load control information to be held by the respective storage parts (EEPROM) 121 and 131 of the slave load control units 120 and 130. In this case, the term "forced transfer" refers to, when the reset switch 112 is pressed down and thus the reset condition is effective, taking priority over the majority processing and multiplexed processing or interrupting these processings temporarily, the new load control information that has been updated and held in the storage part (an IC card, an IC connector or the like) 111 of the master load control unit 110 is transferred to the respective slave load control units 120 and 130.

In the present embodiment, an shown in FIGS. 1 and 2, various types of switches can be used as the reset switch 112, including a mechanical switch (such an a push-button switch, a slide switch, a toggle switch or the like), an electronic switch (such as an electrostatic capacity detect type switch, an ohm resistance detect type switch or the like), and the like.

Next, a description will be given below of the operation of the present embodiment.

Figure 3:
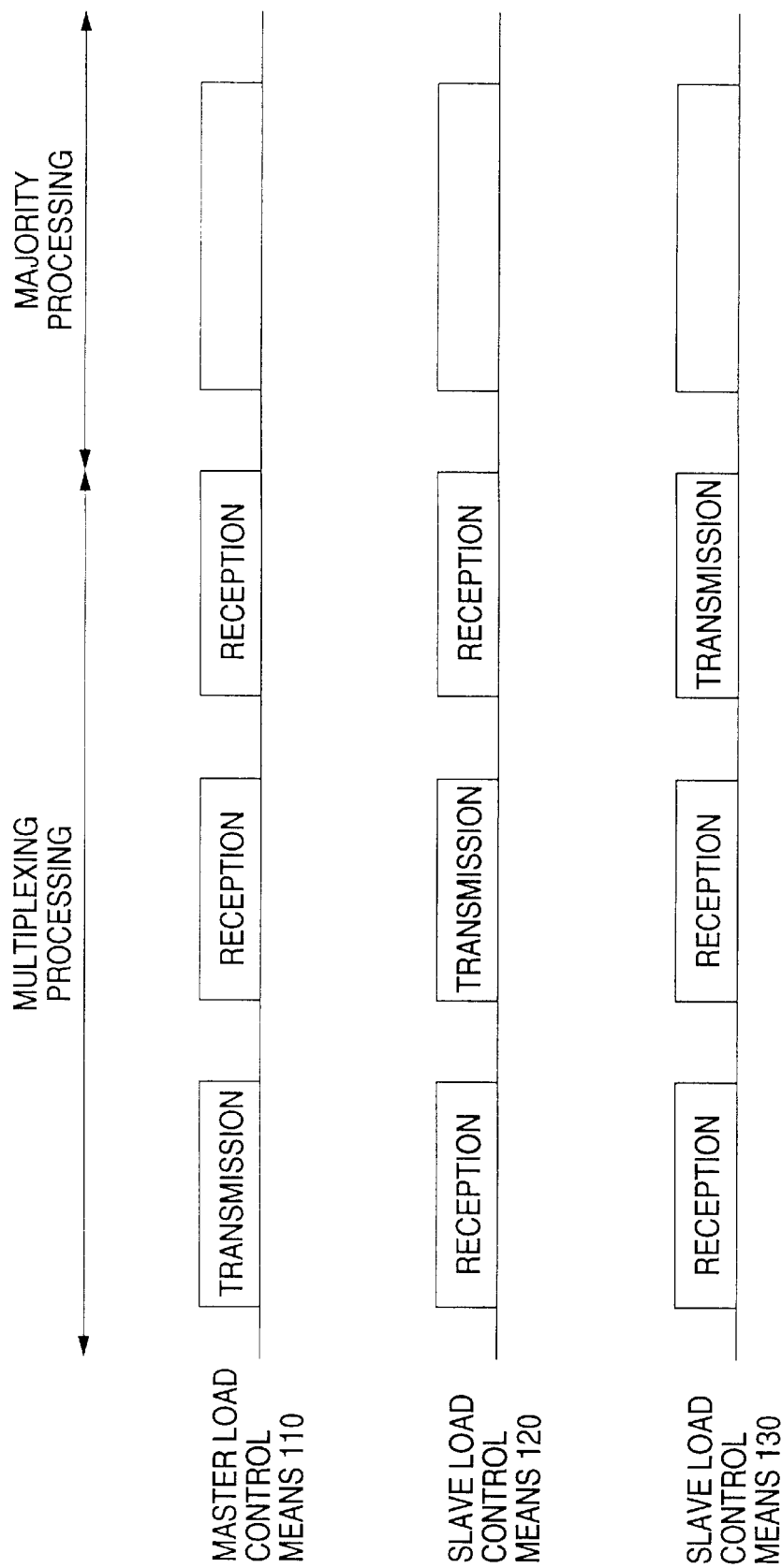
FIG. 3 is a time sequence diagram of a multiplexed processing and a majority processing to be performed on load control information employed in an embodiment of a multiplex transmission system according to the present invention.

Now, FIG. 3 is a time sequence diagram of the multiplexed processing and majority processing to be performed on the load control information in the multiplex transmission system 150 according to the present embodiment of the invention.

Figure 4:
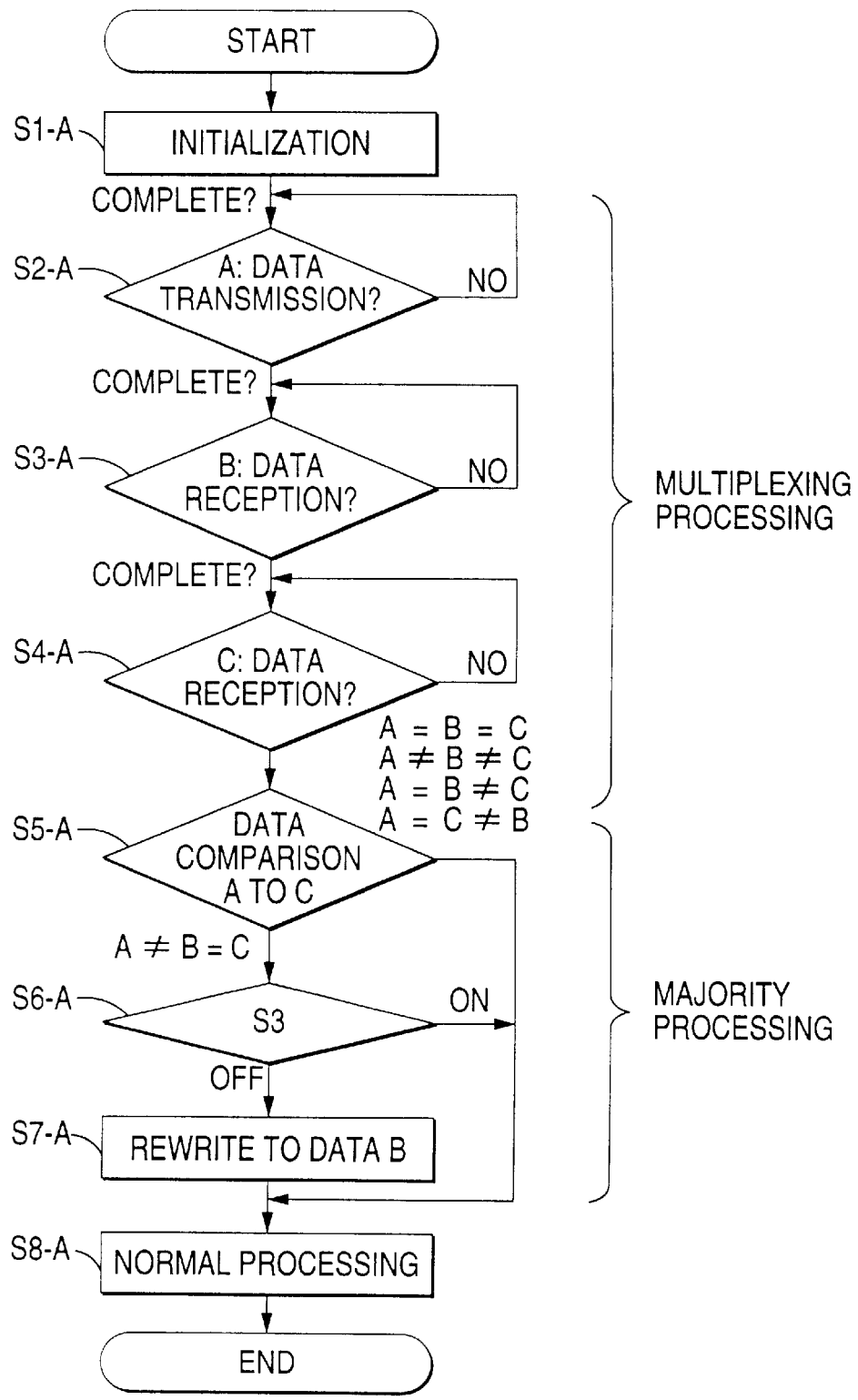
FIG. 4 is a flow chart of a multiplexed processing and a majority processing to be performed on the load control information of master load control unit employed in an embodiment of a multiplex transmission system according to the present invention.
Figure 5:
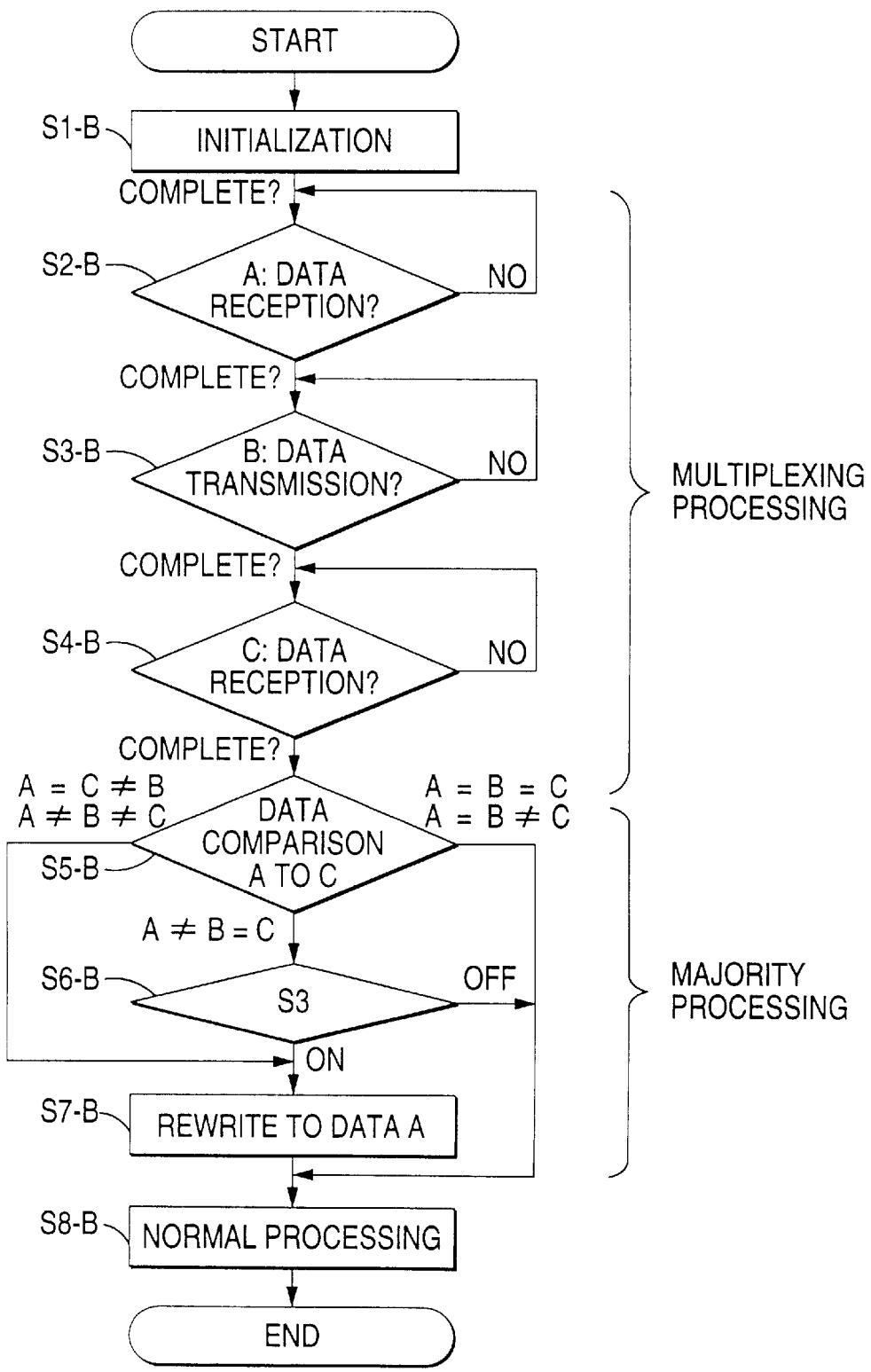
FIG. 5 is a flow chart of a multiplexed processing and a majority processing to be performed on the load control information of one slave load control unit employed in an embodiment of a multiplex transmission system according to the present invention.
Figure 6:
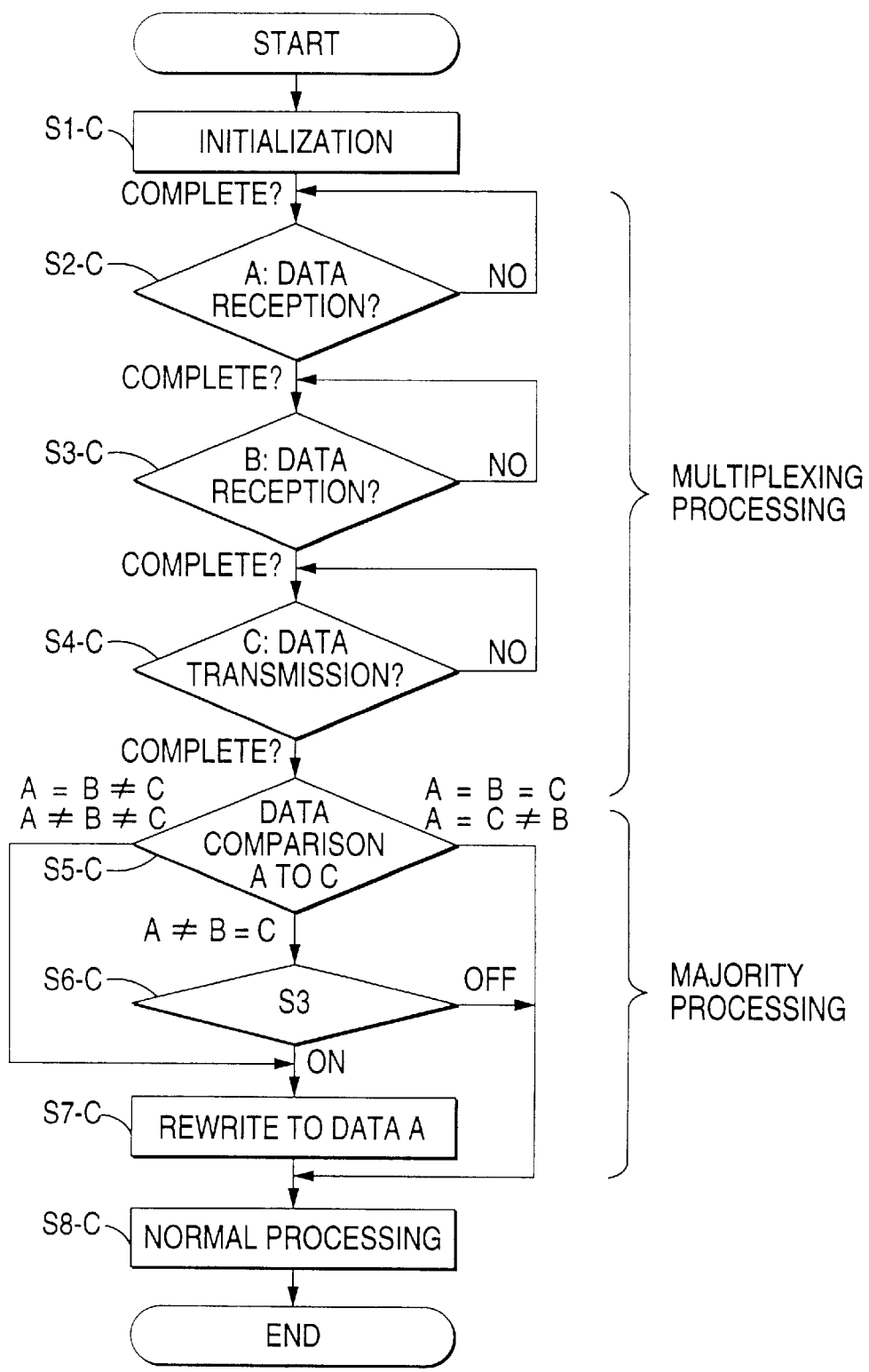
FIG. 6 is a flow chart of a multiplexed processing and a majority processing to be performed on the load control information of the other slave load control unit employed in an embodiment of a multiplex transmission system according to the present invention.

Also, FIG. 4 is a flow chart of the multiplexed processing and majority processing on the load control information in the master load control unit 110 of the multiplex transmission system 150 according to an embodiment of the present invention, FIG. 5 is a flow chart of the multiplexed processing and majority processing on the load control information in one slave load control units 120 of the multiplex transmission system 150 according to an embodiment of the present invention, and FIG. 6 is a flow chart of the multiplexed processing and majority processing on the load control information in the other slave load control unit 130 of the multiplex transmission system 150 according to an embodiment of the present invention.

The multiplex transmission system 150 according to the present embodiment includes a single master load control unit 110 and at least one slave load control unit 120, 130. The present system 150 is able to perform multiplexed processings on three pieces of load control information respectively held in the storage part (EEPROM) 111 of the master load control unit 10 and in the storage parts 121, 131 of the respective slave load control units 120, 130 through a multiplex transmission line (an optical fiber cable) 140.

Further, the multiplex transmission system 150 according to the present embodiment not only can compare the load control information held in the storage part (EEPROM) 111 of the master load control unit 110 with the two pieces of load control information respectively held in the storage parts (EEPROM) 121, 131 of the slave load control units 120, 130, but also can detect inconsistency between these three pieces of load control information to execute a majority processing on the load control information of the master load control unit 110 as well as on the load control information of the respective slave load control units 120, 130 and, in accordance with the results of the majority processing, can carry out a multiplexed processing.

In the multiplexed processing, between the single master load control unit 110 and one or more slave load control units 120, 130, there is previously established priority in communication. The master load control unit 110 is given the highest priority. Also, between the two slave load control units 120 and 130, priority can be previously determined in a given order.

The load control information, which consists of the control contents of the loads, indicates the kinds of the loads, for example, electric devices carried on board the vehicle such as lights, an air conditioner and the like, and the control methods including a method for controlling the on-off cycles of the lights, a method for controlling the intensity of the turn-on illumination and the turn-on of the lights in linking with a vehicle door, and a method for controlling the supply of power to the air conditioner for turning it on or off.

Next, a description will be given below of the operation of the multiplexed processing to be performed in the multiplex transmission system 150 according to the present embodiment by use of FIGS. 3 to 6.

In the multiplexing processing, between the single master load control unit 110 and at least one slave load control units 120, 130, there is previously determined an order of communication, so called priority, of the respective load control units. The master load control unit 110 is given the highest priority. Also, between the two slave load control units 120 and 130, priority can be previously determined in a given order.

The CPU mounted in the master load control unit 110 according to the present embodiment, as shown in FIGS. 3 and 4, after execution of initialization (Step S1-A), at first, transmits the load control information held in its own storage part (EEPROM) 11 (Step S2-A) and, then, if it completes the transmission of its own load control information (Step S2-A), it turns into an information reception wait state (Step S3-A). Then, if the CPU completes reception of the load control information held in the storage part 121 of the slave load control means 120, then it turns again into the information reception wait state (Step S4-A). And, if it completes reception of the load control information held in the storage part 131 of the slave load control means 130 (Step S4-A), then it turns into a next state, that is, a majority processing (Steps S5-A to S7-A) wait state. Also, if the majority processing (Steps S5-A to S7-A) is completed, then the CPU executes a normal processing (Step S8-A).

Also, the CPU mounted in the slave load control unit 120 according to the present embodiment, as shown in FIGS. 3 and 5, after execution of initialization (Step S1-B), at first, turns into an information reception wait state (Step S2-B) and, if it completes reception of the load control information from the master load control unit 110, then it starts transmission (Step S3-B). Then, if the transmission (Step S3-B) is completed, then the CPU turns again into the information reception wait state (Step S3-B) and, if it completes reception of the load control information from the slave load control unit 130 (Step S4-B), then it turns into a next majority processing (Steps S5-B to S7-B) wait state. Also, if the majority processing (Steps S5-B to S7-B) is completed, then the CPU carries out a normal processing (Step S8-B).

Similarly, the CPU mounted in the slave load control unit 130, as shown in FIGS. 3 and 6, after execution of initialization (Step S1-C), at first, turns into an information reception wait state (Step S2-C) and, if it completes reception of the load control information from the master load control unit 110, then it turns again into the information reception wait state (Step S3-C). After then, if the CPU completes reception of the load control information from the slave load control unit 120, then it starts transmission (Step S4-C) and, if the transmission (Step S4-C) is completed, then it turns into a next majority processing (Steps S5-C to S7-C) wait state. Also, if the majority processing (Steps S5-C to S7-C) is completed, then the CPU executes a normal processing (Step S8-C).

The CPU, which is mounted in the master load control unit 110 according to the present embodiment, not only compares the load control information held in the storage part (EEPROM) 111 of the master load control unit 110 with the respective pieces of load control information respectively held in the storage parts (EEPROM) 121 and 131 of the slave load control units 120 and 130 but also, when the reset switch 112 is pressed down and also when there exists any inconsistency between the above-mentioned three pieces of load control information, executes a majority processing on the load control information of the master load control unit 110 as well as on the load control information of the respective slave load control units 120 and 130 and, in accordance with the results of the majority processing, carries out a multiplexed processing.

Also, the CPUs respectively mounted in the slave load control units 120 and 130 according to the present embodiment, in synchronization with the CPU of the master load control unit 110, respectively assist the CPU of the master load control unit 110 in the multiplexed processing and majority processing that are carried out mainly by the CPU of the master load control unit 110 and, at the same time, they individually carry out their respective internal processings such as updating of the storage parts (EEPROM) 121 and 131 in the slave load control units 120 and 130.

Due to this, the CPUs respectively mounted in the slave load control units 120 and 130 are respectively able to control the load 122a or 122b and the load 132a or 132b respectively connected to the slave load control units 120 and 130, in accordance with the load control information that has been processed in a multiplexed manner.

Next, a description will be given below of the operation of the reset switch 112 provided in the master load control unit 110.

If the reset switch 112 provided in the master load control unit 110 shown in FIG. 1 or 2 is pressed down, then the CPU mounted in the master load control unit 110 according to the present embodiment not only can urge the forced transfer of the load control information held in the storage part (EEPROM) 111 of the master load control unit 110 to the respective slave load control units 120 and 130 but also allows the thus transferred load control information to be held by the respective storage parts 121 and 131 of the slave load control units 120 and 130.

If the forced transfer is executed, then taking priority over the majority processing and multiplexed processing or interrupting these processings provisionally, the load control information held in the storage part (EEPROM) 111 of the master load control unit 110 is transferred to the respective slave load control units 120 and 130.

Also, when the load control information held in the storage part (EEPROM) 111 of the master load control unit 110 is updated, if the reset switch 112 is depressed, then the CPU mounted in the master load control unit according to the present embodiment not only can urge the forced transfer of the updated load control information to the respective slave load control units 120 and 130 but also allows the thus transferred load control information to be held by the respective storage parts 121 and 131 of the slave load control units 120 and 130.

If the forced transfer is executed, then taking priority over the majority processing and multiplexed processing or interrupting these processings provisionally, new load control information updated and held in the storage part (EEPROM) 111 of the master load control unit 110 is transferred to the respective slave load control units 120 and 130.

Thanks to this, it is possible to realize a multiplex transmission system 150 which can transmit the updated load control information of the master load control unit 110 to the respective slave load control units 120 and 130 with accuracy. That is, according to the present multiplex transmission system 150, electric devices carried on board the vehicle such as lights, an air conditioner and the like can be controlled accurately. In particular, the on-off cycles of the lights, the intensity of the turn-on illumination of the lights and the turn-on of the lights in linking with a vehicle door can be controlled accurately. Also, the supply of power to the air conditioner for turning it on or off can be controlled accurately.

Next, a description will be given below of the operation of the reset switch 112 when an electrically mountable and removable storage part 111 is used.

If an IC card or an IC connector incorporating an EEPROM or the like therein is used as the storage part 111 of the master load control unit 110, the storage part 111 can be mounted and removed electrically.

When the electrically mountable and removable storage part 111 (such as an IC card, an IC connector or the like) is employed, if the reset switch 112 is pressed down when a storage part 111 with the load control information thereof updated is newly mounted, then the CPU mounted in the master load control unit 110 according to the present embodiment not only can urge the forced transfer of the updated load control information to the respective slave load control units 120 and 130 but also permits the thus transferred load control information to be held by the respective storage parts 121 and 131 of the slave load control units 120 and 130.

If the forced transfer is executed, then taking priority over the majority processing and multiplexed processing or interrupting these processings temporarily, the new load control information updated and held in the storage part (an IC card, an IC connector or the like) 111 of the master load control unit 110 is transferred to the respective slave load control units 120 and 130.

This facilitates the updating of the load control information, which makes it possible to realize a multiplex transmission system 150 which, when a new storage part 111 with the load control information updated is mounted electrically, is able to transmit the updated load control information of the master load control unit 110 to the respective slave load control units 120 and 130 accurately. Therefore, according to the present multiplex transmission system 150, electric devices carried on board the vehicle such as lights, an air conditioner and the like can be controlled accurately. In particular, the on-off cycles of the lights, the intensity of the turn-on illumination of the lights and the turn-on of the lights in linking with a vehicle door can be controlled accurately. Also, the supply of power to the air conditioner for turning it on or off can be controlled accurately.

Next, a description will be given below of the operation of the majority processing to be performed in the multiplex transmission system 150.

In FIGS. 4 to 6, reference character A designates the load control information that is held in the storage part (EEPROM) 111 of the master load control unit 110, B stands for the load control information held in the storage part 121 of the slave load control unit 120, C expresses the load control information held in the storage part 131 of the slave load control unit 130, and S3 represents the reset switch 112.

At first, a description will be given below of the operation of the majority processing to be executed in the master load control unit 110.

The CPU mounted in the master load control unit 110 according to the present embodiment, as shown in FIG. 4, not only compares the load control information A that has been processed in a multiplexed manner (Steps S2-A to Steps S4-A), with the load control information B and the load control information C (Step S5-A) but also, when the reset switch 112 is not depressed (in Step S6-A, off) and also when there exists any inconsistency between these three pieces of load control information, carries out a majority processing on the load control information A of the master load control unit 110 as well as the load control information B and C of the slave load control units 120 and 130, when A≠B=C as the result of the majority processing, rewrites the load control information A of the master load control unit 110 into the load control information B of the slave load control units 120, and then executes a normal processing (Step S8-A) in accordance with the rewritten load control information.

When the reset switch 112 is depressed (in Step S6-A, on) or when any of (A=B=C, A≠B≠C, A=B≠C, or A=C≠B) holds good, the data are not rewritten but the normal processing (Step S8-A) is executed.

Next, a description will be given below of the operation of the majority processing to be executed in the slave load control unit 120.

The CPU mounted in the slave load control unit 120 according to the present embodiment, as shown in FIG. 5, not only compares the load control information A that has been processed in a multiplexed manner (Step S2-B to Step S4-B) with the two pieces of load control information B and C (Step S5-B) but also, when A=B=C or A=B≠C holds good in Step S5-B, or when the reset switch 112 is not depressed (in Step S6-B, off), the data are not rewritten but a normal processing (Step S8-B) is carried out.

When A=C≠B or A≠B≠C holds good in Step S5-B, then the load control information B is rewritten into the load control information A (Step S7-B) and, after then, the normal processing (Step S8-A) is performed.

Also, when A≠B=C holds good in Step S5-B and the reset switch 112 is pressed down (in Step S6-B, on), then the load control information B is rewritten into the load control information A (Step S7-B) and, after then, the normal processing (Step S8-A) is executed.

Next, a description will be given below of the operation of the majority processing to be executed in the slave load control unit 130.

The CPU mounted in the slave load control unit 130 according to the present embodiment, as shown in FIG. 6, not only compares the load control information A that has been processed in a multiplexed manner (Step S2-C to Step S4-C) with the two pieces of load control information B and C (Step S5-C) but also, when A=B=C or A=C≠B holds good in Step S5-C, or when the reset switch 112 is not depressed (in Step S6-C, off), the data are not rewritten but a normal processing (Step S8-C) is carried out.

When A=B≠C or A≠B≠C holds good in Step S5-C, then the load control information C is rewritten into the load control information A (Step S7-C) and, after then, a normal processing (Step S8-C) is executed.

Also, when A≠C=B holds good in Step S5-C and the reset switch 112 is depressed (in Step S6-C, on), the load control information C is rewritten into the load control information A (Step S7-C) and, after then, a normal processing (Step S8-C) is carried out.

Due to this, when a new storage part 111 with the load control information thereof updated is mounted electrically, the updating of the load control information of the master load control unit 110 can be transmitted to the respective slave load control units 120 and 130 accurately and also it is possible to realize a multiplex transmission system 150 which can carry out a highly reliable multiplexed processing.

In other words, according to the present multiplex transmission system 150, electric devices carried on board the vehicle such as lights, an air conditioner and the like can be controlled accurately. In particular, the on-off cycles of the lights, the intensity of the turn-on illumination of the lights and the turn-on of the lights in linking with a vehicle door can be controlled accurately. Also, the supply of power to the air conditioner for turning it on or off can be controlled accurately.

Also, when the electrically mountable and removable storage part 111 (such as an IC card, an IC connector or the like) is employed, if the reset switch 112 is pressed down when a storage part 111 with the load control information thereof updated is newly mounted, then the CPU mounted in the master load control unit 110 according to the present embodiment not only can urge the forced transfer of the updated load control information to the respective slave load control units 120 and 130 but also permits the thus transferred load control information to be held by the respective storage parts 121 and 131 of the slave load control units 120 and 130.

This prevents the newly updated load control information of the master load control unit 110 from being multiplexingly processed in accordance with the two pieces of load control information of the slave load control units 120 and 130 that are consistent with each other and occupy a majority in the three pieces of the load control information, while the forced transfer of the updated load control information to the respective slave load control units 120 and 130 can be urged, thereby being able to realize a multiplex transmission system 150 which can carry out a highly reliable is multiplexing processing. That is, according to the present multiplex transmission system 150, electric devices carried on board the vehicle such as lights, an air conditioner and the like can be controlled accurately. In particular, the on-off cycles of the lights, the intensity of the turn-on illumination of the lights and the turn-on of the lights in linking with a vehicle door can be controlled accurately. Also, the supply of power to the air conditioner for turning it on or off can be controlled accurately.

Second Embodiment

Figure 7:
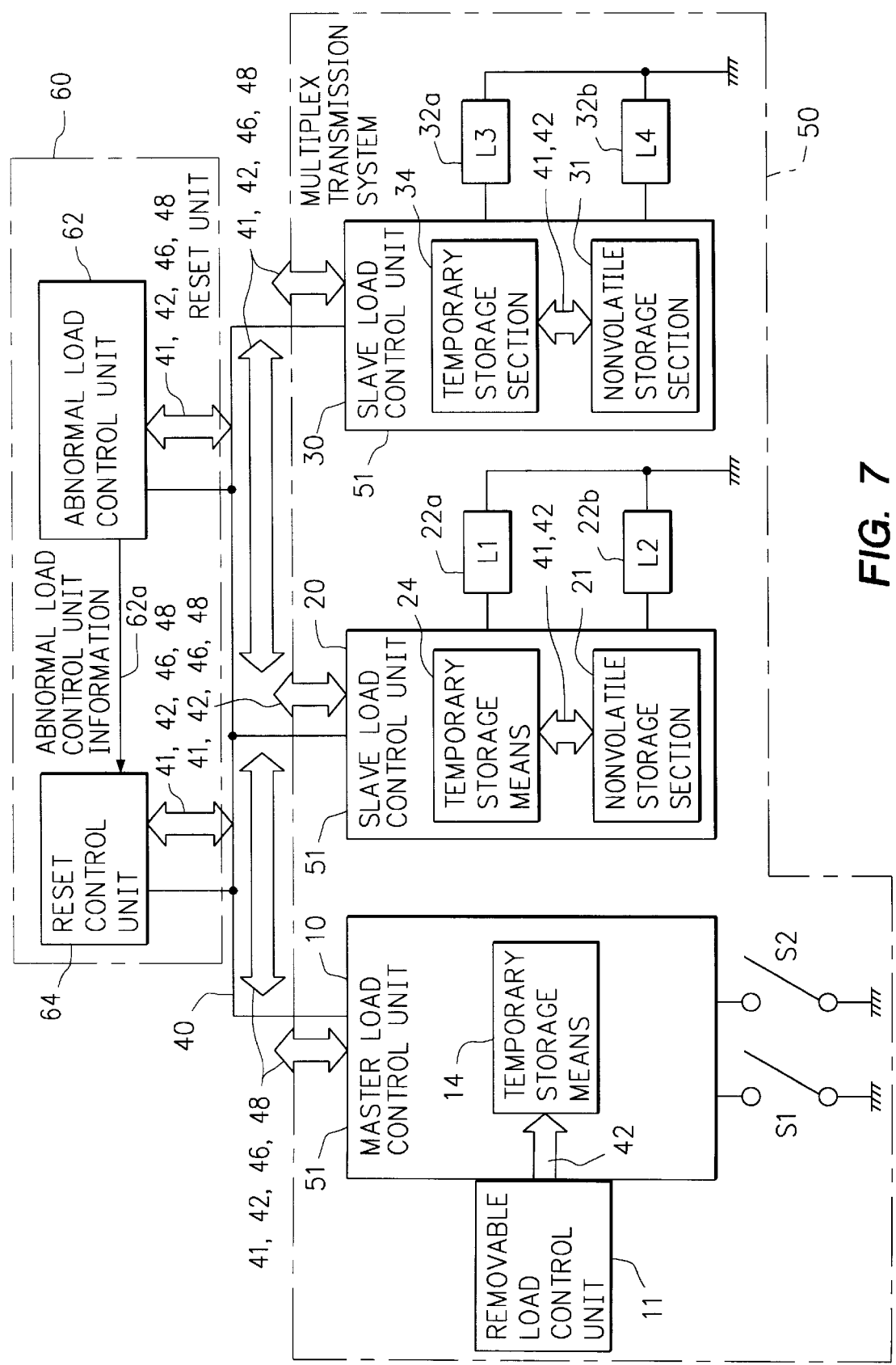
FIG. 7 is a functional block diagram showing a multiplex transmission system according to a second embodiment of the present invention and a resetting apparatus used together with the multiplex transmission system.

FIG. 7 is a functional block diagram showing a multiplex transmission system (50) according to second embodiment of the present invention and a resetting apparatus (60) used together with the multiplex transmission system. FIG. 8A shows a frame structure (43) of a unit frame (44) of control specification information (42) or control status information (41) according to second embodiment of the invention. FIGS. 8B to 8E show the structure of data of a header (45) in the frame structure (43).

To begin with, the multiplex transmission system (50) according to the second embodiment of the present invention will be described.

As shown in FIG. 7, the multiplex transmission system (50) according to the second embodiment of the present invention comprises a removable external storage unit (11), a multiplex transmission network (40), and a plurality of load control units (51, . . . , 51) connected to the multiplex transmission network (40).

The multiplex transmission network (40) of the present embodiment is a signal line for exchanging information, and the signal line is made up of one optical fiber cable. A coaxial cable or a wire harness which is made by tying twisted pair lines in a bundle may also be used as the multiplex transmission network (40) of the present embodiment. However, the optical fiber cable is used in the embodiment in order to prevent an increase in size and weight of the network.

The removable external storage unit (11) can update and hold the control specification information (42), as required. The removable external storage unit (11) is electrically removable with respect to the master load control unit (10), and is nonvolatile storage means capable of reading the control specification information (42) while it is attached to the master load control unit.

The removable storage unit (EEPROM) (11) holds the control specification information (42) relevant to control specification of switches (S1 and S2) and loads (L1, L2, L3, and L4) corresponding to vehicle specifications. The external storage unit (11) can update and hold the control specification information (42), as necessary. Further, the external storage unit (11) is electrically removable with respect to the master load control unit (10) and is capable of reading the control specification information (42), as necessary, while it is attached to the master load control unit. The control specification information (42) relevant to the control specifications of the loads signifies the type of load, e.g., electrical equipment aboard a vehicle such as lamps and an air conditioner, a controlling method, e.g., control related to a flashing cycle of the lamps, the illuminance of the lamps and lightening actions of a lamp synchronized with door openings, and the control of the electrical power supply such as ON/OFF operations of the air conditioner.

The term "electrical attachment" used herein signifies the state in which signals can be processed via metal electrode connectors of the reading unit. However, attachment is not particularly limited to this meaning, and various connecting methods, such as a connecting method which uses applications of an electromagnetic force (e.g., radiowaves or electrostatic induction), or optical connecting techniques which use applications of infrared rays or visible rays, may be also used to realize attachment.

Nonvolatile memory (e.g., EEPROM) used as the removable external storage unit (11) is made in a removable form (e.g., an IC card or IC connector), and it is inserted into reading unit disposed in the master load control unit (10), as required. As a result, it becomes possible for the master load control unit (10) to read desired control specification information (42). Although nonvolatile memory is used as the removable external storage unit (11), the removable external storage means is not particularly limited to the nonvolatile memory. Magnetic storage devices (e.g., a magnetic card, a magnetic disk, and bubble memory) or magneto-optical devices (e.g., an MO disk) may also used as the removable external storage unit so long as it is externally removable and is capable of updating and holding the control specification information (42) a predetermined number of times, as required.

The load control units (51, . . . ,51) multiplex the control specification information (42) relevant to control specifications of the loads (22a, 22b, 32a, and 32b) or the control status information (41) relevant to the results of control of the loads (22a, 22b, 32a, and 32b) through the multiplex transmission network (40) which is an information communications network. Based on the thus multiplexed control specification information (42), the load control units can control the loads (22a, 22b, 32a, and 32b) respectively connected thereto. A plurality of load control units are connected to the multiplex transmission network (40).

The load control units (51, . . . ,51) include the single master load control unit (10) and at least one slave load control unit (20, 30). The single master load control unit (10) is connected to the multiplex transmission network (40) and is made up of one of the load control units (51, . . . ,51) capable of executing a multiplexing operation based on the control specification information (42) as the master system. The slave load control units (20, 30) hold the control specification information (42) and are connected to the multiplex transmission network (40). The slave load control units (20, 30) are made up of the load control units (51, . . . 51) capable of carrying out the multiplexing operation as a slave system.

Next, the configuration of the master load control unit (10) of the present embodiment will be described.

As illustrated in FIG. 7, the master load control unit (10) is provided with nonvolatile storage section (11) which is capable of updating, holding, and reading the control status information (41) relevant to the master load control unit, as necessary.

Figure 8:
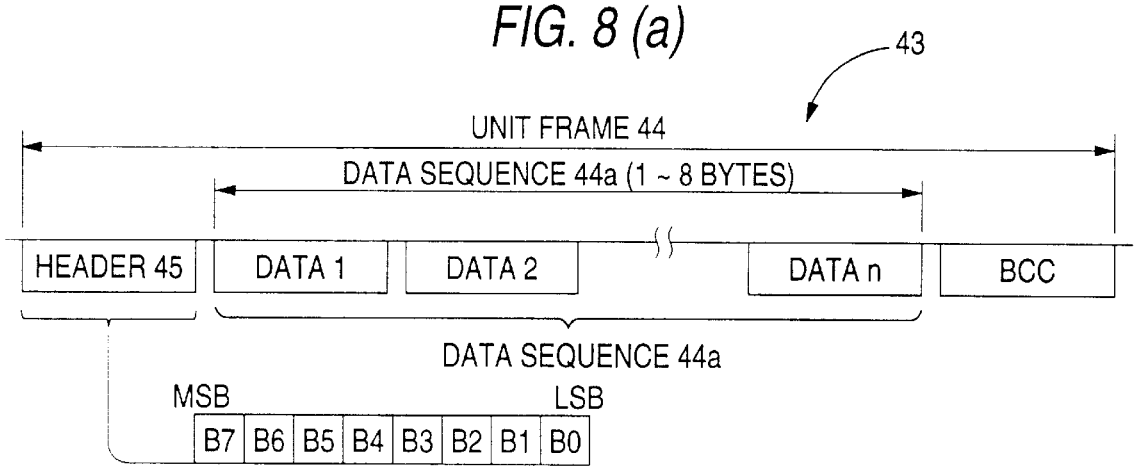
FIG. 8A is a schematic representation showing a frame structure of a unit frame of control specification information or control status information according to one embodiment of the present invention.
FIGS. 8B to 8E are schematic representations showing the structure of data of a header in the frame structure.

The master load control unit (10) made up of one of the load control units (51, . . . ,51) divides the control specification information (42), which is acquired from the removable external storage unit (11) during the course of the initial-mode communication (45a-2), into a predetermined number of unit frames (44), as shown in FIG. 8. When sequentially multiplexing the thus divided unit frames (44) with respect to the slave load control units (20, 30), the master load control unit (10) is capable of multiplexing the unit frame in synchronism with an acknowledgement ACK (46) which is sent from the slave load control units (20, 30) upon successful receipt of the unit frame (44). Thus, the master load control unit (10) is connected to the multiplex transmission network (40) so as to be able to effect the above described operations.

As shown in FIGS. 8(a) to (e), in the case where the master load control unit (10) executes a multiplexing operation during the course of the initial-mode communication (45a-2), each of the slave load control units (20, 30) sends the acknowledgement ACK (46) to the master load control unit (10) upon successful receipt of the unit frame (44) of the control specification information (42) from the master load control unit. The master load control unit (10) is connected to the multiplex transmission network (40) so as to be able to possible to resend the unit frame (44) once transmitted until it receives the acknowledgement ACK (46). Further, the master load control unit (10) sequentially sends new unit frames (44) subsequent to the currently sent unit frame (44) upon receipt of the acknowledgement ACK (46). The master load control unit is connected to the multiplex transmission network (40) so as to be able to effect the above described operations.

The master load control unit (10) of the present embodiment comprises a communications I/F circuit for transferring the control specification information (42) among units (i.e., for exchanging the information between the units through multiplex communication); an input I/F circuit connected to a plurality of switches, i.e., S1 and S2; ROM (read only memory) for holding predetermined control programs (including a communications protocol for multiplex transmission) and fixed data; a temporary storage section (RAM) (14) which is programmable read memory used as a work area in which the control specification information (42) is expanded when a job defined by the control program is executed; a metal electrode connector which is electrically connected to the removable external storage unit (11) and reads the control specification information (42) held therein; a built-in timer used to execute a multiplexing operation in the event of abnormalities arising in the communication mode; and an MPU for executing the multiplexing operation. The output I/F circuit is provided with a diagnostic output from which signals representing problems in the loads are output.

In the case where the control specification information (42) held in the removable external storage unit (11) is read by electrically attaching the removable external storage unit (EEPROM) (11) to the master load control unit (10), the MPU implemented in the master load control unit (10) of the embodiment reads the control specification information (42) retained in the removable external storage means (11). If a match between the thus read control specification information items (42) arises several times, the MPU acquires the control specification information items (42) which match with each other, as well as executing a multiplexing operation based on the thus acquired control specification information (42) with respect to the slave load control units (20, 30).

The MPU implemented in the master load control unit (10) of the present embodiment divides the thus acquired control specification information (42) into a predetermined number of unit frames (44). When carrying out a multiplexing operation for each unit frame (44), the MPU sequentially carries out multiplexing operation for each unit frame (44) between the MPU and the load control units (20, 30) in synchronism with the signal of the acknowledgement ACK 46 which is generated by the slave load control units (20, 30) upon successful receipt of the unit frame (44).

Further, the MPU implemented in the master load control unit (10) of the present embodiment compares the checksum information of the control specification information (42), sent from the master load control unit and a verification ACK (48) received from each of the slave load control units (20, 30). If there is a match between them, the multiplexing of the control specification information (42) is completed, and the communication shifts to normal-mode communication. On the other hand, if no match arises between them, the multiplexing operation for each unit frame (44) on the basis of the control specification information (42) can be executed again.

The configuration of the slave load control units (20, 30) of the present embodiment will now be described.

At least one slave load control unit (the two slave load control units 20 and 30 in the present embodiment) is capable of controlling the electrical power supply fed to electrical equipment such as lamps and an air conditioner disposed as loads in a vehicle. The slave load control units are connected to the multiplex transmission network (40) and are provided with the nonvolatile storage sections (21, 31) for holding the control specification information (42), respectively. The slave load control units are capable of executing a multiplexing operation, as slave units, with respect to the master load control unit (10) through the multiplex transmission network (40).

The slave load control units (20, 30), which are respectively made up of the load control units (51, . . . 51), respectively generate the verification ACK (48) which is checksum information with respect to the control specification information (42) received from the master load control unit (10). The slave load control units also compare the verification ACK (48) and the confirmation ACK (48) received from the master load control unit (10). If no match arises between these verification ACK (48) codes, the multiplexing processing is executed again for each unit frame (44) on the basis of the control specification information (42) of the master load control unit (10). If there is a match between the verification ACK (48) codes, the slave load control units further compare the control specification information (42) held in the nonvolatile storage sections (21, 31) of the slave load control units (20, 30) and the control specification information (42) received from the master load control unit (10). If no match arises between these control specification information items (42), the contents of the storage sections of the slave load control units (20, 30) are updated so as to be replaced with the control specification information (42) received from the master load control unit (10), and the multiplexing operation in the initial-mode communication (45a-2) is completed. The communication then shifts to the normal-mode communication (45a-1). The slave load control units are connected to the multiplex communication network (40) so as to effect the above described operations.

Each of the slave load control units (20, 30) comprises a communications I/F circuit for transferring the control specification information (42) among units (i.e., for exchanging the information between the units through multiplex communication); an input I/F circuit connected to a plurality of sensors (e.g., temperature sensors); an output I/F circuit connected to a plurality of loads (L1 or L2), (L3 or L4) such as lamps, motors, and an air conditioner; ROM (read only memory) for holding predetermined control programs (including a communications protocol for multiplex transmission) and fixed data; a temporary storage section (RAM) (24, 34) which is programmable read memory used as a work area in which the control specification information (42) is expanded when a job defined by the control program is executed; nonvolatile memory (EEPROM is used in the present embodiment) which serves as the nonvolatile storage section (21, 31) for recording the control specification information (42); a built-in timer used to execute a multiplexing operation in the event of abnormalities arising in the communication mode; and an MPU for executing the multiplexing operation.

Nonvolatile memory is used as the nonvolatile storage sections (21, 31) in the present embodiment. However, the nonvolatile storage sections are not limited to the nonvolatile memory. Magnetic storage devices (e.g., a magnetic card, a magnetic disk, and bubble memory) or magneto-optical devices (e.g., an MO disk) may also used as the nonvolatile storage sections so long as it is externally removable and is capable of updating and holding the control specification information (42) a predetermined number of times, as necessary.

The MPU implemented in each of the slave load control units (20, 30) of the present embodiment calculates checksum information with respect to the control specification information (42) which is sent from the master load control unit (10) while being divided into the unit frames (44). The MPU also executes the multiplexing operation so as to send the thus calculated checksum information to the master load control unit (10) as the verification ACK (48).

The MPU implemented in each of the slave load control units (20, 30) executes the multiplexing operation, which the MPU of the master load control unit (10) executes as the master system, in synchronism with the MPU of the master load control unit (10) as a slave system. The MPUs also individually execute internal processing of the nonvolatile storage sections (EEPROM) 21 and 31 in the slave load control units (20, 30), such as the updating of the storage sections.

The MPU implemented in each of the slave load control units (20, 30) generates the verification ACK (48) which is the checksum information with respect to the control specification information (42) received from the master load control unit (10). The MPU compares the verification ACK (48) and the confirmation ACK (48) received from the master load control unit (10). If no match arises between these ACK (48) codes, the multiplexing operation is executed again for each unit frame (44) on the basis of the control specification information (42) of the master load control unit (10). If there is a match between the ACK (48) codes, the MPUs further compare the control specification information (42) held in the nonvolatile storage sections (21, 31) of the slave load control units (20, 30) and the control specification information (42) received from the master load control unit (10). If no match arises between these control specification information items (42), the contents of the nonvolatile storage sections (21, 31) of the slave load control units (20, 30) are updated so as to be replaced with the control specification information (42) received from the master load control unit (10), and the multiplexing operation of the control specification information (42) is completed. The communication then shifts to the normal-mode communication.

The configuration of the frame structure (43) of the unit frame (44) of the present embodiment will now be described.

The control specification information (42) or the control status information (41) is transmitted on a unit frame basis. Such a unit frame (44) is divided into a predetermined number of subdivisions, as shown in FIGS. 8(a) to (e), and is transmitted (i.e., multiplexed) through the multiplex transmission network (40).

The frame structure (43) of the unit frame (44) includes a header (45) in which a communications protocol used for executing a multiplexing operation through the multiplex transmission system (40) is described, and a data sequence (44a) in which the contents of the control specification information (42) or the control status information (41) are described.

The frame structure may be provided with BCC (Block Checksum Character) which signifies the checksum of the transmitted/received unit frame, as shown in FIGS. 8(a) to (e).

The configuration of the header (45) of the unit frame (44) of the present embodiment will now be described.

The header (45) comprises the communication mode information (45a), the recognition information (45b), and the frame type information (45c), as shown in FIGS. 8(a) to (e).

The header (45) of the present embodiment is 8 bits long and comprises communication mode information (45a), (B7), recognition code information (45b), (B6, B5), frame type information (45c), (B4), and frame numbers (B3–B0).

The communication mode information (45a) is described by the subject of communication when it carries out the initial-mode communication (45a-2) signifying the execution of the multiplexing of the control specification information (42) held in the removable external storage means (11) or the normal-mode communication (45a-1) signifying the execution of the multiplexing of the control status information (41).

The recognition code information (45b) is described by one of the load control units (51, . . . ,51) when it sends the control specification information (42) or the control status information (41) while it is divided into the unit frames (44). The recognition code information describes whether the sender is the master load control unit (10) or one of the slave load control units (20, 30).

The frame type information (45c) shows whether the unit frame (44) to be sent is an ACK frame (45c-1), signifying the unit frame (44) of the control specification information (42) multiplexed in the environment in which the initial-mode communication (45a-2) is executed, or a normal frame (45c-2) signifying the unit frame (44) of the control status information (41) multiplexed in the environment in which the normal-mode communication (45a-1) is executed.

The configuration of the resetting apparatus (60), shown in FIG. 7, of the present embodiment will be described. Abnormalities as used herein signify communication failures in the multiplex transmission network (40) or operation failures of the load control units (51, . . . ,51) due to an anomaly the electrical power source.

According to a resetting method for use in the resetting apparatus (60) capable of detecting abnormalities associated with the multiplexing operation carried out in the multiplex transmission system (50) as well as resetting the load control units (51, . . . ,51) so as to restore them from an abnormal condition to a normal condition, if the master load control unit (10) becomes abnormal during the course of the execution of the normal-mode communication (45a-1), and if the normal-mode communication (45a-1) is described in the communication mode information (45a), the master load control unit (10) is restored to a normal condition by executing the multiplexing operation with respect to the master load control unit (10) by use of the control status information (41) held in the slave load control unit (20 or 30) which is normally executing the normal-mode communication. On the other hand, if the slave load control unit (20 or 30) becomes abnormal during the course of the execution of the normal-mode communication (45a-1), and if the normal-mode communication (45a-1) is described in the communication mode information (45a), the slave load control unit (20 or 30) is restored to a normal condition by executing the multiplexing operation with respect to the abnormal slave load control unit (20 or 30) by use of the control status information (41) held in the other slave load control unit (30 or 20) or the master load control unit (10) which is normally executing the normal-mode communication (45a-1). Further, if the slave load control unit (20 or 30) becomes abnormal during the course of the execution of the normal-mode communication (45a-1), and if the initial-mode communication (45a-2) is described in the communication mode information (45a), the slave load control unit (20 or 30) is restored to a normal condition by executing the multiplexing operation with respect to the abnormal slave load control unit (20 or 30) by use of the control specification information (42) held in the master load control unit (10).

As shown in FIG. 7, the resetting apparatus (60) of the present embodiment is provided with abnormality detecting unit (62) and recovery or reset control unit (64) so as to cope with the following situations.

If the master load control unit (10) becomes abnormal during the course of the execution of the normal-mode communication (45a-1), and if abnormal load control unit information (62a) is generated based on the fact that the normal-mode communication (45a-1) is described in the communication mode information (45a), recovery control unit (64) restores the master load control unit (10) to a normal condition by executing a multiplexing operation with respect to the master load control unit (10), using the control status information (41) held in the slave load control unit (20 or 30) which is normally executing the normal-mode communication (45a-1). On the other hand, if the slave load control unit (20 or 30) becomes abnormal during the course of the execution of the normal-mode communication (45a-1), and if the abnormal load control unit information (62a) is generated based on the fact that the normal-mode communication (45a-1) is described in the communication mode information (45a), the recovery control unit (64) restores the slave load control unit (20 or 30) to a normal condition by executing a multiplexing operation with respect to the slave load control unit (20 or 30), using the control status information (41) held in the other slave load control unit (30 or 20) or the master load control unit (10) which is normally executing the normal-mode communication (45a-1). Further, if the slave load control unit (20 or 30) becomes abnormal during the course of the execution of the normal-mode communication (45a-1), and if the abnormal load control unit information (62a) is generated based on the fact that the initial-mode communication (45a-2) is described in the communication mode information (45a), the recovery control unit (64) restores the slave load control unit (20 or 30) to a normal condition by executing a multiplexing operation with respect to the slave load control unit (20 or 30), using the control specification information (42) held in the master load control unit (10).

More specifically, the configuration of the resetting apparatus (60) of the present embodiment will be described.

The abnormality detecting unit (62) is connected to the recovery control unit (64) and the multiplex transmission network (40), as shown in FIG. 7. With this arrangement, the abnormality detecting unit (62) detects an abnormal multiplexing operation arising in the load control units (51, . . . 51) which carry out the multiplex operation on the multiplex transmission network (40). Further, the abnormality detecting unit (62) generates the abnormal load control unit information (62a) on the basis of the recognition code described in the header (45) by specifying the abnormal load control unit from the load control units (51, . . . ,51).

The recovery control unit (64) is connected to the abnormality detecting unit (62) and the multiplex transmission network (40), as shown in FIG. 7. With this arrangement, the recovery control unit (64) selects either the initial-mode communication (45a-1) or the normal-mode communication (45a-1) as a restoring operation to be executed according to the abnormal load control unit information (62a). The recovery control unit (64) describes the communication mode information (45a) in the header (45) when executing the thus selected restoring operation. Further, the recovery control unit (64) restores the load control unit of the load control units (51, . . . 51) which caused the abnormal multiplexing operation by executing the selected restoring operation with respect to that load control unit on the basis of the abnormal load control unit information (62a) and the communication mode information (45a).

Still more specifically, the configurations of the recovery control unit (64) and the abnormality detecting unit (62) of the present embodiment will be described.

Each of the recovery control unit (64) and the abnormality detecting unit (62) of the present embodiment comprises a communications I/F circuit for transferring the control specification information (42) among units (i.e., for exchanging the information between the units through multiplex communication); ROM (read only memory) for holding control programs relevant to a predetermined restoring operation (including a communications protocol for multiplex transmission) and fixed data; a temporary storage section (RAM) which is programmable read memory used as a work area in which the control specification information (42) or the control status information (41) is expanded when a job defined by the control program is executed; a built-in timer used to execute the restoring operation in the event of abnormalities arising in the communication mode; and an MPU for executing the restoring operation.

The MPUs implemented in the recovery control unit (64) and the abnormality detecting unit (62) of the present embodiment can collectively carry out the resetting method for use in the resetting apparatus (60) capable of detecting abnormalities associated with the multiplexing operation carried out in the multiplex transmission system (50) as well as resetting the load control units (51, . . . ,51) so as to restore them from an abnormal condition to a normal condition.

The MPUs are connected to the slave load control units (20, 30) and the master load control unit (10) through the multiplex transmission network (40) so as to make it possible to monitor the multiplexing operation for each unit frame (44) in synchronism with the acknowledgement ACK (46) which are generated by the slave load control units (20, 30) upon successful receipt of the unit frame (44), when the multiplexing operation is executed for each unit frame (44).

The MPUs are also capable of monitoring the following operations. The checksum information of the control specification information (42) sent by the MPUs and the verification ACK (48) received from the slave load control units (20, 30) are compared with each other. If there is match between them, the multiplexing of the control specification information (42) is completed, and the communication shifts to the normal-mode communication. If no match arises between them, the multiplexing operation is executed again for each unit frame (44) on the basis of the control specification information (42).

The MPUs implemented in the recovery control unit (64) and the abnormality detecting unit (62) restore the load control unit from an abnormal condition to a normal condition in the following manner:

[1] If the master load control unit (10) becomes abnormal during the course of the execution of the normal-mode communication (45a-1), and if the normal-mode communication (45a-1) is described in the communication mode information (45a), the master load control unit (10) is restored to a normal condition by executing the multiplexing operation with respect to the master load control unit (10) by use of the control status information (41) held in the slave load control unit (20 or 30) which is normally executing the normal-mode communication.

[2] If the slave load control unit (20 or 30) becomes abnormal during the course of the execution of the normal-mode communication (45a-1), and if the normal-mode communication (45a-1) is described in the communication mode information (45a), the slave load control unit (20 or 30) is restored to a normal condition by executing the multiplexing operation with respect to the abnormal slave load control unit (20 or 30) by use of the control status information (41) held in the other slave load control unit (30 or 20) or the master load control unit (10) which is normally executing the normal-mode communication (45a-1).

[3] If the slave load control unit (20 or 30) becomes abnormal during the course of the execution of the normal-mode communication (45a-1), and if the initial-mode communication (45a-2) is described in the communication mode information (45a), the slave load control unit (20 or 30) is restored to a normal condition by executing the multiplexing operation with respect to the abnormal slave load control unit (20 or 30) by use of the control specification information (42) held in the master load control unit (10).

The operation of the second embodiment of the present invention will be described.

Figure 9:
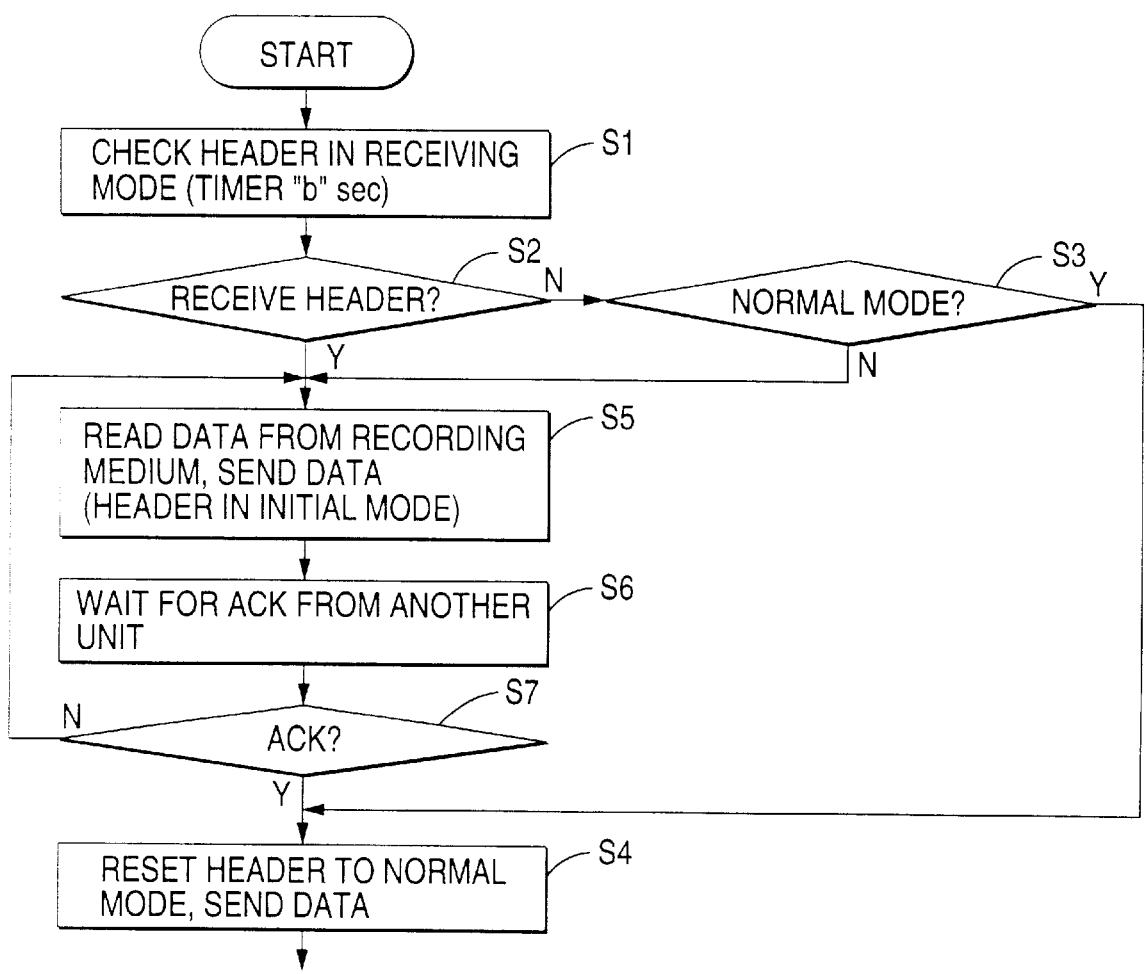
FIG. 9 is a flowchart which describes abnormal processing occurring in the master load control unit after a resetting operation according to an embodiment of the present invention.
Figure 10:
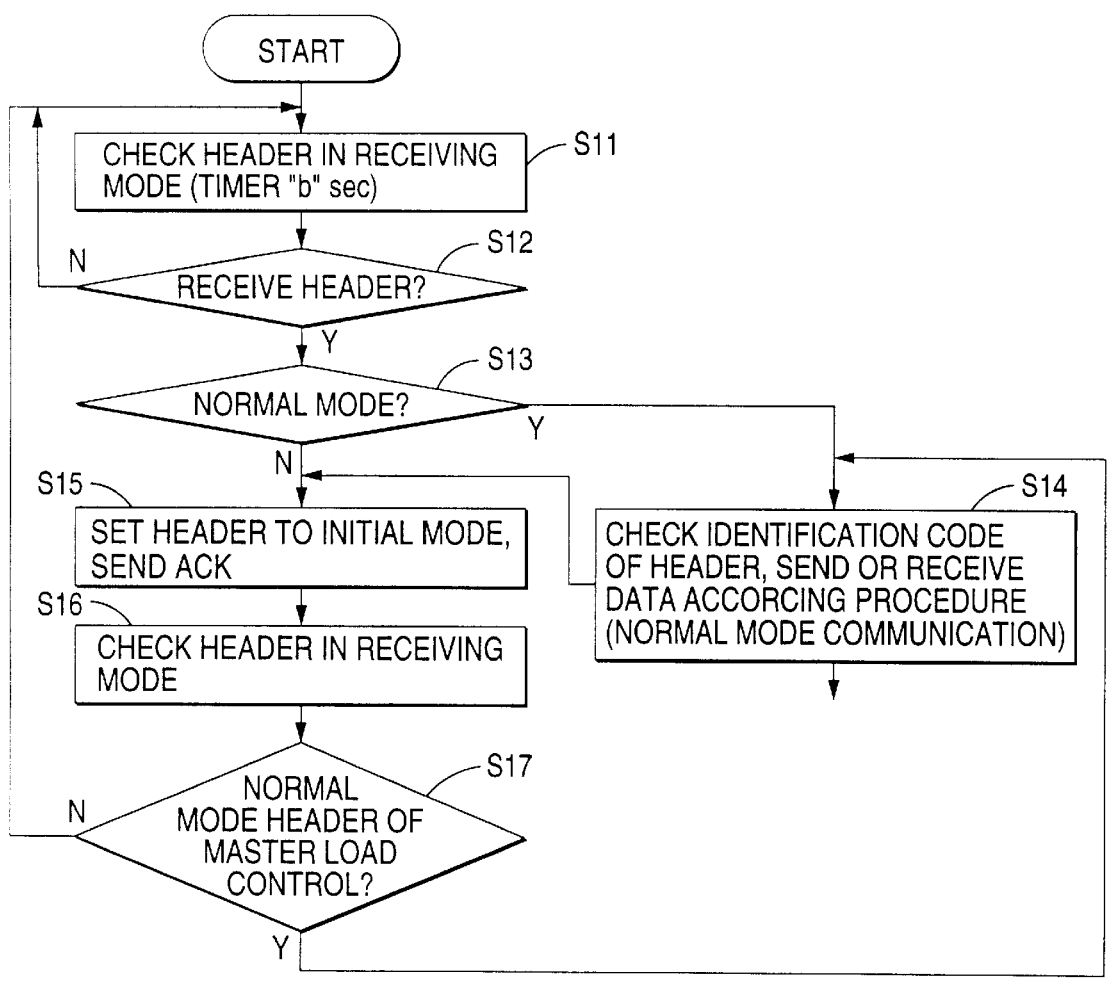
FIG. 10 is a flowchart which describes abnormal processing occurring in the slave load control units after the resetting operation according to a second embodiment of the present invention.
Figure 11:
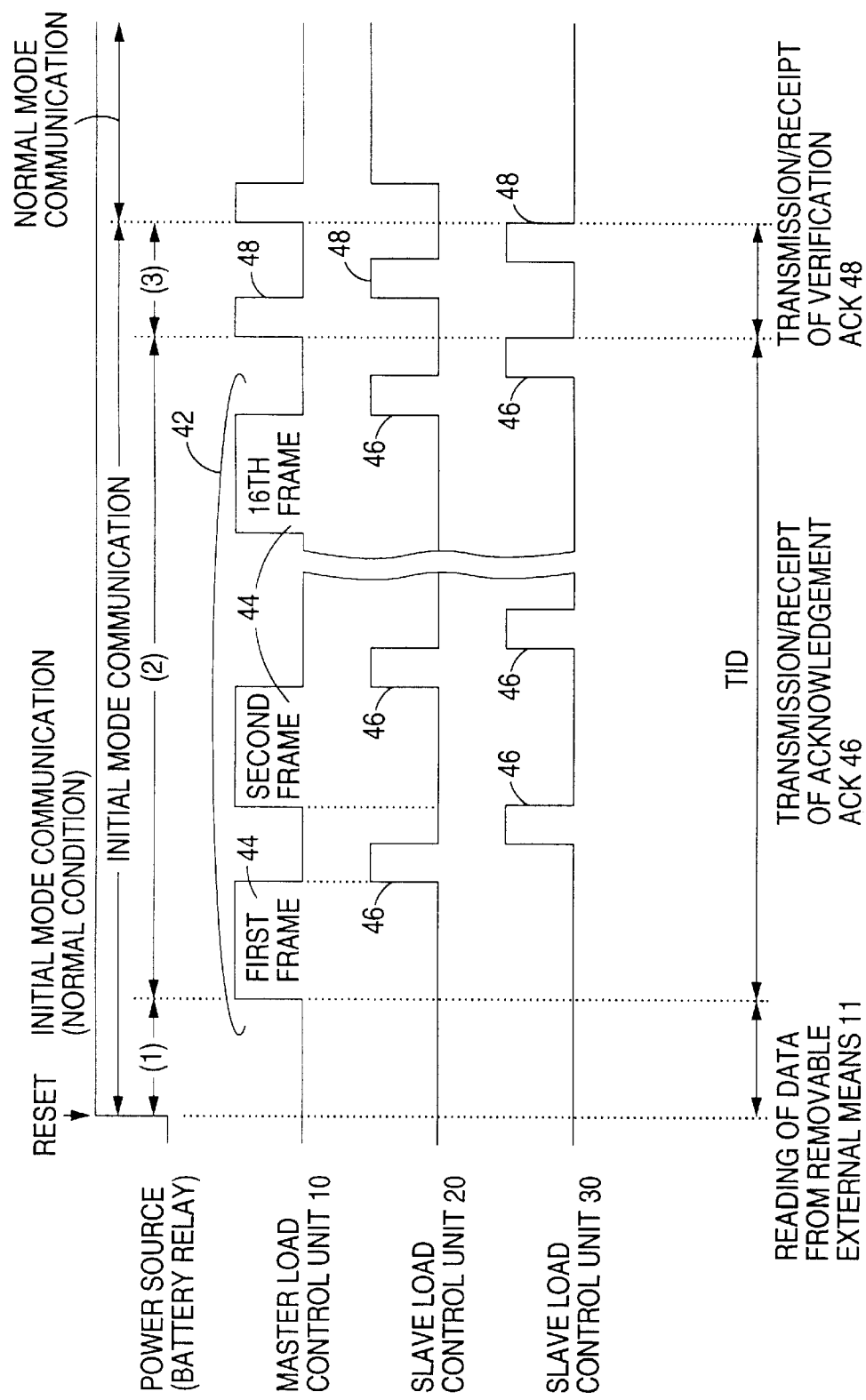
FIG. 11 is a time sequence diagram showing a multiplexing operation executed by the multiplex transmission system and the resetting apparatus during the initial-mode communication which is carried out in a normal condition according to a second embodiment of the present invention.
Figure 13:
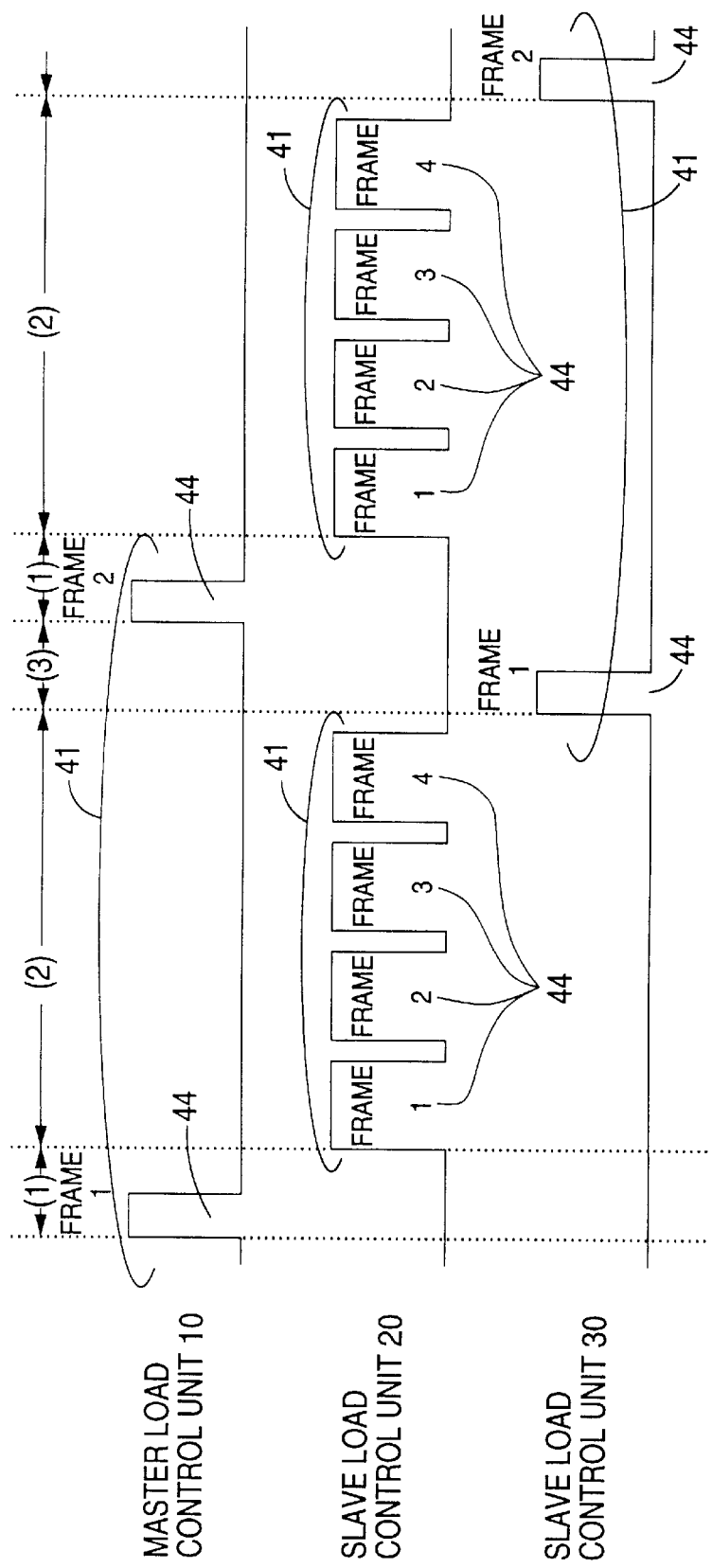
FIG. 13 is a time sequence diagram showing a multiplexing operation executed by the multiplex transmission system and the resetting apparatus during the normal-mode communication which is carried out in a normal mode according to a second embodiment of the present invention.
Figure 14:
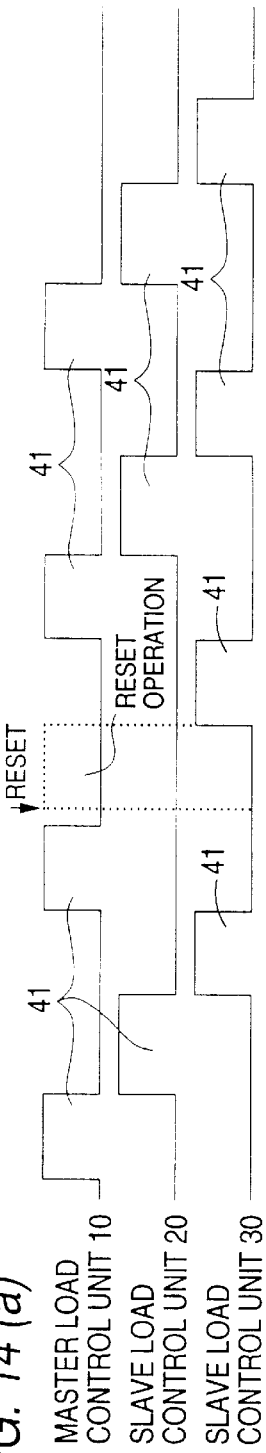
FIGS. 14(a) to 14(c) are time sequence diagrams showing a multiplexing operation executed by the multiplex transmission system and the resetting apparatus during the normal-mode communication which is carried out in an abnormal condition according to a second embodiment of the present invention.
Figure 14:
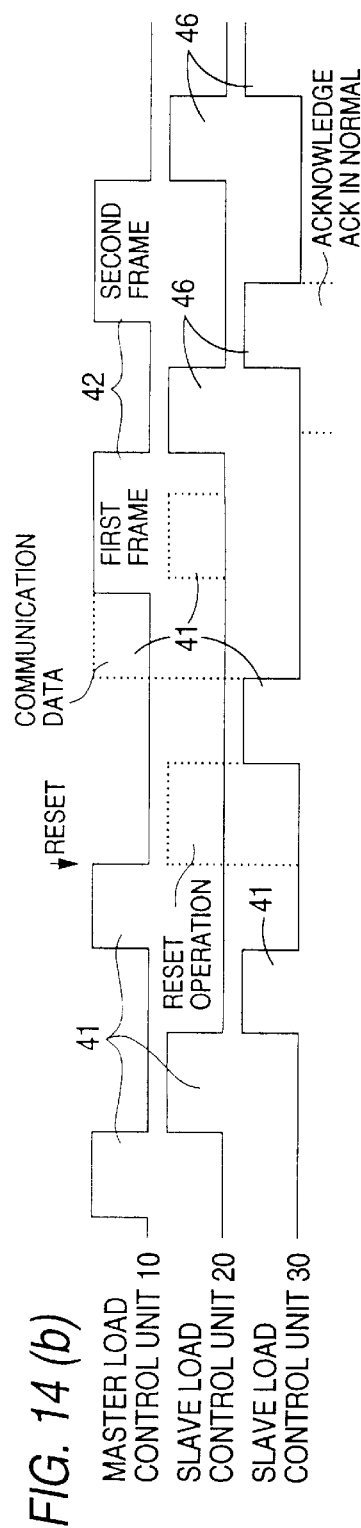
Figure 14:
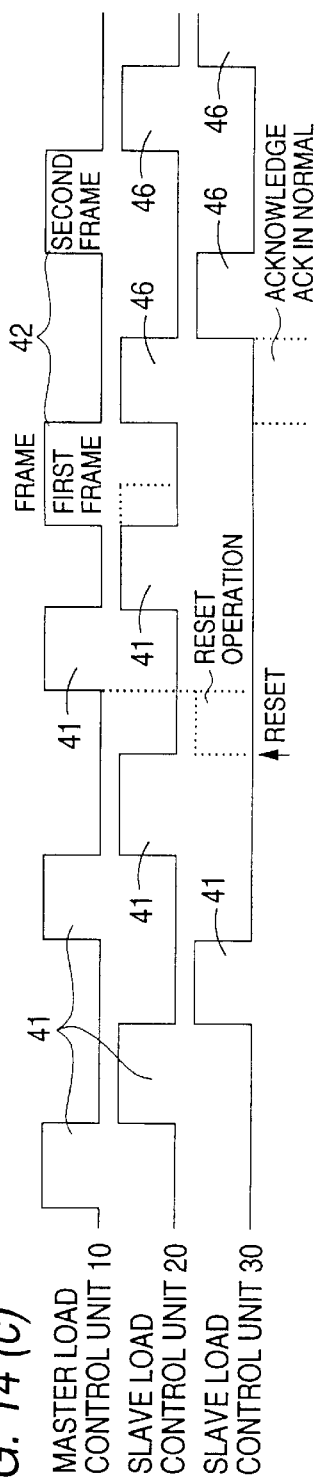
Figure 15:
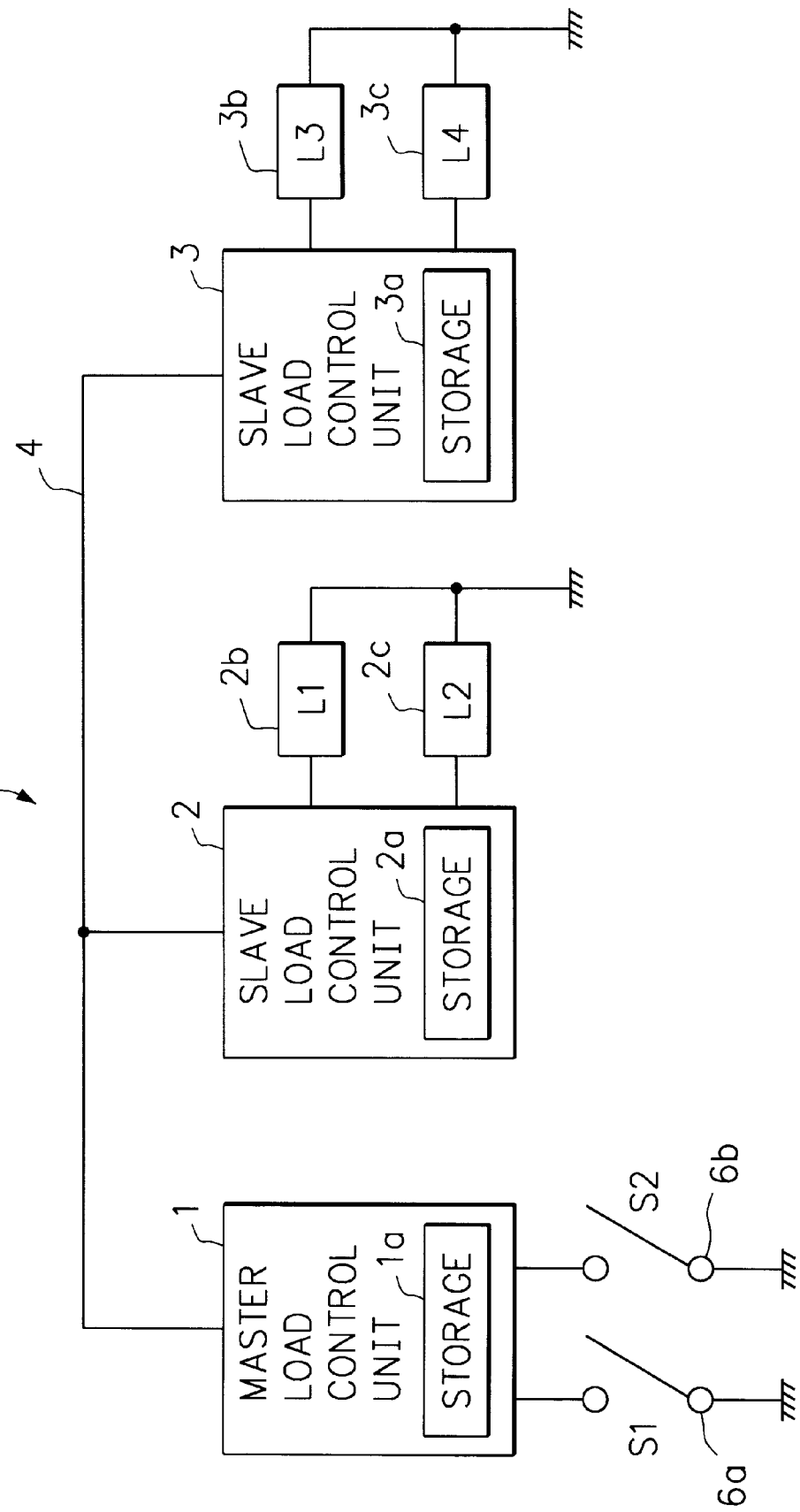
FIG. 15 is a block diagram showing an example of a conventional multiplex transmission system.
Figure 16:
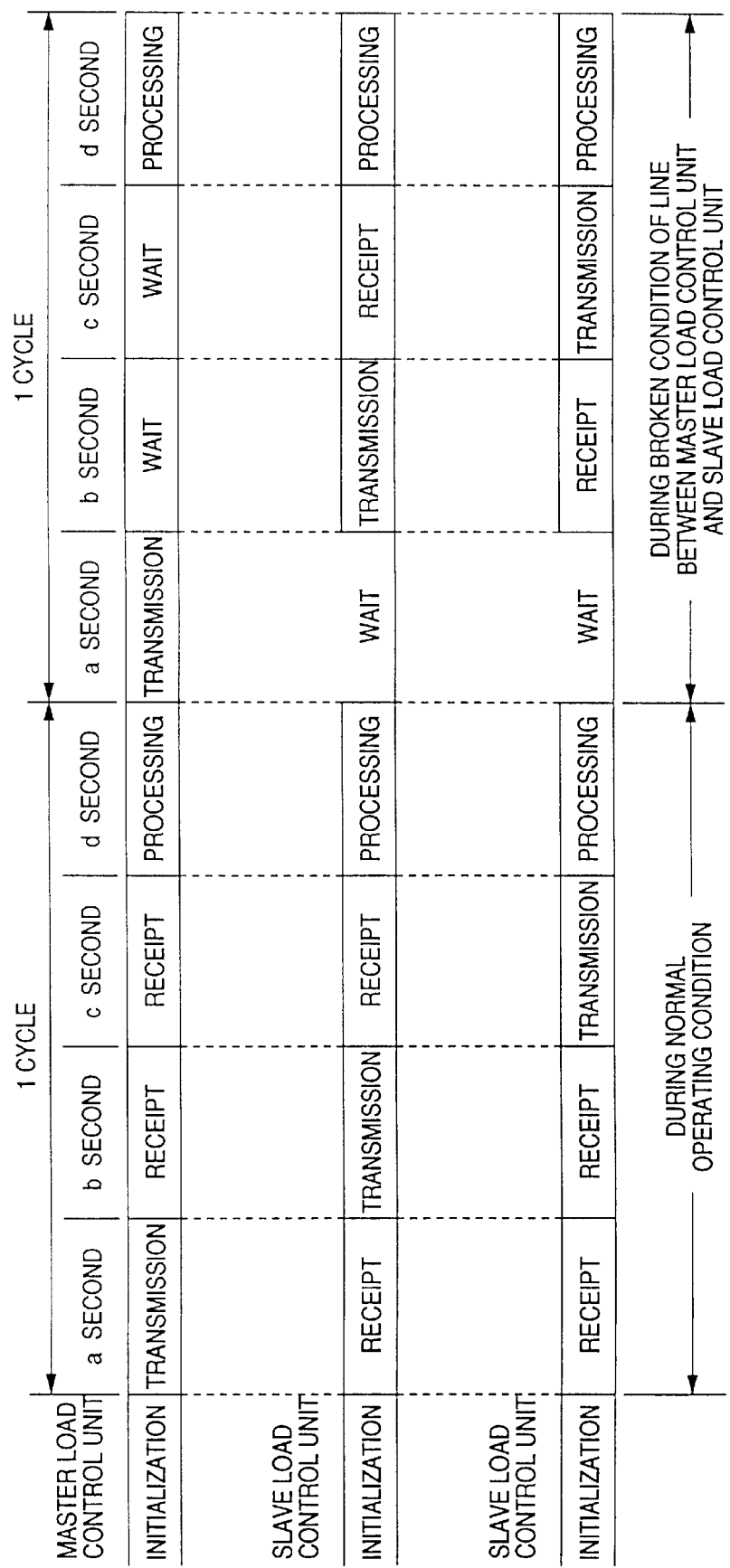
FIG. 16 is a time sequence diagram showing a multiplexing operation during an initial-mode communication in a normal condition and a multiplexing operation during the initial-mode communication in an abnormal condition which are executed by the conventional multiplex transmission system.

FIG. 9 is a flowchart which describes abnormal processing occurring in the master load control unit (10) after a resetting operation according to the second embodiment of the present invention. FIG. 10 is a flowchart which describes abnormal processing occurring in the slave load control units (20, 30) after the resetting operation according to the second embodiment of the present invention. FIG. 11 is a time sequence diagram showing a multiplexing operation executed by the multiplex transmission system (50) and the resetting apparatus (60) during the initial-mode communication (45a-2) which is carried out in a normal condition according to the second embodiment of the present invention. FIG. 12 is a time sequence diagram showing a multiplexing operation executed by the multiplex transmission system (50) and the resetting apparatus (60) during the initial-mode communication (45a-2) which is carried out in an abnormal condition according to the second embodiment of the present invention. FIG. 13 is a time sequence diagram showing a multiplexing operation executed by the multiplex transmission system (50) and the resetting apparatus (60) during the normal-mode communication (45a-1) which is carried out in a normal mode according to the second embodiment of the present invention. FIG. 14 is a time sequence diagram showing a multiplexing operation executed by the multiplex transmission system (50) and the resetting apparatus (60) during the normal-mode communication (45a-1) which is carried out in an abnormal condition according to the second embodiment of the present invention.

To begin with, the operation of the multiplex transmission system (50) according to the second embodiment of the present invention will be described.

The removable external storage unit (11) is capable of updating and holding the control specification information (42), as necessary. The removable external storage unit is electrically attachable to the master load control unit (10), and it is also capable of reading the control specification information (42), as required, while being attached to the same.

Nonvolatile memory (e.g., EEPROM) used as the removable external storage means (11) is made in a removable form (e.g., an IC card or IC connector), and it is inserted into a reading unit disposed in the master load control unit (10), as required. As a result, it becomes possible for the master load control unit (10) to read desired control specification information (42).

The load control units (51, . . . ,51) multiplex the control specification information (42) relevant to control specifications of the loads (22a, 22b, 32a, and 32b) or the control status information (41) relevant to the results of control of the loads (22a, 22b, 32a, and 32b) through the multiplex transmission network (40) which is an information communications network. Based on the thus multiplexed control specification information (42), the load control units can control the loads (22a, 22b, 32a, and 32b) respectively connected thereto.

The single master load control unit (10), which is made up of one of the load control units (51, ... ,51) and is connected to the multiplex transmission network (40), is capable of executing a multiplexing operation based on the control specification information (42) as the master system.

Similarly, the slave load control units (20, 30), which are made up of the load control units (51, ... 51) and arc connected to the multiplex transmission network (40), hold the control specification information (42). The slave load control units (20, 30) are connected to the multiplex transmission network (40) and are capable of carrying out the multiplexing operation as a slave system between the slave load units and the master load control unit (10) through the multiplex transmission network (40).

Next, the operation of the master load control unit (10) of the embodiment of the present invention will be described.

The nonvolatile storage section (11) connected to the master load control unit (10) is capable of updating and holding the control status information (41) which is relevant to the load control unit and is to be multiplexed, as well as being capable of reading the control status information (41), as necessary.

As shown in FIG. 11 or 13, the master load control unit (10) made up of one of the load control units (51, ... ,51) divides the control specification information (42), which is acquired from the removable external storage unit (11) during the course of the initial-mode communication (45a-2), into a predetermined number of unit frames (44). When a multiplexing operation is executed for each unit frame (44) between the master load control unit and the slave load control units (20, 30), the master load control unit (10) multiplexes the unit frame in synchronism with an acknowledgement ACK (46) which is sent from the slave load control units (20, 30) upon successful receipt of the unit frame (44).

As shown in FIGS. 11–14, in the case where the master load control unit (10) executes a multiplexing operation during the course of the initial-mode communication (45a-2), the master load control unit (10) sends the acknowledgement ACK (46) to each of the slave load control units (20, 30) upon successful receipt of the unit frame (44) of the control specification information (42) from the slave load control units (20, 30). The slave load control units (20, 30) resend the unit frame (44) once sent until they receive the acknowledgement ACK (46). Further, upon receipt of the acknowledgement ACK (46), the slave load control units (20, 30) are capable of sequentially sending new unit frames (44) subsequent to the currently sent unit frame (44).

As shown in FIGS. 11–14, in the case where the slave load control units (20, 30) execute a multiplexing operation during the course of the initial-mode communication (45a-2), the slave load control units (20, 30) send the acknowledgement ACK (46) to the master load control unit (10) upon successful receipt of the unit frame (44) of the control specification information (42) from the master load control unit (10). The master load control unit (10) resends the unit frame (44) once sent until it receives the acknowledgement ACK (46). Further, upon receipt of the acknowledgement ACK (46), the master load control unit (10) is capable of sequentially sending new unit frames (44) subsequent to the currently sent unit frame (44).

In the master load control unit (10) of the present embodiment, the communications I/F circuit is capable of transferring the control specification information (42) or the control status information (41) among units through the multiplex transmission network (40) (i.e., it exchanges the information between the units through multiplex communication). The input I/F circuit is capable of receiving signals from a plurality of switches S1 and S2. The ROM is read only memory for holding predetermined control programs (including a communications protocol for multiplex transmission) and fixed data. The temporary storage section (RAM) (14) is programmable read memory used as a work area in which the control specification information (42) or the control status information is expanded when a job defined by the control program is executed. The metal electrode connector is electrically connected to the removable external storage unit (11) and is capable of reading the control specification information (42) held in the same. The built-in timer is capable of generating a trigger signal for the purposes of restoring processing by executing a predetermined count-up operation or count-down operation if the communication mode is in an abnormal condition. The MPU is capable of collectively executing the multiplexing operation. The built-in timer may be shared between the resetting apparatus (60) and the multiplex transmission system (50). Similarly, the count-up or count-down information of the built-in timer may be multiplexed, and the thus multiplexed information may be shared between the resetting apparatus (60) and the multiplex transmission system (50).

In the case where the control specification information (42) held in the removable external storage unit (11) is read by electrically attaching the removable external storage unit (EEPROM) (11) to the master load control unit (10), the MPU implemented in the master load control unit (10) of the embodiment reads the control specification information (42) retained in the removable external storage unit (11). If a comparison between the thus read control specification information items (42) arises several times, the MPU acquires the control specification information items (42) which match with each other, as well as executing a multiplexing operation based on the thus acquired control specification information (42) between the MPU and the slave load control units (20, 30).

The MPU implemented in the master load control unit (10) of the present embodiment divides the thus acquired control specification information (42) or control status information (41) into a predetermined number of unit frames (44), as shown in FIGS. 11–14. When carrying out a multiplexing operation for each unit frame (44), the MPU sequentially executes the multiplexing operations for each the unit frame (44) between the MPU and the load control units (20, 30) in synchronism with the signal of the acknowledgement ACK (46) which is generated by the slave load control units (20, 30) upon successful receipt of the unit frame (44).

Further, the MPU implemented in the master load control unit (10) of the present embodiment compares the checksum information of the control specification information (42), sent from the master load control unit, and the verification ACK (48) received from each of the slave load control units (20, 30), as shown in FIGS. 12 to 14. If there is a match between them, the multiplexing of the control specification information (42) is completed, and the communication shifts to normal-mode communication. On the other hand, if no match arises between them, the multiplexing operation for each unit frame (44) on the basis of the control specification information (42) can be executed again.

The operation of the slave load control units (20, 30) of the present embodiment will now be described.

At least one slave load control unit (the two slave load control units 20 and 30 in the present embodiment) is capable of controlling the electrical power supply fed to electrical equipment such as lamps and an air conditioner disposed as loads in a vehicle, as shown in FIGS. 8(a) to (e). The slave load control units are connected to the multiplex transmission network (40) and are provided with the nonvolatile storage sections (21, 31) for holding the control specification information (42), respectively. The slave load control units are capable of executing a multiplexing operation, as slave units, between the slave load control units and the master load control unit (10) through the multiplex transmission network (40).

The slave load control units (20, 30), which are respectively made up of the load control units (51, . . . 51), respectively generate the verification ACK (48) which is checksum information with respect to the control specification information (42) received from the master load control unit (10), as shown in FIGS. 11 to 14. The slave load control units also compare the verification ACK (48) and the confirmation ACK (48) received from the master load control unit (10). If no match arises between these verification ACK (48) codes, the multiplexing processing is executed again for each unit frame (44) on the basis of the control specification information (42) of the master load control unit (10). If there is a match between the verification ACK (48) codes, the slave load control units further compare the control specification information (42) held in the nonvolatile storage sections (21, 31) of the slave load control units (20, 30) and the control specification information (42) received from the master load control unit (10). If no match arises between these control specification information items (42), the contents of the storage sections of the slave load control units (20, 30) are updated so as to be replaced with the control specification information (42) received from the master load control unit (10), and the multiplexing operation in the initial-mode communication (45a-2) is completed. The communication then becomes possible to shift to the normal-mode communication (45a-1).

In the slave load control units (20, 30), the communications I/F circuit is capable of transferring the control specification information (42) among units (i.e., it is capable of exchanging the information between the units through multiplex communication). The input I/F circuit is capable of receiving signals from a plurality of sensors (e.g., temperature sensors), and it transfers the thus received signals to the MPU. The output I/F circuit is capable of receiving signals from a plurality of loads (L1 or L2), (L3 or L4) such as lamps, motors, and an air conditioner, and it transfers the thus received signals to the MPU. The ROM is read only memory for holding predetermined control programs (including a communications protocol for multiplex transmission) and fixed data. The temporary storage section (RAM) (24, 34) is programmable read memory used as a work area in which the control specification information (42) or the control status information (41) is expanded when a job defined by the control program is executed. The nonvolatile memory (EEPROM is used in the present embodiment) serves as the nonvolatile storage section (21, 31) for recording the control specification information (42) or the control status information (41). The built-in timer is capable of generating a trigger signal for the purposes of restoring processing by executing a predetermined count-up operation or count-down operation if the communication mode is in an abnormal condition. The MPU is capable of collectively executing the multiplexing operation. The built-in timer may be shared between the resetting apparatus (60) and the multiplex transmission system (50). Similarly, the count-up or count-down information of the built-in timer may be multiplexed, and the thus multiplexed information may be shared between the resetting apparatus (60) and the multiplex transmission system (50).

The MPU implemented in each of the slave load control units (20, 30) of the present embodiment calculates checksum information with respect to the control specification information (42) or the control status information (41) which is sent from the master load control unit (10) while being divided into the unit frames (44), as shown in FIG. 11 or FIG. 12. The MPU also executes the multiplexing operation so as to send the thus calculated checksum information to the master load control unit (10) as the verification ACK (48).

The MPU implemented in each of the slave load control units (20, 30) executes the multiplexing operation, which the MPU of the master load control unit (10) executes as the master system, in synchronism with the MPU of the master load control unit (10) as a slave system. The MPUs also individually execute internal processing of the nonvolatile storage sections (EEPROM) 21 and 31 in the slave load control units (20, 30), such as the updating of the contents of the storage sections.

The MPU implemented in each of the slave load control units (20, 30) generates the verification ACK (48) which is the checksum information with respect to the control specification information (42) received from the master load control unit (10), as shown in FIGS. 11 to 14. The MPU compares the verification ACK (48) and the confirmation ACK (48) received from the master load control unit (10). If no match arises between these verification ACK (48) codes, the multiplexing operation is executed again for each unit frame (44) on the basis of the control specification information (42) of the master load control unit (10). If there is a match between the verification ACK (48) codes, the MPUs further compare the control specification information (42) held in the nonvolatile storage sections (21, 31) of the slave load control units (20, 30) and the control specification information (42) received from the master load control unit (10). If no match arises between these control specification information items (42), the contents of the nonvolatile storage sections (21, 31) of the slave load control units (20, 30) are updated so as to be replaced with the control specification information (42) received from the master load control unit (10), and the multiplexing operation of the control specification information (42) is completed. The communication is capable of shifting to the normal-mode communication.

As described above, by means of the multiplex transmission system (50) of the second embodiment of the present invention, it becomes possible to transfer the control specification information, which is held in the removable external storage unit (11) electrically attachable to the master load control unit (10), to each of the slave load control units (20, 30). Further, it becomes possible to hold the thus transferred control specification information (42) in each of the nonvolatile storage sections (21, 31) of the slave load control units (20, 30). As a result, it becomes possible to easily, quickly, accurately initialize the multiplex transmission system (50).

As a result of the use of the electrically removable external storage unit (11), it becomes easy, quick, accurate to design the multiplex transmission system (50) which uses new control specification information (42) at a place spaced apart from the current multiplex transmission system (50).

In short, it is possible to easily, quickly, and accurately transfer the control specification information (42) of the master load control unit (10) to the slave load control units (20, 30), which in turn makes it possible to easily, quickly, and accurately control electrical equipment aboard a vehicle such as lamps and an air conditioner (e.g., the accurate control of a flashing cycle of the lamps, the illuminance of the lamps and lightening actions of a lamp synchronized with door openings, and the control of supply of electrical power such as ON/OFF operations of the air conditioner).

According to the multiplex transmission system (50), and the resetting method and the resetting apparatus for use therewith, when the updated control specification information (42) is transferred to the slave load control units (20, 30), the master load control unit (10) transmits a frame in synchronism with the acknowledgement ACK (46). The checksum information with respect to the control specification information (42) which has been sent while having divided into the unit frames (44) can be sent to each of the slave load control units (20, 30) as the verification ACK (48).

As a consequence, it becomes possible to realize the multiplex transmission system (50) which is highly resistant to disturbance such as noise as well as is highly reliable. Moreover, the multiplex transmission system can highly reliably, and accurately control electrical equipment aboard a vehicle such as lamps and an air conditioner, and more specifically, the control of a flashing cycle of the lamps, the illuminance of the lamps and lightening actions of a lamp synchronized with door openings, ON/OFF operations of the air conditioner, or the like.

The configuration of the frame structure (43) of the unit frame (44) of the present embodiment will now be described.

The control specification information (42) or the control status information (41) is transmitted on a unit frame basis. Such a unit frame (44) is divided into a predetermined number of subdivisions by the master load control unit (10) or the slave load control units (20, 30), as shown in FIGS. 8(a) to (e). The thus divided unit frames are transmitted (i.e., multiplexed) through the multiplex transmission network (40).

A communications protocol used for executing a multiplexing operation is described in the header (45) which is included in the frame structure (43) of the unit frame (44) by the resetting apparatus (60), the master load control unit (10), or each of the slave load control units (20, 30) through the multiplex transmission system (40), as shown in FIG. 7 or FIGS. 8(a) to (e).

Similarly, the contents of the control specification information (42) or the control status information (41) are described in the data sequence (44a) by the master load control unit (10) or each of the slave load control units (20, 30).

As for the BCC shown in FIGS. 8(a) to (e), BCC is a block checksum character described by the master load control unit (10) or each of the slave load control units (20, 30), and also signifies the checksum of the transmitted/received unit frame.

As a result of the use of the frame structure (43) of this unit frame (44), it is possible for the master load control unit (10) to selectively enter a transmission mode according to a predetermined rule so as to start the initial-mode communication (45a-2) when restoring (e.g., resetting) the load control unit from an abnormal condition. The multiplexing of the control specification information (42) held in the master load control unit (10) can be selectively executed with respect to other load control units (51, . . . ,51) (i.e., the slave load control units (20, 30) 2, 3) according to a predetermined rule. Accordingly, it is possible to prevent the normally operating load control units (51, . . . ,51) from being forcibly subjected to the initial-mode communication (45a-2) when the load control unit is restored (e.g., reset) from an abnormal condition to a normal condition.

Further, it is possible to prevent the normally operating load control units (51, . . . ,51) from being forcibly subjected to the initial-mode communication (45a-2) which uses the control specification information (42) or control status information (41) of the master load control unit (10). As a consequence, the control and multiplexing operations of the normal loads (22a, 22b, 32a, and 32b) executed by the normally operating load control units (51, . . . ,51) are not interrupted. Therefore, the multiplex transmission system of the present invention ensures uninterrupted execution of control and multiplexing operations of the normal loads (22a, 22b, 32a, and 32b).

In short, it is possible to prevent the execution of the control and multiplexing operations of the loads (22a, 22b, 32a, and 32b) on the basis of the initial-mode communication (45a-2) by interrupting the control and multiplexing operations of the normally operating loads (22a, 22b, 32a, and 32b) when the load control unit is restored (e.g., reset) from an abnormal condition to a normal condition. Consequently, the multiplex transmission system of the present invention ensures uninterrupted execution of control and multiplexing operations of the normal loads (22a, 22b, 32a, and 32b). As a result, it becomes possible to resume the interrupted load control and multiplexing operations which require a high degree of reliability and accuracy. Further, it becomes possible to realize the multiplex transmission system (50) which is highly resistant to disturbance such as noise as well as is highly reliable. Moreover, the multiplex transmission system can highly reliably, and accurately control electrical equipment aboard a vehicle such as lamps and an air conditioner, more specifically, the control of a flashing cycle of the lamps, the illuminance of the lamps and lightening actions of a lamp synchronized with door openings, ON/OFF operations of the air conditioner, or the like.

The operation of the header (45) of the unit frame (44) according to the second embodiment of the present invention will now be described.

The header (45) of the present embodiment is 8 bits long, as shown in FIGS. 8(a) to (e). The resetting apparatus (60), the master load control unit (10), or each of the slave load control units (20, 30) can transfer communication mode information (45a), (B7), recognition code information (45b), (B6, B5), frame type information (45c), (B4), and frame numbers (B3–B0) into the header.

The communication mode information (45a) is transferred by the subject of communication (i.e., the resetting apparatus (60), the master load control unit (10), or each of the slave load control units (20, 30)) when it carries out the initial-mode communication (45a-2) signifying the execution of the multiplexing of the control specification information (42) held in the removable external storage unit (11) or the normal-mode communication (45a-1) signifying the execution of the multiplexing of the control status information (41).

The recognition code information (45b) is transferred by one of the load control units (51, . . . ,51) when it sends the control specification information (42) or the control status information (41) while it is divided into the unit frames (44). The subject of communication (i.e., the master load control unit (10) or each of the slave load control units (20, 30)) can describe whether the sender is the master load control unit (10) or one of the slave load control units (20, 30).

The subject of communication (i.e., the master load control unit (10) or each of the slave load control units (20, 30)) can transfer the frame type information (45c) so as to show whether the unit frame (44) to be sent is an ACK frame (45c-1), signifying the unit frame (44) of the control specification information (42) multiplexed in the environment in which the initial-mode communication (45a-2) is executed, or a normal frame (45c-2) signifying the unit frame (44) of the control status information (41) multiplexed in the environment in which the normal-mode communication (45a-1) is executed.

As a result of the use of the header (45) having such a data structure, the master load control unit (10) may selectively enter a transmission mode according to a predetermined rule so as to start the initial-mode communication (45a-2) when returning (e.g., when it is reset) from an abnormal condition. The multiplexing of the control specification information (42) held in the master load control unit (10) can be selectively executed with respect to other load control units (51, . . . ,51) (i.e., the slave load control units (20, 30) 2, 3) according to a predetermined rule. Accordingly, it in possible to prevent the normally operating load control units (51, . . . ,51) from being forcibly subjected to the initial-mode communication (45a-2) when the load control unit is restored (e.g., reset) from an abnormal condition to a normal condition.

Further, it is possible to prevent the normally operating load control units (51, . . . ,51) from being forcibly subjected to the initial-mode communication (45a-2) which uses the control specification information (42) or control status information (41) of the master load control unit (10). As a consequence, the control and multiplexing operations of the normal loads (22a, 22b, 32a, and 32b) executed by the normally operating load control units (51, . . . ,51) are not interrupted. Therefore, the multiplex transmission system becomes possible to ensure uninterrupted execution of control and multiplexing operations of the normal loads (22a, 22b, 32a, and 32b).

In short, it is possible to prevent the execution of the control and multiplexing operations of the loads (22a, 22b, 32a, and 32b) on the basis of the initial-mode communication (45a-2) by interrupting the control and multiplexing operations of the normally operating loads (22a, 22b, 32a, and 32b) when the load control unit is restored (e.g., reset) from an abnormal condition to a normal condition. Consequently, the multiplex transmission system of the present invention ensures uninterrupted execution of control and multiplexing operations of the normal loads (22a, 22b, 32a, and 32b). As a result, it becomes possible to resume the interrupted load control and multiplexing operations which require a high degree of reliability and accuracy. Further, it becomes possible to realize the multiplex transmission system (50) which is highly resistant to disturbance such as noise as well as is highly reliable. Moreover, the multiplex transmission system can highly reliably, and accurately control electrical equipment aboard a vehicle such as lamps and an air conditioner, and more specifically, the control of a flashing cycle of the lamps, the illuminance of the lamps and lightening actions of a lamp synchronized with door openings, ON/OFF operations of the air conditioner, or the like.

The operation of the initial-mode communication (for a normal condition) of the control specification information (42) in a normal condition will now be described.

The multiplex transmission system (50) of the present embodiment executes a multiplexing operation for a normal condition according to the following procedures.

[Step 1] After power has been turned on as a result of a resetting operation, the slave load control unit (20) and the slave load control unit (30) fetch the control specification information (42) stored in the respective nonvolatile storage sections (EEPROM) (21, 31) and hold the thus fetched information in the respective temporary storage sections (RAM) (24, 34) of the slave load control units.

Simultaneously, the master load control unit electrically attaches the removable external storage unit (EEPROM) (11) to the master load control unit (10) after the power has been turned on as result of resetting, whereby the control specification information (42) held in the removable external storage unit (11) is read. In this event, the master load control unit (10) reads the control specification information (42) held in the removable external storage unit (EEPROM) (11).

In the present embodiment, the reading of the information is continuously carried out so as to continuously read the same control specification information (42) several times.

In the case where the master load control unit (10) continuously reads the information several times (three times in the present embodiment), the true control specification information (42) is recognized when all of the read control specification information items (42) match with each other, that is, at the time of a 100% match between the read control specification information items (three times). The thus recognized control specification information (42) is read in the temporary storage section (RAM) (14). A multiplexing operation based on the thus fetched control specification information (42) can be executed between the master load control unit and the slave load control units (20, 30).

As a result, it becomes possible to realize the multiplex transmission system (50) which is highly resistant to disturbance such as noise as well as is highly reliable. Moreover, the multiplex transmission system can highly reliably, and accurately control electrical equipment aboard a vehicle such as lamps and an air conditioner, and more specifically, the control of a flashing cycle of the lamps, the illuminance of the lamps and lightening actions of a lamp synchronized with door openings, ON/OFF operations of the air conditioner, or the like.

[Step 2] In the multiplexing operation based on the thus fetched control specification information (42), the master load control unit (10) divides the thus fetched control specification information (42) into a predetermined number of unit frames 44 (16 unit frames (one frame is 8 bytes long) in the present embodiment. The master load control unit sequentially executes the multiplexing operation for each unit frame (44) between the master load control unit and the slave load control units (20, 30).

The sequential execution of the multiplexing operation for each unit frame 44 signifies the execution of the multiplexing operation for each unit frame (44) in a constant order, e.g., the execution of the multiplexing of the first unit frame (44), the execution of the multiplexing of the second frame (44), . . . , the execution of the multiplexing of a unit frame (44) of the last number (i.e., the last unit frame).

In short, as a result of the execution of the multiplexing operation for each unit frame (44), it becomes possible to realize the multiplex transmission system (50) which is highly resistant to disturbance such as noise as well as is highly reliable. Moreover, the multiplex transmission system can highly reliably, and accurately control electrical equipment aboard a vehicle such as lamps and an air conditioner, and more specifically, the control of a flashing cycle of the lamps, the illuminance of the lamps and lightening actions of a lamp synchronized with door openings, ON/OFF operations of the air conditioner, or the like.

[Step 3] When the multiplexing operation is sequentially executed for each unit frame (4) between the master load control unit and the slave load control units (20, 30), the master load control unit (10) executes the multiplexing operation in synchronism with the acknowledgement ACK (46) which is generated by the slave load control units (20, 30) upon successful receipt of the unit frame (44). In the multiplexing operation in synchronism with the acknowledgement ACK (46), the acknowledgement ACK (46) functions as a transmission start instruction (i.e., a synchronizing signal) which is sent to the slave load control units (20, 30) of the unit frame (44).

[Step 4] In the case where the multiplexing operation in synchronism with the acknowledgement ACK (46) is executed, each of the slave load control units (20, 30) sends the acknowledgement ACK (46) to the master load control unit (10) upon successful receipt of the unit frame (44) from the master load control unit (10).

The master load control unit (10) resends the unit frame (44) once sent until it receives the acknowledgement ACK (46).

Upon receipt of the acknowledgement ACK (46), the master load control unit (10) sequentially sends new unit frames (44) subsequent to the currently sent unit frame (44) (FIG. 9 or FIGS. 8(a) to (e)). Specifically, the master load control unit sequentially sends subsequent unit frames in order: namely, a first unit frame (44)→a second unit frame (44)→, . . . , a fifteenth unit frame (44)→a sixteenth unit frame (44).

In short, as a result of the execution of the multiplexing operation in synchronism with the acknowledgement ACK (46), it becomes possible to realize the multiplex transmission system (50) which is highly resistant to disturbance such as noise as well as is highly reliable. Moreover, the multiplex transmission system can highly reliably, and accurately control electrical equipment aboard a vehicle such as lamps and an air conditioner, and more specifically, the control of a flashing cycle of the lamps, the illuminance of the lamps and lightening actions of a lamp synchronized with door openings, ON/OFF operations of the air conditioner, or the like.

[Step 5] After the completion of the sequential transmission of a predetermined number (16 in the present embodiment) of unit frames (44) (i.e., the completion of the transmission of the control specification information (42) from the master load control unit (10) while it is divided into the unit frames (44)), the slave load control units (20, 30) respectively calculate checksum information with respect to the control specification information (42) which is sent from the master load control unit (10) while it is divided into the unit frames (44). The thus calculated checksum information is sent to the master load control unit (10) as the verification ACK (48).

The completion of the sequential transmission of a predetermined number (16 in the present embodiment) of unit frames (44) signifies the receipt of the acknowledgement ACK (46) codes, which are the same as the transmitted unit frames (i.e., a predetermined number is 16), from the slave load control units (20, 30) as a result of the transmission of all the unit frames (44).

[Step 6] If no match arises between the verification ACK (48) codes (i.e., between the verification ACK (48) sent from the slave load control unit (20) to the master load control unit (10) and the verification ACK (48) received from the master load control unit (10) or between the verification ACK (48) sent from the slave load control unit (30) to the master load control unit (10) and the verification ACK (48) received from the master load control unit (10)), the master load control unit (10) judges that the control specification information (42) of the master load control unit (10) has not been successfully sent. Then, the multiplexing operation based on the control specification information is executed again for each unit frame (44).

In this event, if there is a match between the verification ACK (48) codes (i.e., between the verification ACK (48) of the slave load control unit (20) and the verification ACK (48) of the master load control unit (10) or between the verification ACK (48) of the slave load control unit (30) and the verification ACK (48) of the master load control unit (10)), the control specification information (42) held in the nonvolatile storage sections (21, 31) of the slave load control units (20, 30) and the control specification information (42) received from the master load control unit (10) are further compared with each other.

If no match arises between these control specification information items (42) (i.e., between the control specification information (42) held in the nonvolatile storage section (21) of the slave load control unit (20) and the control specification information (42) received from the master load control unit (10) or between the control specification information held in the nonvolatile storage section (31) of the slave load control unit (30) and the control specification information received from the master load control unit (10)), the contents of the nonvolatile storage sections (21, 31) of the slave load control units (20, 30) are updated so as to be replaced with the control specification information (42) received from the master load control unit (10), and the multiplexing operation of the control specification information (42) is completed. It is judged that the communication mode of the control specification information (44) has been normally completed, and hence the communication shifts to the normal-mode communication.

In short, as a result of the execution of the multiplexing operation which involves the comparison of the acknowledgement ACK (46) codes, it becomes possible to realize the multiplex transmission system (50) which is highly resistant to disturbance such as noise as well as is highly reliable. Moreover, the multiplex transmission system can highly reliably, and accurately control electrical equipment aboard a vehicle such as lamps and an air conditioner, and more specifically, the control of a flashing cycle of the lamps, the illuminance of the lamps and lightening actions of a lamp synchronized with door openings, ON/OFF operations of the air conditioner, or the like.

[Step 7] The master load control unit (10) compares the checksum information of the control specification information (42), sent from the master load control unit, and the verification ACK (48) received from each of the slave load control units (20, 30).

If there is a match between them, the master load control unit (10) judges that the communication mode of the control specification information (44) has been normally completed. Then, the multiplexing of the control specification information (42) is completed, and the communication shifts to normal-mode communication.

On the other hand, if no match arises between them, the master load control unit (10) executes again the multiplexing operation for each unit frame (44) based on the control specification information (42).

In short, as a result of the execution of the multiplexing operation which involves the comparison of the verification ACK (48) codes, it becomes possible to realize the multiplex transmission system (50) which is highly resistant to disturbance such as noise as well as is highly reliable. Moreover, the multiplex transmission system can highly reliably, and accurately control electrical equipment aboard a vehicle such as lamps and an air conditioner, and more specifically, the control of a flashing cycle of the lamps, the illuminance of the lamps and lightening actions of a lamp synchronized with door openings, ON/OFF operations of the air conditioner, or the like.

Specific examples of multiplexing operation in an abnormal condition will now be described below.

First Example of Multiplexing Operation in an Abnormal Condition

The two slave load control means (20, 30) are waiting for the control specification information (42) from the master load control unit (10) in the communication mode of the control specification information (42). Hence, if the master load control unit (10) is in an abnormal condition, all of the functions become inoperative (FIG. 12(a)).

Second Example of Multiplexing Operation in an Abnormal Condition

The slave load control means (20, 30) start their built-in timers after the receipt of the control specification information (42) from the master load control unit (10).

By means of the built-in timers, the acknowledgement ACK (46) can be sent after the lapse of a predetermined period (by the built-in timers) even if the master load control unit fails to receive the acknowledgement ACK from the slave load control units (20, 30) (FIG. 12(b)).

Third Example of Multiplexing Operation in an Abnormal Condition

The master load control unit (10) starts its built-in timer after the receipt of the acknowledgement ACK from the slave load control units (20, 30).

By means of the built-in timer, the control specification information (42) can be sent again after the lapse of a predetermined period (by the built-in timer) even if the master load control unit fails to receive the acknowledgement ACK from the slave load control units (20, 30) (FIG. 12(c)).

Fourth Example of Multiplexing Operation in an Abnormal Condition

The master load control unit (10) starts its built-in timer after having sent the control specification information (42).

By means of the built-in timer, the control specification information (42) can be sent again after the lapse of a predetermined period (as a result of a counting operation of the built-in timer) even if the master load control unit fails to receive the acknowledgement ACK from the slave load control units (20, 30) (FIG. 12(d)).

As described above, according to the second embodiment of the present invention, it becomes possible to realize the multiplex transmission system (50) which is highly resistant to disturbance such as noise as well as is highly reliable. Moreover, the multiplex transmission system can highly reliably, and accurately control electrical equipment aboard a vehicle such as lamps and an air conditioner, and more specifically, the control of a flashing cycle of the lamps, the illuminance of the lamps and lightening actions of a lamp synchronized with door openings, ON/OFF operations of the air conditioner, or the like.

Next, the operation of the resetting method according to the embodiment of the present invention will be described.

Abnormalities as used herein signify communication failures in the multiplex transmission network (40) or operation failures of the load control units (51, . . . 51) due to an anomaly of the electrical power source.

A resetting method according to the second embodiment of the present invention makes it possible to detect abnormalities associated with the multiplexing operation carried out in the multiplex transmission system (50) as well as to reset the load control units (51, . . . ,51) so as to restore them from an abnormal condition to a normal condition.

As shown in FIGS. 12(a) to (d) or FIG. 14, the resetting method makes it possible to restore the abnormal load control units to a normal condition through the execution of the following restoring operations ([Restoring Operation 1] to [Restoring Operation 3]).

Restoring Operation 1

If the master load control unit (10) becomes abnormal during the course of the execution of the normal-mode communication (45a-1), and if the normal-mode communication (45a-1) is described in the communication mode information (45a), the master load control unit (10) is restored to a normal condition by executing the multiplexing operation with respect to the master load control unit (10) by use of the control status information (41) held in the slave load control unit (20 or 30) which is normally executing the normal-mode communication.

Restoring Operation 2

If the slave load control unit (20 or 30) becomes abnormal during the course of the execution of the normal-mode communication (45a-1), and if the normal-mode communication (45a-1) is described in the communication mode information (45a), the slave load control unit (20 or 30) is restored to a normal condition by executing the multiplexing operation with respect to the abnormal slave load control unit (20 or 30) by use of the control status information (41) held in the other slave load control unit (30 or 20) or the master load control unit (10) which is normally executing the normal-mode communication (45a-1).

Restoring Operation 3

If the slave load control unit (20 or 30) becomes abnormal during the course of the execution of the normal-mode communication (45a-1), and if the initial-mode communication (45a-2) is described in the communication mode information (45a), the slave load control unit (20 or 30) is restored to a normal condition by executing the multiplexing operation with respect to the abnormal slave load control unit (20 or 30) by use of the control specification information (42) held in the master load control unit (10).

With reference to the flowchart shown in FIG. 9, a restoring operation for the master load control unit (10) using the resetting method of the embodiment will now be described.

As shown in FIG. 14, the resetting apparatus (60) of the embodiment can restore the master load control unit to a normal condition by executing the Restoring Operation 1 which will be described below.

Restoring Operation 1

If the master load control unit (10) becomes abnormal during the course of the execution of the normal-mode communication (45a-1), and if the abnormal load control unit information (62a) is generated based on the fact that the normal-mode communication (45a-1) is described in the communication mode information (45a) (step S2→step S3) as a result of the detection of B7 of the header 45 (step S1→step S2), recovery control unit (64) restores the master load control unit (10) to a normal condition by executing a multiplexing operation with respect to the master load control unit (10), using the control status information (41) held in the slave load control unit (20 or 30) which is normally executing the normal-mode communication (45a-1) (step S3→S4).

If the master load control unit (10) becomes abnormal during the course of the execution of the normal-mode communication (45a-1), and if it is judged that the initial-mode communication (45a-2) is described in the communication mode information (45a) (step S1→Y in step S2 or N in step 2→N in step S3) as a result of the detection of B7 of the header 45 (step S1→step S2), the master load control unit can return to a normal condition (the normal-mode communication (45a-1)) after the initial-mode communication (45a-2) based on the communication mode of the control specification information (42) in an abnormal condition shown in FIGS. 12(a) to (d) has been executed (Y in step S2→step S5→step S6→step S7) (step S4).

As a result, the master load control unit (10) may selectively enter a transmission mode according to a predetermined rule so as to start the initial-mode communication (45a-2) when returning (e.g., when it is reset) from an abnormal condition. The multiplexing of the control specification information (42) held in the master load control unit (10) can be selectively executed with respect to other load control units (51, . . . ,51) (i.e., the slave load control units (20, 30) 2, 3) according to a predetermined rule. Accordingly, it is possible to prevent the normally operating load control units (51, . . . ,51) from being forcibly subjected to the initial-mode communication (45a-2) when the load control unit is restored (e.g., reset) from an abnormal condition to a normal condition.

Further, it is possible to prevent the normally operating load control units (51, . . . ,51) from being forcibly subjected to the initial-mode communication (45a-2) which uses the control specification information (42) or control status information (41) of the master load control unit (10). As a consequence, the control and multiplexing operations of the normal loads (22a, 22b, 32a, and 32b) executed by the normally operating load control units (51, . . . ,51) are not interrupted. Therefore, the multiplex transmission system according to the present invention ensures uninterrupted execution of control and multiplexing operations of the normal loads (22a, 22b, 32a, and 32b).

In short, it is possible to prevent the execution of the control and multiplexing operations of the loads (22a, 22b, 32a, and 32b) on the basis of the initial-mode communication (45a-2) by interrupting the control and multiplexing operations of the normally operating loads (22a, 22b, 32a, and 32b) when the load control unit is restored (e.g., reset) from an abnormal condition to a normal condition. Consequently, the multiplex transmission system of the present invention ensures uninterrupted execution of control and multiplexing operations of the normal loads (22a, 22b, 32a, and 32b). As a result, it becomes possible to resume the interrupted load control and multiplexing operations which require a high degree of reliability and accuracy. Further, it becomes possible to realize the multiplex transmission system (50) which is highly resistant to disturbance such as noise as well as is highly reliable. Moreover, the multiplex transmission system can highly reliably, and accurately control electrical equipment aboard a vehicle such as lamps and an air conditioner, and more specifically, the control of a flashing cycle of the lamps, the illuminance of the lamps and lightening actions of a lamp synchronized with door openings, ON/OFF operations of the air conditioner, or the like.

With reference to the flowchart shown in FIG. 10, a restoring operation for the slave load control units (20, 30) using the resetting method of the embodiment will now be described.

As shown in FIG. 14, the resetting apparatus (60) of the embodiment can restore the slave load control units to a normal condition by executing the ([Restoring Operation 2] and [Restoring Operation 3]) which will be described below.

In the processing for restoring the slave load control units (20, 30) to a normal condition, the initial-mode communication (45a-2) of the master load control unit (10) or the normal-mode communication (45a-1) (i.e., the communication mode) is constantly monitored. If a request for the initial-mode communication (45a-2) in the header (45) is detected, the initial-mode communication (45a-2) designated by steps S15 to S17 can be immediately executed.

Restoring Operation 2

If the slave load control unit (20 or 30) becomes abnormal during the course of the execution of the normal-mode communication (45a-1), if it is detected (Y in step S13) that the normal-mode communication (45a-1) is described in the communication mode information (45a) as a result of the detection of B7 of the header 45 (step S11→step S12), and if the abnormal load control unit information (62a) is generated on the basis of the normal-mode communication (45a-1) (Y in step S12→Y in step S13), the recovery control unit (64) restores the slave load control unit (20 or 30) to a normal condition (the normal-mode communication (45a-1)) by executing a multiplexing operation with respect to the slave load control unit (20 or 30) (Y in step S13→step S14), using the control status information (41) held in the other slave load control unit (30 or 20) or the master load control unit (10) which is normally executing the normal-mode communication (45a-1).

Restoring Operation 3

If the slave load control unit (20 or 30) becomes abnormal during the course of the execution of the normal-mode communication (45a-1), if it is detected (N in step S13) that the initial-mode communication (45a-2) is described in the communication mode information (45a) as a result of the detection of B7 of the header 45 (step S11→step S12), and if the abnormal load control unit information (62a) is generated based on the initial-mode communication (45a-2) (N in step S13), the recovery control unit (64) restores the slave load control unit (20 or 30) to a normal condition (the normal-mode communication (45a-1)) by executing a multiplexing operation with respect to the slave load control unit (20 or 30) (Y in step S13→step S15→step S16→step S17), using the control specification information (42) held in the master load control unit (10).

As a result, the master load control unit (10) can selectively enter a transmission mode according to a predetermined rule so as to start the initial-mode communication (45a-2) when returning (e.g., when it is reset) from an abnormal condition. The multiplexing of the control specification information (42) held in the master load control unit (10) can be selectively executed with respect to other load control units (51, . . . ,51) (i.e., the slave load control units (20, 30) 2, 3) according to a predetermined rule. Accordingly, it is possible to prevent the normally operating load control units (51, . . . ,51) from being forcibly subjected to the initial-mode communication (45a-2) when the load control unit is restored (e.g., reset) from an abnormal condition to a normal condition.

Further, it is possible to prevent the normally operating load control units (51, . . . ,51) from being forcibly subjected to the initial-mode communication (45a-2) which uses the control specification information (42) or control status information (41) of the master load control unit (10). As a consequence, the control and multiplexing operations of the normal loads (22a, 22b, 32a, and 32b) executed by the normally operating load control units (51, . . . ,51) are not interrupted. Therefore, the multiplex transmission system becomes possible to ensure uninterrupted execution of control and multiplexing operations of the normal loads (22a, 22b, 32a, and 32b).

In short, it is possible to prevent the execution of the control and multiplexing operations of the loads (22a, 22b, 32a, and 32b) on the basis of the initial-mode communication (45a-2) by interrupting the control and multiplexing operations of the normally operating loads (22a, 22b, 32a, and 32b) when the load control unit is restored (e.g., reset) from an abnormal condition to a normal condition. Consequently, the multiplex transmission system of the present invention ensures uninterrupted execution of control and multiplexing operations of the normal loads (22a, 22b, 32a, and 32b). As a result, it becomes possible to resume the interrupted load control and multiplexing operations which require a high degree of reliability and accuracy. Further, it becomes possible to realize the multiplex transmission system (50) which is highly resistant to disturbance such as noise as well as is highly reliable. Moreover, the multiplex transmission system can highly reliably, and accurately control electrical equipment aboard a vehicle such as lamps and an air conditioner, and more specifically, the control of a flashing cycle of the lamps, the illuminance of the lamps and lightening actions of a lamp synchronized with door openings, ON/OFF operations of the air conditioner, or the like.

The operation of the resetting apparatus (60) using the resetting method of the embodiment will now be described.

As shown in FIGS. 12(a) to (d) or FIG. 14, the resetting apparatus (60) of the embodiment can restore the load control unit to a normal condition by executing the ([Restoring Operation 1] to [Restoring Operation 3]) which will be described below.

Restoring Operation 1

If the master load control unit (10) becomes abnormal during the course of the execution of the normal-mode communication (45a-1), and if abnormal load control unit information (62a) is generated based on the fact that the normal-mode communication (45a-1) is described in the communication mode information (45a), the recovery control unit (64) restores the master load control unit (10) to a normal condition by executing a multiplexing operation with respect to the master load control unit (10), using the control status information (41) held in the slave load control unit (20 or 30) which is normally executing the normal-mode communication (45a-1).

Restoring Operation 2

If the slave load control unit (20 or 30) becomes abnormal during the course of the execution of the normal-mode communication (45a-1), and if the abnormal load control unit information (62a) is generated based on the fact that the normal-mode communication (45a-1) is described in the communication mode information (45a), the recovery control unit (64) restores the slave load control unit (20 or 30) to a normal condition by executing a multiplexing operation with respect to the slave load control unit (20 or 30), using the control status information (41) held in the other slave load control unit (30 or 20) or the master load control unit (10) which is normally executing the normal-mode communication (45a-1).

Restoring Operation 3

If the slave load control unit (20 or 30) becomes abnormal during the course of the execution of the normal-mode communication (45a-1), and if the abnormal load control unit information (62a) is generated based on the fact that the initial-mode communication (45a-2) is described in the communication mode information (45a), the recovery control unit (64) restores the slave load control unit (20 or 30) to a normal condition by executing a multiplexing operation with respect to the slave load control unit (20 or 30), using the control specification information (42) held in the master load control unit (10).

More specifically, the operation of the resetting apparatus (60) of the present embodiment will be described.

As shown in FIG. 7, the abnormality detecting unit (62) is capable of detecting an abnormal multiplexing operation arising in the load control units (51, . . . 51) which carry out the multiplex operation on the multiplex transmission network (40). Further, the abnormality detecting unit (62) is capable of generating the abnormal load control unit information (62a) on the basis of the recognition code described in the header (45) by specifying the abnormal load control unit from the load control units (51, . . . ,51).

As shown in FIG. 7, the recovery control unit (64) is capable of selecting either the initial-mode communication (45a-1) or the normal-mode communication (45a-1) as a restoring operation to be executed according to the abnormal load control unit information (62a). The recovery control unit (64) describes the communication mode information (45a) in the header (45) when executing the thus selected restoring operation. Further, the recovery control unit (64) is capable of restoring the load control unit of the load control units (51, . . . 51) which caused the abnormal multiplexing operation by executing the selected restoring operation with respect to that load control unit on the basis of the abnormal load control unit information (62a) and the communication mode information (45a).

Still more specifically, the operation of the recovery control unit (64) and the abnormality detecting unit (62) of the present embodiment will be described.

In the recovery control unit (64) and the abnormality detecting unit (62) of the present embodiment, the communications I/F circuit is capable of transferring the control specification information (42) among units (i.e., for exchanging the information between the units through multiplex communication). The ROM is read only memory for holding control programs relevant to a predetermined restoring operation (including a communications protocol for multiplex transmission) and fixed data. The temporary storage section (RAM) is programmable read memory used as a work area in which is the control specification information (42) or the control status information (41) is expanded when a job defined by the control program is executed. The built-in timer is capable of generating a trigger signal for the purposes of restoring processing by executing a predetermined count-up operation or count-down operation if the communication mode is in an abnormal condition. The MPU is capable of collectively executing the multiplexing operation. The built-in timer may be shared between the resetting apparatus (60) and the multiplex transmission system (50). Similarly, the count-up or count-down information of the built-in timer may be multiplexed, and the thus multiplexed information may be shared between the resetting apparatus (60) and the multiplex transmission system, (50).

The MPUs implemented in the recovery control unit (64) and the abnormality detecting unit (62) of the present embodiment can collectively carry out the resetting method for use in the resetting apparatus (60) capable of detecting abnormalities associated with the multiplexing operation carried out in the multiplex transmission system (50) as well as resetting the load control units (51, . . . ,51) so as to restore them from an abnormal condition to a normal condition.

The MPUs are connected to the slave load control units (20, 30) and the master load control unit (10) through the multiplex transmission network (40) so as to make it possible to monitor the multiplexing operation for each unit frame (44) in synchronism with the acknowledgement ACK (46) which are generated by the slave load control units (20, 30) upon successful receipt of the unit frame (44), when the multiplexing operation is executed for each unit frame (44).

The MPUs are also capable of monitoring the following operations. The checksum information of the control specification information (42) sent by the MPUs and the verification ACK (48) received from the slave load control units (20, 30) are compared with each other. If there is a match between them, the multiplexing of the control specification information (42) is completed, and the communication shifts to the normal-mode communication. If no match arises between them, the multiplexing operation is executed again for each unit frame (44) on the basis of the control specification information (42).

The MPUs implemented in the recovery control means (64) and the abnormality detecting means (62) restore the load control unit from an abnormal condition to a normal condition by executing the following restoring operations ([Restoring Operation 1) to (Restoring Operation 3]).

Restoring Operation 1

If the master load control unit (10) becomes abnormal during the course of the execution of the normal-mode communication (45a-1), and if the normal-mode communication (45a-1) is described in the communication mode information (45a), the master load control unit (10) is restored to a normal condition by executing the multiplexing operation with respect to the master load control unit (10) by use of the control status information (41) held in the slave load control unit (20 or 30) which is normally executing the normal-mode communication.

Restoring Operation 2

If the slave load control unit (20 or 30) becomes abnormal during the course of the execution of the normal-mode communication (45a-1), and if the normal-mode communication (45a-1) is described in the communication mode information (45a), the slave load control unit (20 or 30) is restored to a normal condition by executing the multiplexing operation with respect to the abnormal slave load control unit (20 or 30) by use of the control status information (41) held in the other slave load control unit (30 or 20) or the master load control unit (10) which is normally executing the normal-mode communication (45a-1).

Restoring Operation 3

If the slave load control unit (20 or 30) becomes abnormal during the course of the execution of the normal-mode communication (45a-1), and if the initial-mode communication (45a-2) is described in the communication mode information (45a), the slave load control unit (20 or 30) is restored to a normal condition by executing the multiplexing operation with respect to the abnormal slave load control unit (20 or 30) by use of the control specification information (42) held in the master load control unit (10).

As described above, according to the multiplex transmission system (50) of the embodiment of the present invention, it becomes possible to transfer the control specification information (42), which is held in the removable external storage unit (11) electrically attachable to the master load control unit (10), to each of the slave load control units (20, 30). Further, it becomes possible to hold the thus transferred control specification information (42) in each of the nonvolatile storage sections (21, 31) of the slave load control units (20, 30). As a result, it becomes possible to easily, quickly, and accurately initialize the multiplex transmission system (50).

As a result of the use of the electrically removable external storage unit (11), it becomes easy, quick, and accurate to design the multiplex transmission system (50) which uses new control specification information (42) at a place spaced apart from the current multiplex transmission system (50).

In short, it is possible to easily, quickly, and accurately transfer the control specification information (42) of the master load control unit (10) to the slave load control units (20, 30), which in turn makes it possible to easily, quickly, and accurately control electrical equipment aboard a vehicle such as lamps and an air conditioner (e.g., the accurate control of a flashing cycle of the lamps, the illuminance of the lamps and lightening actions of a lamp synchronized with door openings, and the control of supply of electrical power such as ON/OFF operations of the air conditioner).

According to the multiplex transmission system (50), and the resetting method and the resetting apparatus (60) for use therewith, when the updated control specification information (42) is transferred to the slave load control units (20, 30), the master load control unit (10) transmits a frame in synchronism with the acknowledgement ACK (46). The checksum information with respect to the control specification information (42) which has been sent while having divided into the unit frames (44) can be sent to each of the slave load control units (20, 30) as the verification ACK (48).

As a consequence, it becomes possible to realize the multiplex transmission system (50) which is highly resistant to disturbance such as noise as well as is highly reliable. Moreover, the multiplex transmission system can highly reliably, accurately control electrical equipment aboard a vehicle such as lamps and an air conditioner, more specifically, the control of a flashing cycle of the lamps, the illuminance of the lamps and lightening actions of a lamp synchronized with door openings, ON/OFF operations of the air conditioner, or the like.

According to the multiplex transmission system (50) of the present embodiment and the resetting method and the resetting apparatus (60) for use therewith, the master load control unit (10) may selectively enter a transmission mode according to a predetermined rule so as to start the initial-mode communication (45a-2) when restoring (e.g., resetting) the load control unit from an abnormal condition. The multiplexing of the control specification information (42) held in the master load control unit (10) can be selectively executed with respect to other load control units (51, . . . ,51) (i.e., the slave load control units (20, 30) 2, 3) according to a predetermined rule. Accordingly, it is possible to prevent the normally operating load control units (51, . . . ,51) from being forcibly subjected to the initial-mode communication (45a-2) when the load control unit is restored (e.g., reset) from an abnormal condition to a normal condition.

Further, it is possible to prevent the normally operating load control units (51, . . . ,51) from being forcibly subjected to the initial-mode communication (45a-2) which uses the control specification information (42) or control status information (41) of the master load control unit (10). As a consequence, the control and multiplexing operations of the normal loads (22a, 22b, 32a, and 32b) executed by the normally operating load control units (51, . . . ,51) are not interrupted. Therefore, the multiplex transmission system becomes possible to ensure uninterrupted execution of control and multiplexing operations of the normal loads (22a, 22b, 32a, and 32b).

In short, it is possible to prevent the execution of the control and multiplexing operations of the loads (22a, 22b, 32a, and 32b) on the basis of the initial-mode communication (45a-2) by interrupting the control and multiplexing operations of the normally operating loads (22a, 22b, 32a, and 32b) when the load control unit is restored (e.g., reset) from an abnormal condition to a normal condition.

Consequently, the multiplex transmission system becomes possible to ensure uninterrupted execution of control and multiplexing operations of the normal loads (22a, 22b, 32a, and 32b). As a result, it becomes possible to resume the interrupted load control and multiplexing operations which require a high degree of reliability and accuracy. Further, it becomes possible to realize the multiplex transmission system (50) which is highly resistant to disturbance such as noise as well as is highly reliable. Moreover, the multiplex transmission system can highly reliably, and accurately control electrical equipment aboard a vehicle such as lamps and an air conditioner, and more specifically, the control of a flashing cycle of the lamps, the illuminance of the lamps and lightening actions of a lamp synchronized with door openings, ON/OFF operations of the air conditioner, or the like.

According to the multiplex transmission system of the present invention, due to provision of simple mechanism such as the reset switch which not only makes it possible to urge the forced transfer of the load control information held in the storage part of the master load control unit to the respective slave load control units but also permits the thus transferred load control information to be held by the respective storage parts of the slave load control units, the updating of the load control information of the master load control unit can be transmitted to the respective slave load control units accurately.

Also, due to use of a storage part which can be mounted and removed electrically, the updating of the load control information can be carried out easily.

Further, in the updating operation, if the reset switch is pressed down, then the newly updated load control information of the master load control unit can be prevented from being processed multiplexingly in accordance with the load control information of the slave load control unit that is consistent with another one of the three pieces of load control information and thus occupies a majority among them, which makes it possible to urge the forced transfer of the updated load control information to the respective slave load control units.

That is, when a new storage part with the load control information updated is mounted electrically, the updating of the load control information of the master load control unit can be transmitted to the respective slave load control units accurately. Due to this, electric devices carried on board the vehicle, such as lights, an air conditioner and the like can be controlled with accuracy. That is, the on-off cycles of the lights, the intensity of the turn-on illumination of the lights, and the turn-on of the lights in linking with the opening or closing operation of the door of the vehicle can be controlled accurately. Also, the accurate control of power supply to the air conditioner for turn-on or turn-off thereof can be realized.

Also, the multiplex transmission system according to the invention not only compares the load control information held in the storage part of the master load control unit with the load control information held in the storage part(s) of the slave load control units but also, when there exists any inconsistency between the load control information, executes a majority processing on the load control information of the master load control unit as well as on the load control information of the slave load control units and, in accordance with the results of the majority processing, carries out a multiplexed processing, thereby being able to realize a highly reliable multiplexed processing. Thanks to this, according to the present invention, electric devices carried on board the vehicle, such as lights, an air conditioner and the like can be controlled with accuracy. That is, the on-off cycles of the lights, the intensity of the turn-on illumination of the lights, and the turn-on of the lights in linking with the opening or closing operation of the door of the vehicle can be controlled accurately. Also, the accurate control of power supply to the air conditioner for turn-on or turn-off thereof can be realized.

According to the multiplex transmission system of the embodiment and the resetting method and the resetting apparatus for use therewith, it becomes possible to transfer the control specification information, which is held in the removable external storage means electrically attachable to the master load control unit, to each of the slave load control units. Further, it becomes possible to hold the thus transferred control specification information in each of the non-volatile storage sections of the slave load control units. As a result, it becomes possible to easily, quickly, and accurately initialize the multiplex transmission system.

As a result of the use of the electrically removable external storage means, it becomes easy, quick, and accurate to design the multiplex transmission system which uses new control specification information at a place spaced apart from the current multiplex transmission system.

In short, it is possible to easily, quickly, and accurately transfer the control specification information of the master load control unit to the slave load control units, which in turn makes it possible to easily, quickly, accurately control electrical equipment aboard a vehicle such as lamps and an air conditioner (e.g., the accurate control of a flashing cycle of the lamps, the illuminance of the lamps and lightening actions of a lamp synchronized with door openings, and the control of supply of electrical power such as ON/OFF operations of the air conditioner).

According to the multiplex transmission system of the present embodiment, and the resetting method and the resetting apparatus for use therewith, when the updated control specification information is transferred to the slave load control units, the master load control unit transmits a frame in synchronism with the acknowledgement ACK. The checksum information with respect to the control specification information which has been sent while having divided into the unit frames can be sent to each of the slave load control units as the verification ACK.

As a consequence, it becomes possible to realize the multiplex transmission system which is highly resistant to disturbance such as noise as well as is highly reliable. Moreover, the multiplex transmission system can highly reliably, and accurately control electrical equipment aboard a vehicle such as lamps and an air conditioner, and more specifically, the control of a flashing cycle of the lamps, the illuminance of the lamps and lightening actions of a lamp synchronized with door openings, ON/OFF operations of the air conditioner, or the like.

According to the multiplex transmission system of the present embodiment and the resetting method and the resetting apparatus for use therewith, the master load control unit becomes possible to selectively enter a transmission mode according to a predetermined rule so as to start the initial-mode communication when restoring (e.g., resetting) the load control unit from an abnormal condition. The multiplexing of the control specification information held in the master load control unit can be selectively executed with respect to other load control units (i.e., the slave load control units) according to a predetermined rule. Accordingly, it is possible to prevent the normally operating load control units from being forcibly subjected to the initial-mode communication when the load control unit is restored (e.g., reset) from an abnormal condition to a normal condition.

Further, it is possible to prevent the normally operating load control units from being forcibly subjected to the initial-mode communication which uses the control specification information or control status information of the master load control unit. As a consequence, the control and multiplexing operations of the normal loads executed by the normally operating load control units are not interrupted. Therefore, the multiplex transmission system of the present invention ensures uninterrupted execution of control and multiplexing operations of the normal loads.

In short, it is possible to prevent the execution of the control and multiplexing operations of the loads on the basis of the initial-mode communication by interrupting the control and multiplexing operations of the normally operating loads when the load control unit is restored (e.g., reset) from an abnormal condition to a normal condition. Consequently, the multiplex transmission system of the present invention ensures uninterrupted execution of control and multiplexing operations of the normal loads. As a result, it becomes possible to resume the interrupted load control and multiplexing operations which require a high degree of reliability and accuracy. Further, it becomes possible to realize the multiplex transmission system which is highly resistant to disturbance such as noise as well as is highly reliable. Moreover, the multiplex transmission system can highly reliably, and accurately control electrical equipment aboard a vehicle such as lamps and an air conditioner, and more specifically, the control of a flashing cycle of the lamps, the illuminance of the lamps and lightening actions of a lamp synchronized with door openings, ON/OFF operations of the air conditioner, or the like.

What is claimed is:

1. A multiplex transmission system comprising:
   a plurality of load control units for controlling loads connected to respective ones of said plurality of load control units;
   wherein one of said load control units is a master load control unit, and a corresponding one of said loads is a master load, said master load control unit including a master storage part for storing load control information; and
   wherein at least one of said load control units is a slave load control unit, said system thereby including at least one slave load control unit, and at least a respective one of said loads in a slave load, each of said at least one slave load control unit including a slave storage part for storing said load control information;
   a multiplexing processing network, including a multiplex transmission line, for performing multiplexed processing on said load control information through said multiplex transmission line, said master load control unit and said at least one slave load control unit being connected to said multiplex transmission line; and
   a reset switch included in said master load control unit for forcing transfer of said load control information stored in said master storage part of said master load control unit to each of said at least one slave load control unit, thereby forming transferred load control information, and for allowing said transferred load control information to be held by said slave storage part of each of said at least one slave load control unit.

2. A multiplex transmission system as set forth in claim 1, wherein when said load control information stored in said master storage part of said master load control unit is updated, thereby forming updated load control information, said reset switch included in said master load control unit forces transfer of said updated load control information to each of said at least one slave load control unit, thereby forming transferred load control information, and further allows said transferred load control information to be held by the slave storage part of each of said at least one slave load control unit.

3. A multiplex transmission system as set forth in claim 1, wherein said master storage part is an electrically mountable and removable storage part, and wherein when said electrically mountable and removable storage part storing said load control information having been updated, thereby forming updated load control information is mounted, the reset switch included in the master load control unit forces transfer of said updated load control information to each of said at least one slave load control unit, thereby forming transferred load control information, and further allows said transferred load control information to be held by the slave storage part of each of said at least one slave load control unit.

4. A multiplex transmission system as claimed in claim 1, wherein
   said multiplex transmission system compares said load control information held in said master storage part of said master load control unit with said load control information held in said slave storage part of each of said at least one slave load control unit, further wherein,
   when said reset switch is not depressed and also when there exists any inconsistency between said load control information held in said master storage part and said load control information stored in said slave storage part, said multiplex transmission system further executes a majority processing on said load control information held in said master storage part of said master load control unit as well as on said load control information held in said slave storage part of each of said at least one slave load control unit to determine a majority load control information and, further wherein
   said multiplex transmission system carries out said multiplexed processing in accordance with the majority load control information to thereby create a consistency between said load control information held in said master storage part of said master load control unit and said load control information stored in said slave storage part of each of said at least one slave load control unit.

5. A multiplex transmission system as set forth in claim 4, wherein
   said majority processing comprises determining when a majority of said load control information held in said master storage part and said load control information held in said storage part of each of said at least one slave load control unit are consistent to thereby form said majority load control information, and further wherein
   said multiplex transmission system carries out said multiplexed processing in accordance with said load control information held in said master storage part of said master load control unit when said load control information held in said master storage part and said load control information held in said slave storage part of each of said at least one slave load control unit are all inconsistent with one another to thereby create a consistency between said load control information held in said master storage part and said load control information stored in said slave storage part of each of said at least one slave load control unit.

6. A multiplex transmission system comprising:
a multiplex transmission network; p1 a plurality of load control units connected to said multiplex transmission network, each of the load control units having loads connected thereto and being capable of controlling the loads, and wherein each of the load control units processes at least one of control specification information relevant to control specifications of the loads and control status information relevant to a result of control of the loads by a multiplexing operation via the multiplex transmission network;
wherein one of said load control units is a master load control unit connected to the multiplex transmission network, so as to serve as a master system for executing the multiplexing operation based on the control specification information; and
wherein at least one of said load control units is a slave load control unit, said system thereby including at least one slave load control unit, for holding the control specification information and being connected to the multiplex transmission network, so as to serve as a slave system for executing the multiplexing operation via the multiplex transmission network, with respect to the master load control unit; and
a removable nonvolatile external storage unit for updating and holding the control specification information the removable nonvolatile external storage unit being electrically removable with respect to the master load control unit, and said removable nonvolatile external storage unit being capable of reading the control specification information while being attached to the master load control unit.

7. The multiplex transmission system as defined in claim 6, wherein each of the load control units includes nonvolatile storage sections for updating and holding the control status information of a respective one of the load control units to be multiplexed in the multiplexing operation, and for reading the control status information.

8. The multiplex transmission system as claimed in claim 6, wherein the one of the control specification information and the control status information, being transmitted over the multiplex network, is divided into a predetermined number of unit frames, the unit frames being transmitted as a unit, and further wherein the unit frames are multiplexed in the multiplexing operation.

9. The multiplex transmission system as defined in claim 8, wherein a frame structure of each of the unit frames includes:
a header carrying a communications protocol for multiplexing each of the unit frames through the multiplex transmission network; and
a data sequence carrying one of the control specification information and the control status information, wherein the header further includes:
communication mode information described by a subject of communications when the subject executes one of initial-mode communication signifying the multiplexing operation of the control specification information held in the removable nonvolatile external storage unit and normal-mode communication signifying the multiplexing operation of the control status information; and
recognition code information describing whether a sender is the master load control unit or one of the at least one slave load control unit when one of the control specification information and control status information is transmitted while being divided into the unit frames.

10. The multiplex transmission system as defined in claim 9, wherein the header further comprises frame type information representing whether the unit frame to be transmitted is one of an ACK frame signifying that the multiplexing operation applied to each of the unit frames of the control specification information takes place in an initial-mode communication environment and a normal frame signifying that the multiplexing operation applied to each of the unit frames of the control status information takes place in a normal-mode communication environment.

11. The multiplex transmission system as claimed in claim 8, wherein the master load control unit divides the control specification information acquired from the removable nonvolatile external storage unit during the multiplexing operation for an initial-mode communication into a predetermined number of unit frames, and further wherein the unit frames are multiplexed one by one between the master load control unit and each of the at least one slave load control unit in synchronism, and further wherein an acknowledgment ACK is sent from each of the at least one slave load control unit upon successful receipt of each of the unit frames.

12. The multiplex transmission system as defined in claim 11, wherein, at the time of execution of the multiplexing operation for the initial-mode communication for each of the unit frames,
each of said at least one slave load control unit sends the acknowledgment ACK to the master load control unit upon successful receipt of each of the unit frames of the control specification information sent from the master load control unit;
the master load control unit resends the one of the unit frames until the master load control unit receives the acknowledgment ACK; and
the master load control unit subsequently sends a new one of the unit frames upon receipt of the acknowledgment ACK.

13. The multiplex transmission system as claimed in claim 11, wherein each of the at least one slave load control unit includes:
means for generating a verification ACK, being checksum information relevant to the control specification information received from the master load control unit;
means for comparing the verification ACK generated by the at least one slave load control unit and a verification ACK received from the master load control unit;
means for reexecuting the multiplexing operation of the unit frames one by one based on the control specification information of the master load control unit if no match arises between the verification ACK generated by the at least one slave control unit and the verification ACK received from the master load control unit;
means for comparing the control specification information held in a nonvolatile storage section of the at least one slave load control unit and the control specification information received from the master load control unit if there is a match between the verification ACK generated by the at least one slave control unit and the verification ACK received from the master load control unit; and
means for updating the contents of the nonvolatile storage section of the at least one slave load control unit by replacing the contents with the control specification information received from the master load control unit, completing the multiplexing operation for initial-mode communication, and transitioning the communication mode from the initial-mode communication to the normal-mode communication if no match arises between the control specification information held in the nonvolatile storage section of the at least one slave load control unit and the control specification information received from the master load control unit.

14. A method of multiplexed transmission, in a multiplex transmission system including a plurality of load control units for controlling loads connected to respective ones of said plurality of load control units;

wherein one of said load control units is a master load control unit, and a corresponding one of said loads is a master load, said master load control unit including a master storage part for storing load control information; and wherein at least one of said load control units is a slave load control unit, said system thereby including at least one slave load control unit, and at least a respective one of said loads is a slave load, each of said at least one slave load control unit including a slave storage part for storing said load control information;

a multiplexing processing network, including a multiplex transmission line, said master load control unit and said at least one slave load control unit being connected to said multiplex transmission line; and a reset switch included in said master load control unit, wherein said method comprises the steps of:

performing multiplexed processing on said load control information through said multiplex transmission line;

forcing transfer of said load control information stored in said master storage part of said master load control unit to each of said at least one slave load control unit, using said reset switch, thereby forming transferred load control information; and holding said transferred load control information in said slave storage part of each of said at least one slave load control unit.

15. The method according to claim 14, wherein said steps of forcing transfer of said load control information and of holding said transferred load control information are executed when said load control information stored in said master storage part of said master load control unit is updated, thereby forming updated load control information, wherein said load control information is said updated load control information.

16. The method according to claim 14, wherein said master storage part is an electrically mountable and removable storage part, and wherein said steps of forcing transfer of said load control information and of holding said transferred load control information are executed when said electrically mountable and removable storage part stores said load control information having been updated, thereby forming updated load control information, wherein said load control information is said updated load control information.

17. The method according to claim 14, further comprising the steps of:

comparing said load control information held in said master storage part of said master load control unit with said load control information held in said slave storage part of each of said at least one slave load control unit;

executing a majority processing on said load control information held in said master storage part of said master load control unit as well as on said load control information held in said slave storage part of each of said at least one slave load control unit to determine a majority load control information when said reset switch is not depressed and also when there exists any inconsistency between said load control information held in said master storage part and said load control information stored in said slave storage part of each of said at least one slave load control unit; and executing said multiplexed processing in accordance with the majority load control information thereby creating a consistency between said load control information held in said master storage part and said load control information stored in said slave storage part of each of said at least one slave load control unit.

18. The method according to claim 17, wherein:

said step of executing majority processing comprises determining when a majority of said load control information held in said master storage part and said load control information held in said slave storage part of each of said at least one slave load control unit are consistent to thereby form said majority load control information, and wherein the method further comprises the step of:

carrying out said multiplexed processing in accordance with said load control information held in said master storage part of said master load control unit when said load control information held in said master storage part and said load control information held in said slave storage part of each of said at least one slave load control unit are all inconsistent with one another thereby creating a consistency between said load control information held in said master storage part and said load control information stored in said slave storage part of each of said at least one slave load control unit.

19. A method of multiplexed transmission, in a multiplex transmission system including:

a multiplex transmission network;

a plurality of load control units connected to said multiplex transmission system, each of the load control units having loads connected thereto and being capable of controlling the loads, wherein each of the load control units includes nonvolatile storage sections for updating and holding the control status information of a respective one of the load control units to be multiplexed in a multiplexing operation and for reading the control status information;

wherein at least one of said load control units is a master load control unit connected to the multiplex transmission network, so as to serve as a master system for executing the multiplexing operation based on the control specification information; and wherein at least one of said load control units is a slave load control unit, said system thereby including at least one slave load control unit, for holding the control specification information and being connected to the multiplex transmission network, so as to serve as a slave system for executing the multiplexing operation via the multiplex transmission network, with respect to the master load control unit; and a removable nonvolatile external storage unit for updating and holding the control specification, the removable nonvolatile external storage unit being electrically removable with respect to the master load control unit, and said removable nonvolatile external storage unit being capable of reading the control specification information while being attached to the master load control unit wherein the method comprises the steps of:
one of said load control units processing at least one of control specification information relevant to control specifications of the loads and control status information relevant to a result of control of the loads by the multiplexing operation via the multiplex transmission network by dividing one of the control specification information and the control status information being transmitted over the network into a predetermined number of unit frames;
transmitting the unit frames as a unit; and
multiplexing the unit frames in the multiplexing operation.

20. The method according to claim 19, wherein each of the unit frames has a frame structure, the frame structure including:
a header carrying a communications protocol for performing the multiplexing operation each of the unit frames through the multiplex transmission network; and
a data sequence carrying one of the control specification information and the control status information,
wherein the header further includes:
communication mode information described by a subject of communication when the subject executes one of initial-mode communication signifying the multiplexing operation of the control specification information held in the removable nonvolatile external storage unit and normal-mode communication signifying the multiplexing operation of the control status information; and
recognition code information describing whether a sender is the master load control unit or one of the at least one slave load control unit when one of the control specification information and the control status information is transmitted while being divided into the unit frames.

21. The method according to claim 20, wherein the header further includes:
frame type information representing whether the unit frame to be transmitted is one of an ACK frame signifying that the multiplexing operation applied to each of the unit frames of the control specification information takes place in an initial-mode communication environment and a normal frame signifying that the multiplexing operation applied to each of the unit frames of the control status information takes place in a normal-mode communication environment.

22. The method according to claim 19, wherein:
the processing step comprises the master load control unit dividing the control specification information acquired from the removable nonvolatile external storage unit during the multiplexing operation for an initial-mode communication into a predetermined number of unit frames;
the multiplexing step comprises multiplexing the unit frames one by one between the master load control unit and each of the at least one slave load control unit in synchronism; and
wherein the method further comprises the step of:
sending an acknowledgment ACK from each of the at least one slave load control unit upon successful receipt of each of the unit frames.

23. The method according to claim 22, further comprising the steps of, at the time of execution of the multiplexing operation for the initial-mode communication and for each of the unit frames:
sending the acknowledgment ACK from each of said at least one slave load control unit to the master load control unit upon successful receipt of each of the unit frames of the control specification information send from the master load control unit;
resending one of the unit frames from the master load control unit until the master load control unit receives the acknowledgment ACK; and
subsequently sending a new one of the unit frames from the master load control unit upon receipt of the acknowledgment ACK.

24. The method according to claim 22, further comprising the following steps executed by each of the at least one slave load control unit:
generating a verification ACK being a checksum information relevant to the control specification information received from the master load control unit;
comparing the verification ACK generated by the at least one slave load control unit and a verification ACK received from the master load control unit;
reexecuting the multiplexing operation of the unit frames one by one based on the control specification information of the master load control unit if no match arises between the verification ACK generated by the at least one slave load control unit and the verification ACK received from the master load control unit;
comparing the control specification information held in a nonvolatile storage section of the at least one slave load control unit and the control specification information received from the master load control unit if there is a match between the verification ACK generated by the at least one slave load control unit and the verification ACK received from the master load control unit; and
updating the contents of the nonvolatile storage section of the at least one slave load control unit by replacing the contents with the control specification information received from the master load control unit, completing the multiplexing operation for initial-mode communication, and transitioning the communication mode from the initial-mode communication to the normal-mode communication if no match arises between control specification information held in the nonvolatile storage section of the at least one slave load control unit and the control specification information received from the master load control unit.

* * * * *